United States Patent
Suzuki et al.

(10) Patent No.: US 10,185,434 B2
(45) Date of Patent: Jan. 22, 2019

(54) DISPLAY DEVICE

(71) Applicant: Japan Display Inc., Tokyo (JP)

(72) Inventors: Takafumi Suzuki, Tokyo (JP); Kohei Azumi, Tokyo (JP)

(73) Assignee: Japan Display Inc., Tokyo (JP)

( * ) Notice: Subject to any disclaimer, the term of this patent is extended or adjusted under 35 U.S.C. 154(b) by 142 days.

(21) Appl. No.: 15/336,290

(22) Filed: Oct. 27, 2016

(65) Prior Publication Data

US 2017/0045997 A1 Feb. 16, 2017

Related U.S. Application Data

(63) Continuation of application No. 14/175,330, filed on Feb. 7, 2014, now Pat. No. 9,513,749.

(30) Foreign Application Priority Data

Mar. 11, 2013 (JP) ................................. 2013-048530

(51) Int. Cl.
*G06F 3/041* (2006.01)
*G06F 3/044* (2006.01)
*G02F 1/1333* (2006.01)

(52) U.S. Cl.
CPC ............ *G06F 3/0416* (2013.01); *G06F 3/044* (2013.01); *G06F 3/0412* (2013.01);
(Continued)

(58) Field of Classification Search
CPC ...... G06F 3/044; G06F 3/0412; G06F 3/0416; G06F 2203/04108; G06F 2203/04104;
(Continued)

(56) References Cited

U.S. PATENT DOCUMENTS 6,005,555 A 12/1999 Katsurahira et al.
8,519,970 B2 8/2013 Westhues et al.
(Continued)

FOREIGN PATENT DOCUMENTS

CN 101676842 A 3/2010
JP 2009-244958 A 10/2009
(Continued)

OTHER PUBLICATIONS

RC Filter, Horowitz and Hill: The Art of Electronics, 1980.*
(Continued)

*Primary Examiner* — Vinh T Lam
(74) *Attorney, Agent, or Firm* — K&L Gates LLP

(57) ABSTRACT

A display device is provided. The display device including a display panel including a display area, a frame area; a plurality of pixel electrodes in the display area; a plurality of share electrodes in the display area; a display function layer controlled by the pixel electrodes and the share electrodes; a plurality of touch detect electrodes forming capacitors with the plurality of the share electrodes; a circuit for generating signals to apply to the share electrodes; and a plurality of wirings coupled to the circuit and the share electrodes in the frame area, wherein the longer a path including each of the share electrodes and each of the wirings is, the shorter pulses of each of the signals become.

10 Claims, 47 Drawing Sheets

(52) U.S. Cl.
CPC .......... *G02F 1/13338* (2013.01); *G06F 2203/04104* (2013.01); *G06F 2203/04108* (2013.01)

(58) Field of Classification Search
CPC ...... G06F 1/1643; G06F 1/169; G06F 1/1692; G06F 3/03547; G06F 3/041; G06F 2200/1634; G06F 2203/0339; G06F 2203/04103; G06F 2203/04107; G06F 2203/04111; G06F 2203/04112; G02F 1/13338; G09F 9/35; H01L 27/323
USPC ... 345/87–94, 173–174, 38, 50–53, 64, 104; 349/139, 142, 143, 148, 151
See application file for complete search history.

(56) References Cited

U.S. PATENT DOCUMENTS

| | | | |
|---|---|---|---|
| 8,648,833 B2 | 2/2014 | Lee et al. | |
| 8,860,685 B2 | 10/2014 | Takeuchi et al. | |
| 8,907,917 B2* | 12/2014 | Kim | G06F 3/044 345/104 |
| 9,285,904 B2 | 3/2016 | Kida et al. | |
| 2009/0079707 A1* | 3/2009 | Kaehler | G06F 3/044 345/174 |
| 2009/0262095 A1 | 10/2009 | Kinoshita et al. | |
| 2010/0053112 A1* | 3/2010 | Chen | G02F 1/13338 345/174 |
| 2010/0182273 A1 | 7/2010 | Noguchi et al. | |
| 2011/0050585 A1* | 3/2011 | Hotelling | G06F 3/0412 345/173 |
| 2011/0050624 A1 | 3/2011 | Lee et al. | |
| 2011/0254805 A1* | 10/2011 | Tanimizu | G06F 3/0416 345/174 |
| 2012/0050217 A1* | 3/2012 | Noguchi | G06F 3/0412 345/174 |
| 2012/0081330 A1* | 4/2012 | Park | G06F 3/0412 345/174 |
| 2012/0113339 A1* | 5/2012 | Park | G06F 3/0412 349/33 |
| 2012/0162134 A1* | 6/2012 | Chen | G06F 3/044 345/174 |
| 2012/0206408 A1* | 8/2012 | Brown | G06F 3/0412 345/174 |
| 2012/0262389 A1 | 10/2012 | Kida et al. | |
| 2013/0082954 A1* | 4/2013 | Azumi | G06F 3/041 345/173 |
| 2013/0176276 A1* | 7/2013 | Shepelev | G06F 3/044 345/174 |
| 2013/0265282 A1 | 10/2013 | Nakagawa et al. | |
| 2013/0342506 A1 | 12/2013 | Westhues et al. | |
| 2014/0049507 A1* | 2/2014 | Shepelev | G06F 3/0412 345/174 |
| 2014/0085222 A1 | 3/2014 | Park et al. | |
| 2014/0111446 A1* | 4/2014 | Lee | G06F 3/0416 345/173 |
| 2014/0184554 A1* | 7/2014 | Walley | G06F 3/0416 345/174 |
| 2014/0191989 A1* | 7/2014 | Saitoh | G09G 3/3614 345/173 |
| 2014/0210743 A1 | 7/2014 | Kurasawa et al. | |
| 2014/0225856 A1* | 8/2014 | Shepelev | G06F 3/0418 345/174 |
| 2014/0232691 A1 | 8/2014 | Lee | |
| 2014/0247239 A1 | 9/2014 | Jamshidi-Roudbari et al. | |
| 2014/0253485 A1 | 9/2014 | Kida et al. | |
| 2014/0313442 A1 | 10/2014 | Misaki | |
| 2014/0327654 A1 | 11/2014 | Sugita et al. | |
| 2014/0333582 A1* | 11/2014 | Huo | G02F 1/13338 345/174 |
| 2015/0002466 A1 | 1/2015 | Takeuchi et al. | |
| 2015/0022224 A1* | 1/2015 | Ruusunen | G06F 3/0416 324/691 |
| 2015/0042363 A1* | 2/2015 | Han | G06F 3/044 324/679 |
| 2017/0045997 A1* | 2/2017 | Suzuki | G06F 3/044 |

FOREIGN PATENT DOCUMENTS

| | | |
|---|---|---|
| JP | 2009-258935 A | 11/2009 |
| JP | 2010-277152 A | 12/2010 |
| JP | 2012-150580 A | 8/2012 |
| JP | 2012-221422 A | 11/2012 |
| JP | 2012-221423 A | 11/2012 |
| JP | 2013-020479 A | 1/2013 |
| JP | 2013004040 A | 1/2013 |
| KR | 10-2011-0024742 A | 3/2011 |
| KR | 10-2013-0016894 A | 2/2013 |
| TW | 201100907 A | 1/2011 |
| WO | 2012/009494 A1 | 1/2012 |
| WO | 2012/077576 A1 | 6/2012 |

OTHER PUBLICATIONS

Office Action issued in Japanese application No. 20136048530, dated Mar. 29, 2016, 12 pages.
Office Action issued in Taiwanese application No. 102137383, dated Oct. 28, 2015, 24 pages.
Office Action issued in Korean application No. 10-2013-155577, dated Apr. 24, 2015.

* cited by examiner

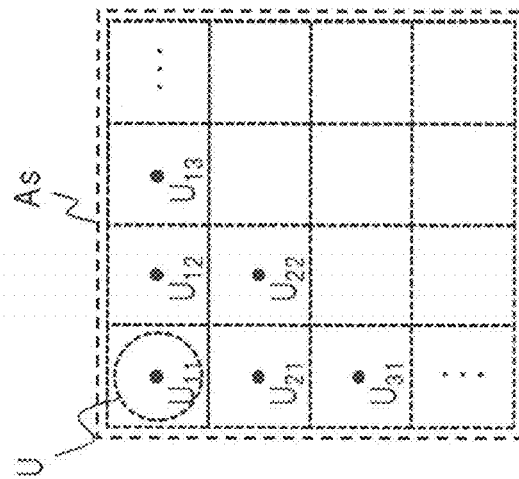
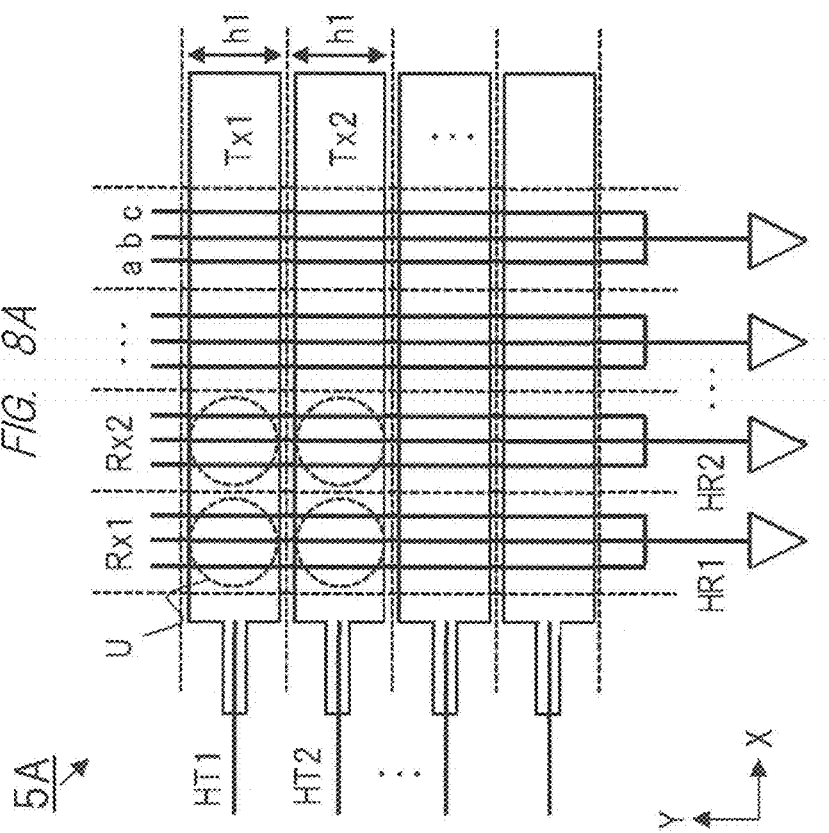

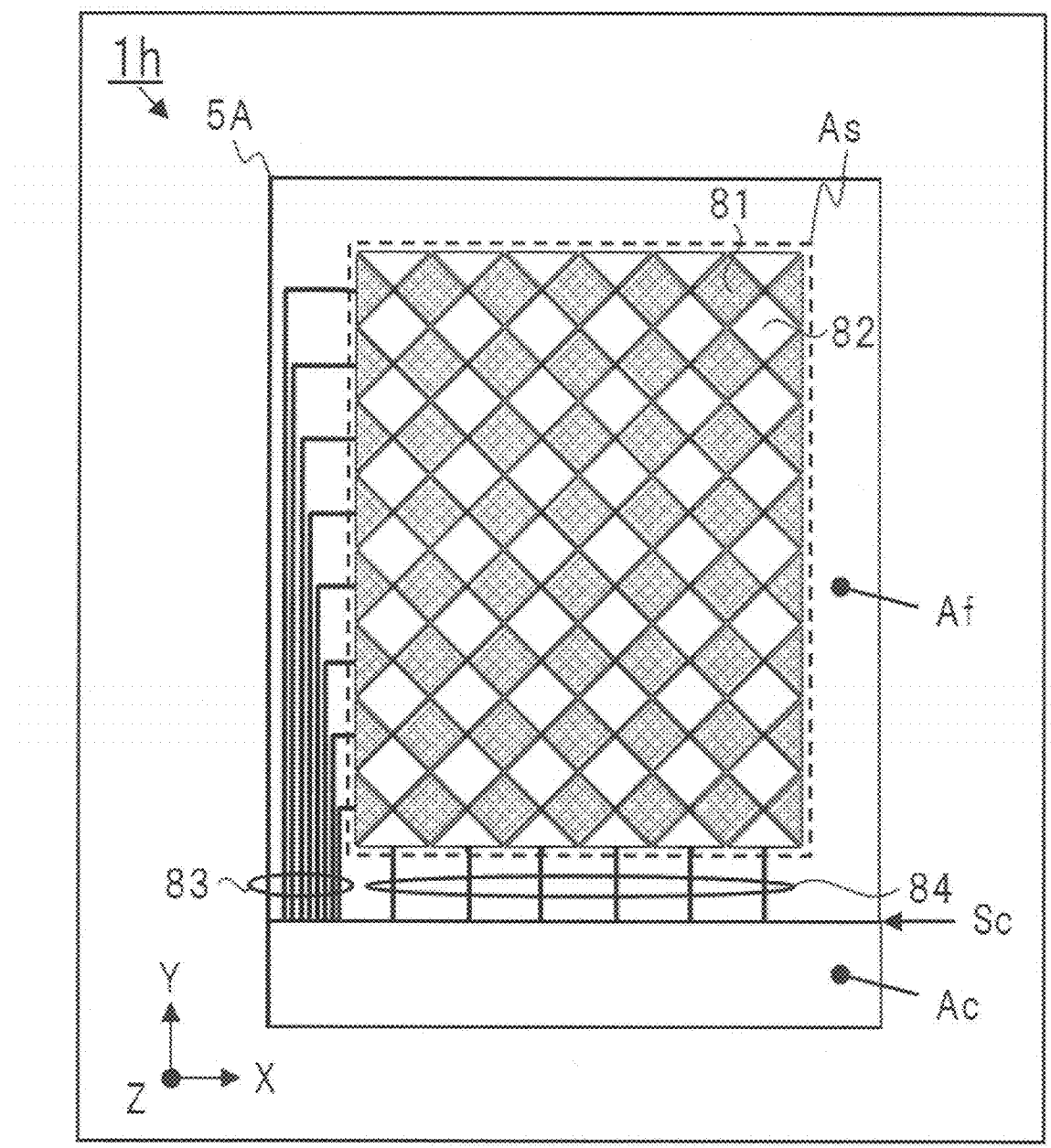

FIG. 47A
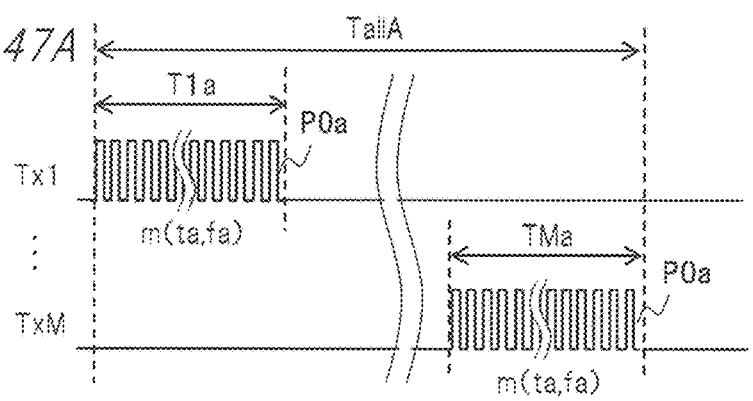 
FIG. 47B
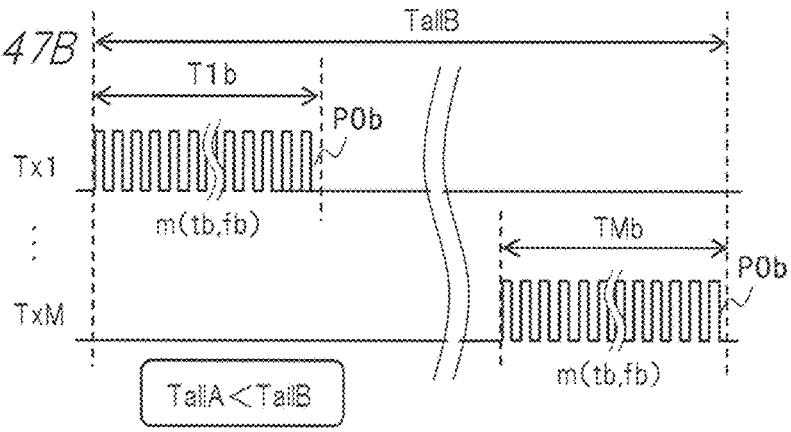 

DISPLAY DEVICE

CROSS-REFERENCE TO RELATED APPLICATIONS

The present application is a continuation of U.S. application Ser. No. 14/175,330, filed Feb. 7, 2014, which claims priority to Japanese Application No. 2013-048530, filed Mar. 11, 2013, the disclosures of which are hereby incorporated by reference herein.

BACKGROUND

The present invention relates to technique for a touch-sensor devices, which are also referred to as touch panels, display devices provided with a touch-sensor function, electronic devices, etc.

In various electronic devices and display devices such as smartphones, touch-sensor devices are mounted as input means. Examples of the touch-sensor devices include touch-sensor devices dedicated to a touch-sensor function, touch-sensor-equipped display devices of an external type or a cover-integrated type, and touch-sensor-equipped display devices in which electrodes constituting a touch-sensor device are built in a display panel. The touch-sensor-equipped display devices of the external type or the cover-integrated type are also referred to as on-cell-type touch-sensor-equipped display devices. The touch-sensor-equipped display devices in which the electrodes of the touch sensor are built in the display panel are also referred to as in-cell-type touch-sensor-equipped display devices. Examples of the touch-sensor-equipped display devices include liquid-crystal touch panel modules used in liquid-crystal display devices.

A touch-sensor device of an electrostatic capacitance type has touch drive electrodes (also referred to as transmitter electrodes) and touch detection electrodes (also referred to as receiver electrodes). A unit of touch detection is formed by intersections of electrode pairs of the touch drive electrodes and the touch detection electrodes. For example, the plurality of touch drive electrodes are parallel to an in-plane horizontal direction in a surface serving as a touch detection area, and the plurality of touch detection electrodes are parallel to an in-plane perpendicular direction. The unit of touch detection is formed by a capacitor formed in the vicinity of, for example, intersecting parts, of electrode pairs of the touch drive electrodes and the touch detection electrodes. In the surface of the touch detection area, the plurality of units of touch detection are formed in matrix. The touch-sensor device has a circuit unit coupled to the electrode pairs of the above-described touch drive electrodes and the touch detection electrodes. When the capacitance of the capacitor is changed when an electrical conductor such as a finger is close to or in contact with the surface of the touch detection area, the circuit unit detects the change in the capacitance as an electric signal. By virtue of this, the touch-sensor device detects the presence/absence, position, etc. of a touch to the touch detection area.

The on-cell-type touch-sensor-equipped display device has, for example, a configuration in which a touch-sensor device or a touch-sensitive layer is externally coupled to a front surface side in which a display area of a liquid-crystal panel unit is formed. Alternatively, the on-cell-type touch-sensor-equipped display device has a configuration in which electrodes of a touch sensor are integrally formed on a cover composed of glass, plastic, or the like provided in the front surface side of a liquid-crystal display panel unit.

The in-cell-type touch-sensor-equipped display device has, for example, a configuration in which at least one of the touch drive electrodes and the touch detection electrodes serving as the electrodes composing the above-described touch sensor, for example, the touch drive electrodes are built in a liquid-crystal display panel unit. The in-cell-type touch-sensor-equipped display device having this configuration has, for example, a configuration in which shared electrodes integrating a common electrode of the liquid-crystal display device and the above-described touch drive electrodes are provided on a TFT board side serving as a first board structure, and the above-described touch detection electrodes are provided on a color filter board side serving as a second board structure.

Examples of conventional techniques about the above-described touch sensor include Japanese Patent Application Laid-Open Publication No. 2009-244958 (Patent Literature 1) and Japanese Patent Application Laid-Open Publication No. 2009-258935 (Patent Literature 2).

Patent Literature 1 describes configuration examples of an in-cell-type touch-sensor-equipped liquid-crystal display device.

Patent Literature 2 describes configuration examples of electrodes and wirings relating to a touch sensor. Patent Literature 2 describes the example in which, as a configuration example of routed wirings between electrodes of circuit-side connection terminals, a connecting side, and a touch detection area, the wiring lengths thereof are mutually different. Patent Literature 2 also describes a configuration example in which the widths of the routed wirings are mutually different.

SUMMARY

In the above-described touch-sensor device or the touch-sensor-equipped display device, as the number of the units of touch detection formed in the touch detection area is increased to increase the density of layout, the sensitivity of touch detection can be increased, and accuracy of detecting a touch position can be increased. For example, when the number of the above-described touch drive electrodes and the touch detection electrodes is increased to increase the intersecting parts formed by the electrode pairs thereof, the number of the above-described units of touch detection is increased. However, correspondingly, in relation to touch drive carried out by scanning drive in which the pulses of touch drive signals are applied to the plurality of touch drive electrodes in the touch detection area, more drive time is required in accordance with the number of the electrodes and the number of scanning. Thus, the overall touch drive time in the touch detection area, in other words, a touch detection period which is a period for ensuring the touch drive time becomes longer.

For example, in a rectangular region having a certain size which serves as the touch detection area or a screen area in which a display area and the touch detection area are overlapped with each other, when sensitivity of touch detection in the region is increased, the number of the electrodes and the number of scanning are increased; therefore, the overall touch drive time becomes longer. Also in a case in which the size of the touch detection area or a screen area is expanded, the number of the electrodes and the number of scanning are increased in the same manner as the above-described case; therefore, overall touch detection time becomes longer.

In the above-described touch-sensor device or the touch-sensor-equipped display device, a circuit unit, etc. for touch drive and touch detection with respect to the electrodes of the touch sensor are mounted in outside of the touch detection area, for example, in a lower side part of the touch-sensor device or the touch-sensor-equipped display device. For example, the lower side part of the touch-sensor device or the touch-sensor-equipped display device serving as an area in which the circuit unit, etc. are mounted will be hereinafter also referred to as a connecting side part. In a peripheral area of the touch detection area, routed wirings, etc. connecting the above-described electrodes, the circuit unit of the above-described connecting side part, and connection terminals thereof are formed. Patent Literature 2 also describes configuration examples of the above-described routed wirings.

Upon touch drive by scanning drive of the touch drive electrodes for the above-described touch detection, for example, the pulses of the touch drive signals are generated and output from the circuit unit of the above-described connecting side part and sequentially applied to the touch drive electrodes in the touch detection area through the routed wirings in the peripheral area. Then, the pulses are transmitted through the touch drive electrodes in the touch detection area, transmitted to the touch detection electrodes via the capacitors serving as the units of touch detection, input to the circuit unit of the connecting side part through the routed wirings in the peripheral area, and detected as touch detection signals. In the whole paths and circuits including the wirings and electrodes in the part where the above-described pulses are output from and returned to the connecting side part in the above-described touch drive and detection, resistance values and capacitance values are increased in accordance with the lengths of the wirings and electrodes, and time constants thereof are increased.

In a comparative example including the configuration example of above-described Patent Literature 2, the lengths of the plurality of routed wirings between the connecting side part and the electrodes of the touch detection area are mutually different, and the time constants thereof are mutually different. For example, among the plurality of wirings from the circuit unit of the lower side part of the touch-sensor device to the plurality of touch drive electrodes in the touch detection area, regarding the wirings to the touch drive electrodes in the upper side of the touch-sensor device distant from the circuit unit and the wirings to the touch drive electrodes in the lower side closer to the circuit unit, the former wirings are longer and have larger time constants. In the same manner as the case considered in the above-described unit of wirings, the longer the overall paths including the wirings, the larger the time constants. Thus, the parts including longer paths including the wirings are disadvantageous in terms of time constants.

If the above-described time constant is larger, circuit responsiveness is lowered; therefore, it is disadvantageous also about touch drive and touch detection. More specifically, rise and decay of the pulses of the touch drive signals transmitted through the paths are retarded, and sensitivity of touch detection is reduced. Particularly, in the paths including the touch drive electrode most distant from the above-described circuit unit and the longest routed wiring thereof, responsiveness of pulses is reduced. The longest routed wiring to the touch drive electrode most distant from the above-described circuit unit or the paths including the wirings are the locations at which the time constants are under the worst conditions.

As a measure against the above-described problem, in a conventional general design, in accordance with the locations where the time constants of the wirings or paths are under the worst conditions and in accordance with the time constants thereof, the time, voltage values, etc. of the pulses of the above-described touch drive signals are specified so that sufficient sensitivity of touch detection is ensured. In a comparative example, as touch drive carried out by scanning drive with respect to the plurality of touch drive electrodes in the touch detection area, pulses of a single type using a design based on the above-described locations under the worst conditions are used.

In the comparative example, the time of the pulses of the touch drive signals is ensured in accordance with the worst conditions as described above; therefore, in the paths which include the short wirings to the touch drive electrodes close to the above-described circuit unit and have small time constants, performance is excessive with the pulses. More specifically, there is waste in relation to the touch drive time of the paths. In other words, in relation to the overall touch drive time and touch detection period in the touch detection area, there is room for improvement in time efficiency. In order to realize efficient touch detection, for example, to improve a report rate about touch detection information, it is desired to shorten the above-described overall touch drive time. If the above-described touch drive time can be shortened, time corresponding to the shortening is provided; therefore, the time can be utilized for a display function or other functions.

Particularly, in the case of the touch-sensor-equipped display device of, for example, the in-cell type, a frame period corresponding to display of images has, for example, a fixed length, and a display period and a touch detection period are distributed within the period. The display period includes, for example, a pixel writing period of a case of a liquid-crystal display device. The touch detection period corresponds to a period of ensuring the time of touch drive by scanning drive, in which the pluses of the touch drive signals are applied to the touch drive electrodes in the touch detection area. In a case in which the display period is prioritized and ensured to have long time in the fixed frame period, correspondingly, only a short touch detection period can be ensured. Reversely, in a case in which the touch detection period is prioritized to ensure a long time in the fixed frame period, correspondingly, only a short display period can be ensured. For example, when a screen size is to be expanded, in other words, when the display area and the touch detection area are to be expanded, the number of the electrodes and the number of scanning thereof are increased; therefore, a longer touch detection period is required together with a display period. As a result, it becomes difficult to contain the display period and the touch detection period within the time of the limited frame period.

As described above, the touch-sensor device and the touch-sensor-equipped display device of the comparative example have a problem that the touch drive time and the touch detection period of the touch detection area become longer in accordance with the number of electrodes and the number of scanning of the touch drive electrodes based on inefficiency caused by the time corresponding to the excessive performance of the pulses of the touch drive signals.

It is a preferred aim of the present invention to provide technique by which the touch drive time and the touch detection period of the touch detection area can be shortened or increase thereof can be suppressed in relation to the above-described touch-sensor device and the touch-sensor-equipped display device. It is another preferred aim of the present invention to provide technique by which the sensitivity of touch detection can be maintained or improved by using allowance provided by shortening or increase suppression of the time together with realization of efficient touch detection by the above-described shortening or increase suppression of the time.

Typical modes of the present invention include a touch-sensor device, a display device provided with a touch-sensor function, and an electronic device. They have the configurations as described below.

(1) A touch-sensor device of an embodiment has: a panel unit including a touch detection area in which a plurality of units of touch detection formed by pairs of a plurality of first electrodes and a plurality of second electrodes are formed in matrix; a first circuit unit generating pulses of a touch drive signal and applies the pulses to the plurality of first electrodes; a second circuit unit receiving an input of pulses from the plurality of second electrodes based on the pulses of the touch drive signal and detects the pulses as a touch detection signal; a plurality of first wirings disposed in a peripheral area of the touch detection area and connecting the plurality of first electrodes and the first circuit unit to each other; a plurality of second wirings disposed in the peripheral area of the touch detection area and connecting the plurality of second electrodes and the second circuit unit to each other; and a plurality of paths transmitting the pulses of the touch drive signal and including the plurality of first wirings, the plurality of first electrodes, the plurality of units of touch detection, the plurality of second electrodes, and the plurality of second wirings. In the touch sensor device, the first circuit unit generates a plurality of types of pulses having mutually different pulse cycles in accordance with differences in time constants with respect to the plurality of paths and applies the pulses to the plurality of first electrodes.

(2) The pulse cycles of the plurality of types of pulses are adjusted in accordance with the differences in the time constants caused by differences in the lengths of the plurality of first wirings. Alternatively, the pulse cycles of the pulses of the plurality of types are adjusted in accordance with differences in the time constants of the distances through which the pulses are transmitted to the plurality of second electrodes.

(3) Upon scanning drive of applying the pulses of the touch drive signal sequentially to the plurality of first electrodes of the touch detection area, the first circuit unit generates pulses adjusted to have mutually different pulse cycles respectively for the plurality of first electrodes or respectively for groups of the plurality of first electrodes and applies the pulses to each of the plurality of first electrodes.

(4) In the touch detection area, the plurality of first electrodes are parallel to a first direction which is an in-plane horizontal direction; the plurality of second electrodes are parallel to a second direction which is an in-plane perpendicular direction; and capacitors corresponding to intersecting parts of the plurality of first electrodes and the plurality of second electrodes in a third direction which is a perpendicular direction of the touch detection area form the plurality of units of touch detection. Alternatively, in the touch detection area, the plurality of first electrodes are parallel to a first direction which is an in-plane perpendicular direction; the plurality of second electrodes are parallel to a second direction which is an in-plane horizontal direction; and capacitors corresponding to intersecting parts of the plurality of first electrodes and the plurality of second electrodes in a third direction which is a perpendicular direction of the touch detection area form the plurality of units of touch detections. Alternatively, in the touch detection area, the plurality of first electrodes are parallel to a first direction; the plurality of first electrodes have a plurality of wide electrode parts, respectively; the plurality of second electrodes are parallel to a second direction intersecting with the first direction; the plurality of second electrodes have a plurality of wide electrode parts, respectively; and capacitors corresponding to juxtaposed pairs of the plurality of wide electrode parts of the plurality of first electrodes and the plurality of wide electrode parts of the plurality of second electrodes form the plurality of units of touch detection.

(5) The plurality of first wirings are disposed in a first wiring part disposed in a first region of the peripheral area and are disposed in a second wiring part disposed in a second region of the peripheral area in a symmetrical shape with respect to the first wiring part; the plurality of first wirings disposed in the first part are respectively coupled to first ends of the corresponding first electrodes among the plurality of first electrodes; the plurality of first wirings disposed in the second wiring part are respectively coupled to second ends of the corresponding first electrodes among the plurality of first electrodes; and, upon scanning drive of applying the pulses of the touch drive signals sequentially to the plurality of first electrodes of the touch detection area through the plurality of first wirings, the first circuit unit applies the pulses to both of the first end and the second end of each of the plurality of first electrodes through the first wiring part and the second wiring part.

(6) The plurality of first wirings are disposed in a wiring part disposed in the peripheral area; the plurality of first wirings are respectively coupled to first ends of the corresponding first electrodes among the plurality of first electrodes; and, upon scanning drive of applying the pulses of the touch drive signal sequentially to the plurality of first electrodes of the touch detection area through the plurality of first wirings, the first circuit unit applies the pulses to the first end of each of the plurality of first electrodes through the wiring part.

(7) The plurality of first wirings are disposed in a first wiring part disposed in a first region of the peripheral area and disposed in a second wiring part disposed in a second region of the peripheral area; the plurality of first wirings disposed in the first wiring part are respectively coupled to first ends of a first group of the plurality of first electrodes; the plurality of first wirings disposed in the second wiring part are respectively coupled to second ends of a second group of the plurality of first electrodes; and, upon scanning drive of applying the pulses of the touch drive signal sequentially to the plurality of first electrodes of the touch detection area through the plurality of first wirings, the first circuit unit applies the pulses to one of the first end and the second end of each of the plurality of first electrodes through the first wiring part and the second wiring part.

(8) The plurality of second wirings are disposed in the peripheral area; the plurality of second wirings disposed in the peripheral area are respectively coupled to ends of the corresponding second electrodes among the plurality of second electrodes; and, upon scanning drive of applying the pulses of the touch drive signal sequentially to the plurality of first electrodes of the touch detection area through the plurality of first wirings, the first circuit unit generates the pulses of which pulse cycles have been adjusted in accordance with the differences in the time constants caused by differences in the distances of transmission of the pulses to the ends of the plurality of second electrodes and applies the pulses to the plurality of first electrodes.

(9) The plurality of second wirings are disposed in a first wiring part disposed in a first region of the peripheral area and disposed in a second wiring part disposed in a second region of the peripheral area; the plurality of second wirings disposed in the first wiring part are respectively coupled to first ends of the corresponding second electrodes among the plurality of second electrodes; the plurality of second wirings disposed in the second wiring part are respectively coupled to second ends of the corresponding second electrodes among the plurality of second electrodes; and, upon scanning drive of applying the pulses of the touch drive signal sequentially to the plurality of first electrodes of the touch detection area through the plurality of first wirings, the first circuit unit generates the pulses of which pulse cycles have been adjusted in accordance with the difference in the time constants caused by a difference in the distances of transmission of the pulses to closer ends among the first ends and the second ends of the plurality of second electrodes and applies the pulses to the plurality of first electrodes.

(10) In the touch detection area, the plurality of first electrodes are divided into a first electrode part and a second electrode part by a first position in the touch detection area; the plurality of first wirings are disposed in a first wiring part disposed in a first region of the peripheral area and disposed in a second wiring part disposed in a second region of the peripheral area; the plurality of first wirings disposed in the first wiring part are respectively coupled to ends of the corresponding first electrodes of the first electrode part among the plurality of first electrodes; the plurality of first wirings disposed in the second wiring part are respectively coupled to ends of the corresponding first electrodes of the second electrode part among the plurality of first electrodes; the plurality of second wirings have the time constants mutually different in a first-side region and a second-side region bordered by the first position in the touch detection area; the first circuit unit has a first-side circuit unit performing scanning drive of applying the pulses of the touch drive signal sequentially to the first electrode part of the plurality of first electrodes of the touch detection area through the first wiring part and has a second-side circuit unit that carries out scanning drive of applying the pulses of the touch drive signal sequentially to the second electrode part of the plurality of first electrodes of the touch detection area through the second wiring part; and, for each of the plurality of first electrodes, a first pulse applied to the first electrode part from the first-side circuit unit and a second pulse applied to the second electrode part from the second-side circuit unit are adjusted to have the pulse cycles which are mutually different in accordance with the differences in the time constant of the second wirings.

(11) Furthermore, the touch-sensor device of an embodiment has a pulse changing unit that changes the pulse cycle or the number of pulses of the touch drive signal applied to at least one of the plurality of first electrodes from the first circuit unit. Particularly, the touch-sensor device of an embodiment has a noise detecting unit that detects noise, and the pulse changing unit changes the pulses of the touch drive signal based on the noise detected by the noise detecting unit.

(12) A display device of an embodiment has a display panel unit that includes a display area having pixels formed like a matrix and a display function layer for controlling a state of display of the pixels and has a first-side surface coupled to a surface of the panel unit of the touch-sensor device, and the display device has a third circuit unit that applies a signal for display drive to the pixels of the display area.

(13) A display device of an embodiment has: a display panel unit including a touch detection area in which a plurality of units of touch detection formed by pairs of a plurality of first electrodes and a plurality of second electrodes for both of display and touch drive are formed in matrix, a display area in which pixels including the plurality of first electrodes are formed in matrix, and a display function layer for controlling a state of display of the pixels; a first circuit unit that generates pulses of a touch drive signal and a signal of common drive for the display and applies them to the plurality of first electrodes; a second circuit unit that receives input of pulses from the plurality of second electrodes based on the pulses of the touch drive signal and detects the pulses as a touch detection signal; a third circuit unit that applies a display drive signal to the pixels of the display area; a plurality of first wirings disposed in a peripheral area of the touch detection area and mutually connecting the plurality of first electrodes and the first circuit unit; a plurality of second wirings disposed in the peripheral area of the touch detection area and mutually connecting the plurality of second electrodes and the second circuit unit; and a plurality of paths that transmit the pulses of the touch drive signal and include the plurality of first wirings, the plurality of first electrodes, the plurality of units of touch detection, the plurality of second electrodes, and the plurality of second wirings. The first circuit unit generates a plurality of types of pulses having mutually different pulse cycles and applies the pulses to the plurality of first electrodes in accordance with differences in time constants with respect to the plurality of paths.

(14) An electronic device of an embodiment has the touch-sensor device and a control unit that carries out control about a touch-sensor function with respect to the touch-sensor device and obtains touch detection information obtained based on the touch detection signal of the second circuit unit from the touch-sensor device.

(15) The electronic device according to an embodiment has the display device and a control unit that carries out control about the touch-sensor function and control about a display function with respect to the display device and obtains the touch detection information obtained based on the touch detection signal of the second circuit unit from the touch-sensor function.

(16) A display device according the embodiment includes, a display panel including a display area, a frame area; a plurality of pixel electrodes in the display area; a plurality of share electrodes in the display area; a display function layer controlled by the pixel electrodes and the share electrodes; a plurality of touch detect electrodes forming capacitors with the plurality of the share electrodes; a circuit for generating signals to apply to the share electrodes; and a plurality of wirings coupled to the circuit and the share electrodes in the frame area. In the display device, the longer the path including each of the share electrodes and each of the wirings is, the shorter pulses of each of the signals become.

According to the typical modes of the present invention, in relation to a touch-sensor device and a touch-sensor-equipped display device, the touch drive time and touch detection period of a touch detection area can be shortened or increase thereof can be suppressed. Moreover, according to the typical modes of the present invention, in combination with achievement of efficient touch detection by the above-described shortening or increase suppression of time, the sensitivity of touch detection can be maintained or improved by using allowance provided by the above-described shortening or increase suppression of the time.

Moreover, according to the typical modes of the present invention, also with respect to size expansion and resolution increase of a touch detection area or a display area, the touch drive time and touch detection period of a touch detection area can be shortened or increase thereof can be suppressed.

Moreover, according to the typical modes of the present invention, a pulse changing function, etc. using noise detection can be achieved by using time allowance caused by the above-described shortening or increase suppression of the time, and touch detection sensitivity can be maintained or improved by the function. Moreover, according to the typical modes of the present invention, a report rate of touch detection information can be improved by shortening the touch detection period.

Additional features and advantages are described herein, and will be apparent from the following Detailed Description and the figures.

BRIEF DESCRIPTION OF THE FIGURES

FIG. 8A is a drawing showing a configuration example of the electrodes, etc. of the embodiment 1A;

FIG. 8B is a drawing showing a configuration example of a touch detection area and units of touch detection;

FIG. 19 is a drawing showing a configuration example of an XY-plane including electrodes and wirings of a touch-sensor device of an embodiment 1H of the present invention;

FIGS. 38A and 38B show an external appearance of a case in which an electronic device of an embodiment is a mobile phone;

FIG. 47A is a drawing showing a case in which pulse time is changed to be larger in relation to the touch drive sequence of FIG. 45;

FIG. 47B is a drawing showing the case in which pulse time is changed to be larger in relation to the touch drive sequence of FIG. 45;

DETAILED DESCRIPTION

Figure 1:
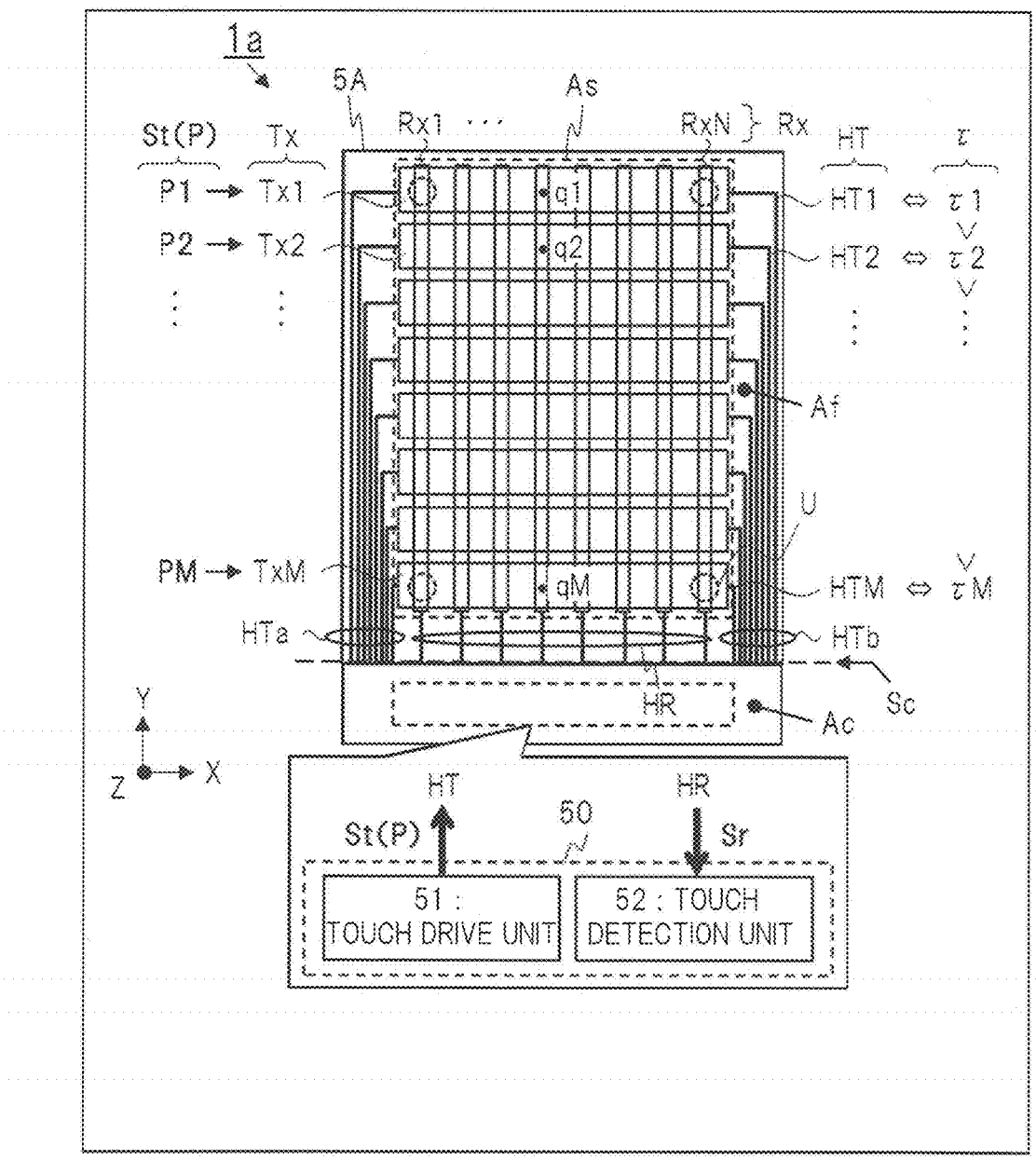
FIG. 1 is a drawing showing a configuration example of an XY-plane including electrodes, wirings, and a circuit unit as an outline of a touch-sensor device of an embodiment 1A of the present invention.

Hereinafter, embodiments of the present invention will be explained in detail based on drawings. In all the drawings for explaining the embodiments, the same parts are basically denoted by the same symbols, and repetitive explanations thereof will be omitted. In order to facilitate understanding, hatching of cross sections is appropriately omitted. In the explanations, as the directions that constitute planes of a touch detection area, etc. in a device, an in-plane horizontal direction is an X-direction, an in-plane perpendicular direction is a Y-direction, and a direction which is perpendicular to the plane of the touch detection area, etc. employing the X-direction and the Y-direction and is a thickness direction of a touch-sensor device, etc. is a Z-direction. In other words, the in-plane horizontal direction and the in-plane perpendicular direction are orthogonally located each other in one plane, and the direction perpendicular to the plane of the touch detection area is perpendicular to both the in-plane horizontal direction and the in-plane perpendicular direction.

<Outlines, Etc.>

Touch-sensor devices and touch-sensor-function-equipped display devices of the present embodiments will be described below. Outlines of the touch-sensor devices of the present embodiments are shown in, for example, FIG. 1 and FIG. 21, which will be described later. The outlines of the touch-sensor-function-equipped display devices of the present embodiments are shown in, for example, FIG. 25 and FIG. 31, which will be described later. For example, the touch-sensor device and the touch-sensor-equipped display device of the present embodiment are configured to generate, from a circuit unit, pulses P of a plurality of types having mutually different time adjusted in accordance with differences in time constants caused by differences in the lengths of routed wirings or paths including them as touch drive signals St for a plurality of touch drive electrodes Tx of a touch detection area As in touch drive for the touch-sensor function and apply the pulses to the touch drive electrodes Tx. As the pulses P, for example, first pulses for the first touch drive electrodes Tx, which are the parts of the above-described worst conditions where the above-described wirings or paths are relatively long and have large time constants, and second pulses for the second touch drive electrodes Tx, which are the parts of above-described excessive performance where the above-described wirings or paths are relatively short and have small time constants, are provided. The time of the pulses is adjusted to optimum lengths with which sufficient touch detection sensitivity can be ensured, and the time of the second pulses is shorter than the time of the first pulses. According to the present configuration, the touch drive time which is for the parts of excessive performance with the pulses of the comparative example is also optimized and shortened. Thus, the touch drive time and the touch detection period of the touch detection area As can be shortened or increase thereof can be suppressed.

Comparative Example

First, a comparative example of the present embodiment will be explained below about a touch-sensor device and a touch-sensor-equipped display device with reference to FIGS. 43 to 50.

[(1) Panel Unit Plane]

Figure 43:
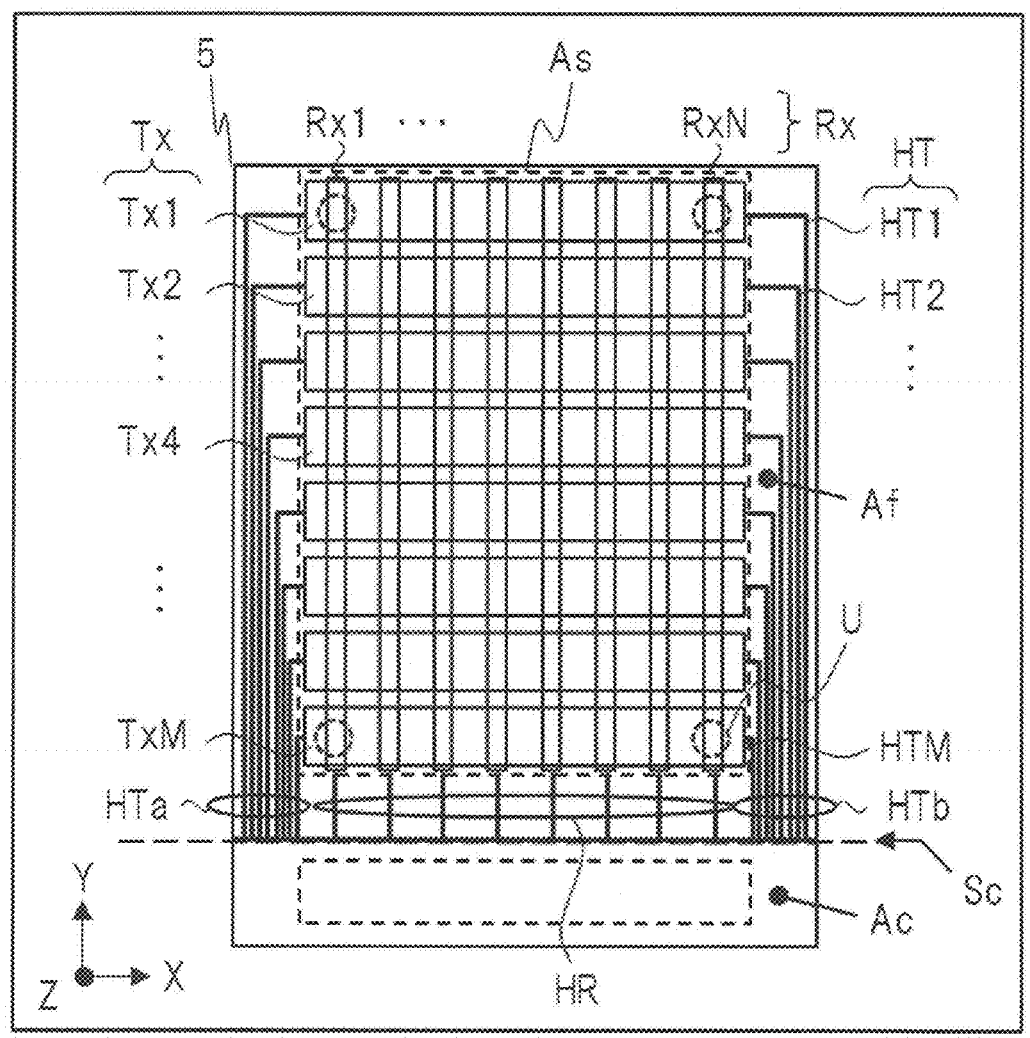
FIG. 43 is a drawing showing a configuration example of an XY-plane including electrodes and wirings in a touch sensor part of a touch-sensor device or a touch-sensor-equipped display device as a comparative example.

FIG. 43 shows a configuration example of an XY-plane including electrodes and wirings in a touch-sensitive part of a touch-sensor device or a touch-sensor-equipped display device of a comparative example. A panel unit 5 of the touch-sensor device or the touch-sensor-equipped display device has touch drive electrodes Tx, which are parallel to an X-direction, and touch detection electrodes Rx, which are parallel to a Y-direction, as the electrodes configuring a touch-sensor function. The panel unit 5 has a touch detection area As, a peripheral area Af, and a connecting side part Ac in a rectangular region, which is long in the Y-direction in the XY-plane.

The panel unit 5 has, in the rectangular surface serving as the touch detection area As, the plurality of touch drive electrodes Tx, which are extending in parallel to the X-direction and juxtaposed in the Y-direction in a first layer that is in a Z-direction, and the plurality of touch detection electrodes Rx, which are extending in parallel to the Y-direction and juxtaposed in the X-direction in a second layer in the Z-direction. In the touch detection area As, a plurality of units of touch detection U are formed like a matrix by pairs of the plurality of the touch drive electrodes Tx and the plurality of touch detection electrodes Rx. In the touch detection region As, the electrode pairs of the touch drive electrodes Tx and the touch detection electrodes Rx are disposed at predetermined distances in the Z-direction and are mutually intersecting in an XY planar view from the Z-direction. Capacitors formed to correspond to the vicinities of the intersecting parts of the electrode pairs are defined as units of touch detection U. The plurality of (the number of assumed to be M) touch drive electrodes Tx are shown as a touch drive electrode Tx1 to a touch drive electrode TxM sequentially from the upper side of the Y-direction. The plurality of (the number of assumed to be N) touch detection electrodes Rx are shown as a touch detection electrode Rx1 to a touch detection electrode RxN sequentially from the left side of the X-direction. FIG. 43 exemplifies a case in which M=8 and N=8.

In the peripheral area Af, wirings HT, which are routed wirings connecting ends of the touch drive electrodes Tx of the touch detection area As and a connecting side Sc to each other, and wirings HR, which are routed wirings connecting ends of the touch detection electrodes Rx of the touch detection area As and the connecting side Sc to each other, are formed. The M wirings HT coupled to the touch drive electrodes Tx are shown as a wiring HT1 to a wiring HTM. The N wirings HR coupled to the touch detection electrodes Rx are shown as a wiring HR1 to a wiring HRN. FIG. 43 particularly shows a case in which, as the wirings HT, a wiring part HTa and a wiring part HTb, which are two wiring parts, are provided in a left/right symmetric form in the region of the peripheral area Af in the left/right in the X-direction of the touch detection area As. One of the touch drive electrodes Tx is coupled to the wiring part HTa and the wiring part HTb at left/right both-side ends in the X-direction, and pulses of a touch drive signal are applied from the both-side ends.

The connecting side part Ac includes a region in which circuit units such as a touch drive unit is mounted. The connecting side Sc is an upper side of the connecting side part Ac to which the wirings HT and the wirings HR are coupled and shows a boundary line with the peripheral area Af. The wirings HT and the wirings HR of the peripheral area Af are extended from the electrode ends of the touch detection area As to at least the connecting side Sc and are coupled to terminals of the connecting side Sc or to terminals of the circuit units in the connecting side part Ac.

[(2) Path, Time Constant, and Pulse]

Figure 44:
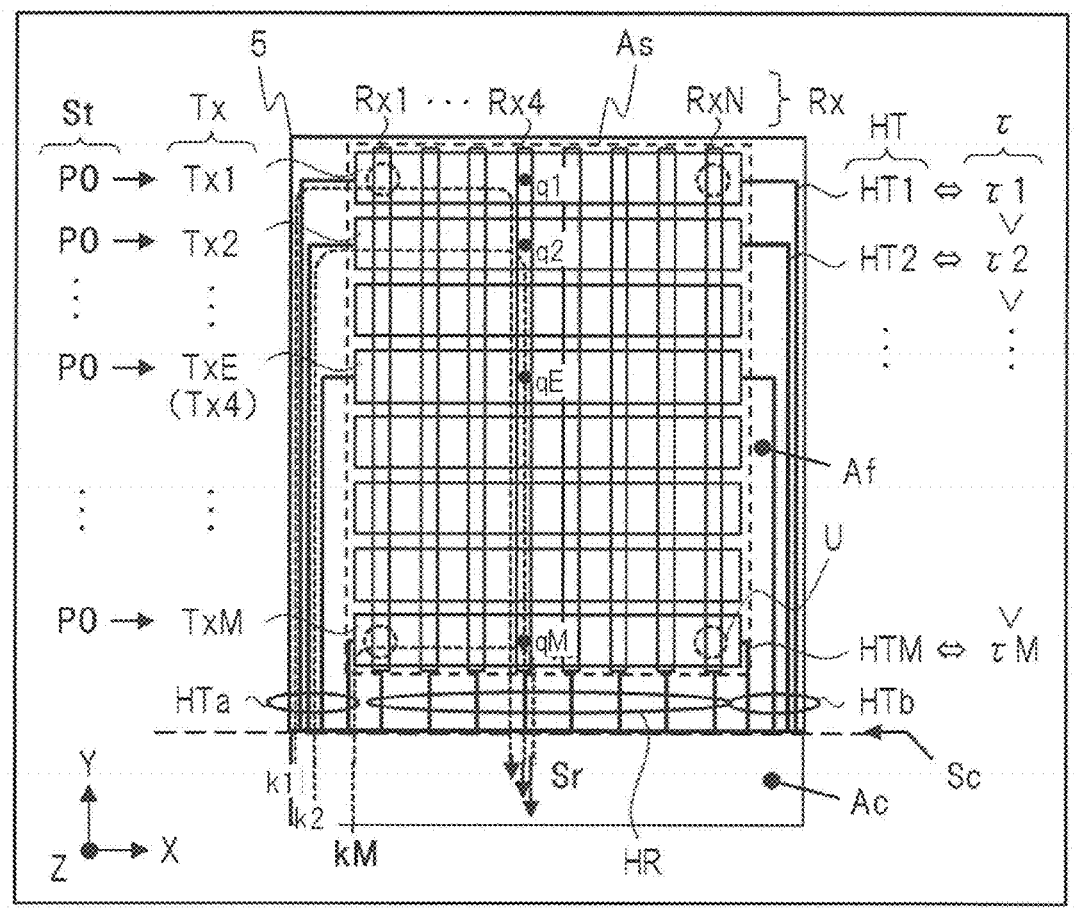
FIG. 44 is a drawing showing examples of paths including the electrodes and the wirings, time constants, pulses, etc. in the configuration of FIG. 43.

FIG. 44 shows a configuration example of paths including electrodes and wirings, time constants, application of pulses of touch drive signals, etc. corresponding to the configuration of FIG. 43. As the touch drive electrode Tx, the touch drive electrode Tx1 is the most distant from the connecting side Sc, and the touch drive electrode TxM is the closest from the connecting side Sc. The touch drive electrode Tx2 is the second most distant from the connecting side Sc. The touch drive electrode TxE shows the touch drive electrode Tx at a Y-direction near intermediate position in the touch detection area As, in this case, shows the touch drive electrode Tx4. A point q1, a point q2, a point qE, and a point qM show X-direction near intermediate positions in the touch detection area As, in this case, show examples of the positions corresponding to the units of touch detection U in the case in which the positions are at the touch detection electrode Rx4. For example, the point q1 shows the position of the unit of touch detection U formed to correspond to the intersecting part of the touch drive electrode Tx1 and the touch detection electrode Rx4.

The time constants τ of the wirings HT are shown as a time constant τ, a time constant τ2 to a time constant τM. For example, the time constant of the wiring HT1 is τ1, and the time constant of the wiring HTM is τM. The wiring HT1 of the touch drive electrode Tx1, which is distant from the connecting side Sc, is longer than the wiring HTM of the touch drive electrode TxM, which is close to the connecting side Sc, and has a larger time constant τ, where τ1>τM. In the same manner as the above-described case of the wiring HT1 and the wiring HTM, the time constants are τ1>τ2> . . . >τM from the relation of the lengths of the wirings HT.

A path k1, a path k2, and a path kM show examples of the paths including the touch drive electrodes Tx, the touch detection electrodes Rx, the wirings HT, and the wirings HR. The path through which pulses P0 of touch drive signals St are transmitted is, sequentially from a circuit of the touch drive unit mounted in the connecting side part Ac, the wiring HT of the peripheral area Af, the touch drive electrode Tx of the touch detection area As, the unit of touch detection U, the touch detection electrode Rx, the wiring HR of the peripheral area Af, and a circuit of the touch detection unit in the connecting side part Ac. For example, the path k1 is, sequentially, the wiring HT1, the touch drive electrode Tx1, the point q1, the touch detection electrode Rx4, and the wiring HR4. The path k2 is, sequentially, the wiring HT2, the touch drive electrode Tx2, the point q2, the touch detection electrode Rx4, and the wiring HR4. The path kM is, sequentially, the wiring HTM, the touch drive electrode TxM, the point qM, the touch detection electrode Rx4, and the wiring HR4. The path k1 including the above-described wiring HT1 and the touch drive electrode Tx1 is longer than the path kM including the above-described wiring HTM and the touch drive electrode TxM and has a large time constant in the path. The circuit of the touch detection unit detects the pulses from the wirings HR as the touch detection signals Sr.

In the comparative example, upon scanning drive, the pulses P0 of the touch drive signals St of the same type are uniformly applied from the circuit of the touch drive unit of the connecting side part Ac to the touch drive electrodes Tx1 to the touch drive electrode TxM, which are the plurality of touch drive electrodes Tx in the touch detection area As. The time, voltage, etc. of the pulse P0 are specified in accordance with the time constant τ1 of the wiring HT1 of the touch drive electrode Tx1, which is the location of the above-described worst conditions. Therefore, at a location like the touch drive electrode TxM close to the circuit unit, performance is excessive with the pulse P0, and waste is generated in touch drive time.

In addition to the case of specifying the pulse P0 in accordance with the location of the worst conditions like the touch drive electrode Tx1, for example, there is also a case in which the time, etc. of the pulse P0 are specified in accordance with the location of the touch drive electrode TxE at the near intermediate position in the touch detection area As such as the touch drive electrode Tx4. In that case, in scanning drive using the pulse P0, touch detection becomes unstable due to lack of time at a position like the touch drive electrode Tx1.

[(3) Touch Drive Sequence]

Figure 45:
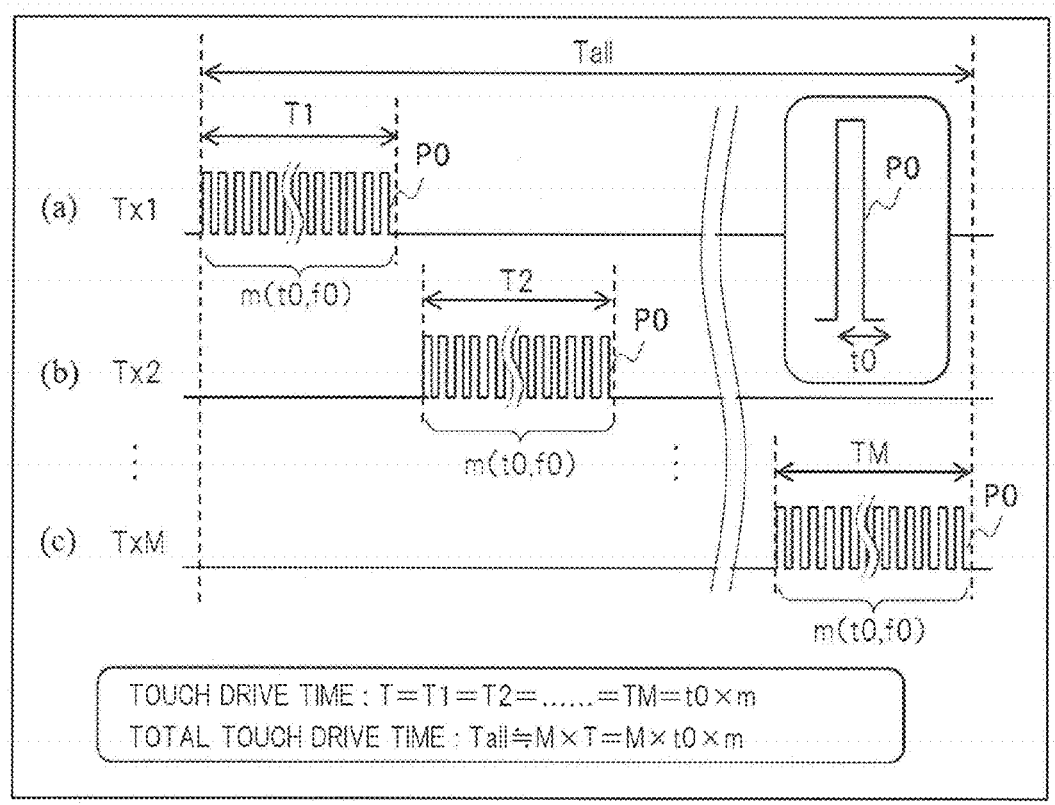
FIG. 45 is a drawing showing an example of touch drive sequence in the configuration of FIG. 43.

FIG. 45 shows a sequence example of touch drive by scanning drive of the plurality of touch drive electrodes Tx of the touch detection area As corresponding to the configuration of FIG. 43 and FIG. 44. In this case, the pulses P0 of the touch drive signals St are generated from the circuit of the touch drive unit of the connecting side part Ac and sequentially applied to the plurality of touch drive electrodes Tx in the touch detection area As. The scanning order upon this scanning drive is, for example, sequentially from the upper side in the Y-direction, specifically, from the touch drive electrode Tx1 to the touch drive electrode Tx2, and to the touch drive electrode TxM.

FIG. 45A shows the pulses P0 of the touch drive signal St applied to the touch drive electrode Tx1 and the touch drive time T1 of the touch drive electrode Tx1. Similarly, FIG. 45B shows the pulses P0 to the touch drive electrode Tx2 and touch drive time T2. FIG. 45C shows the pulses P0 to the touch drive electrode TxM and touch drive time TM. The single pulse P0 has a pulse cycle, which is time t0 specified based on the above-described worst conditions, and a frequency f0 corresponding to the pulse cycle. In every single scanning, the plurality of (the number is assumed to be m) pulses P0 of a frequency f0 are applied to each of the touch drive electrode Tx. FIG. 45 shows the example in which the m pulses P0 are applied to each of the touch drive electrodes Tx in order to increase the sensitivity of touch detection. Since the same pulses P0 are applied to the touch drive electrodes Tx in the touch detection area As, the touch drive time T of each of the touch drive electrodes Tx is the same and is T=T1=T2= . . . =TM=t0×m.

Tall represents the total touch drive time in the entire touch detection area As including the touch drive time T1 to the touch drive time TM serving as the touch drive time T of the above-described respective touch drive electrodes Tx. The length of the total touch drive time Tall roughly corresponds to the length of a touch detection period Ks of later-described FIG. 49. The total touch drive time Tall is Tall≈T1+T2+ . . . +TM=M×t0×m. The touch detection period Ks is a period including the touch drive time Tall; and, in the case of FIG. 45, short time is ensured between the touch drive times T, and the touch detection period Ks is therefore correspondingly longer than the total touch drive time Tall. If the above-described time t0 and the number m of the pulses are constant, the total touch drive time Tall and the touch detection period Ks become longer in accordance with M, which is the number of electrodes and the number of scanning of the touch drive electrodes Tx. As the time t0 per the pulse P0 is increased, the total touch drive time Tall becomes longer.

[(4) Touch Drive Signal Pulse]

Figure 46:
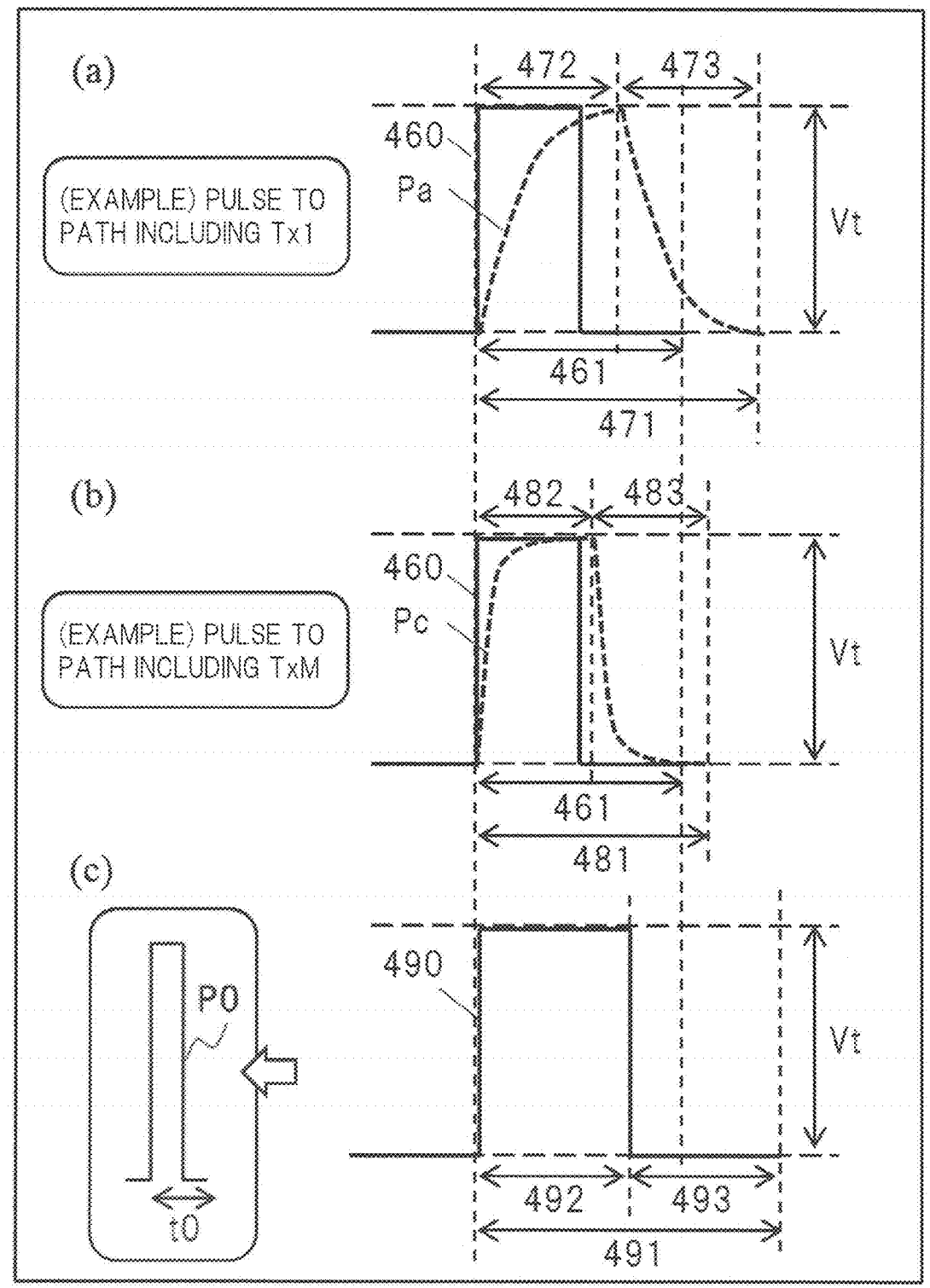
FIG. 46 is a drawing showing an example of pulses of touch drive signals in the comparative example.

FIG. 46 show details of the pulses P0 of the above-described touch drive signals St. A pulse Pa in FIG. 46 (a) and a pulse Pc in FIG. 46 (b) simply show examples of a difference in the responsiveness of the pulses P0 corresponding to a difference in the time constants based on a difference in the lengths of the above-described wirings or paths. The pulse P0 generated and output from the circuit of the touch drive unit is specified by the time t0 and a voltage Vt. The time t0 is a pulse cycle, and the frequency f0 is f0=1/t0. Pulses 460 shown in FIGS. 46 (a) and (b) are examples of the pulses applied to the touch drive electrodes Tx and show ideal rectangular waves corresponding to the state thereof generated in the circuit of the touch drive unit. Time 461 represents the pulse cycle of the pulses 460. FIG. 46 (a) shows a case in which the pulse 460 is applied to the touch drive electrode Tx, and the pulse Pa shows a state in which responsiveness has been reduced due to transmission of the pulse 460 through the path including the touch drive electrode Tx1. Similarly, FIG. 46 (b) shows a case in which the pulse 460 is applied to the touch drive electrode TxM, and the pulse Pc shows a state in which responsiveness has been reduced due to transmission of the pulse 460 through the path including the touch drive electrode TxM.

In FIG. 46 (a), time 471 represents the time corresponding to the pulse cycle of the pulse Pa. Time 472 represents the time corresponding to a pulse width including the rise time of the pulse Pa, and time 473 represents the time including the decay time of the pulse Pa. Similarly, in FIG. 46 (b), time 481 represents the time corresponding to the pulse cycle of the pulse Pc. Time 482 represents the time including the rise time of the pulse Pc, and time 483 represents the time including the decay time of the pulse Pc. As described above, the time 471 of the pulse Pa and the time 481 of the pulse Pc have different lengths depending on a difference in the responsiveness caused by a difference in the lengths and time constants of the paths.

The time constant τ is an index generally representing the responsiveness of a circuit and affects rise and decay of pulses in input/output to/from the circuit. The time constant τ can be represented by τ≈R×C by using a resistance value R and a capacitance value C. When the resistance value R and the capacitance value C are increased because of the length of an routed wiring, the time constant τ is increased. When the time constant τ is increased, the rise and decay of the pulse P0 are retarded. For example, in a case in which a reached voltage value of rise in predetermined time of a standard pulse is 1 V, if the time constant τ is large, rise is retarded, and the reached voltage value in the same predetermined time is reduced to, for example, 0.8 V. If the same reached voltage value 1 V is required as an output, the predetermined time of the pulse has to be extended.

In a case in which the time constant τ1 of the wiring HT1 is large like the path k1, which passes through the location of the touch drive electrode Tx1 under the above-described worst conditions, the responsiveness of the pulse 460 is reduced upon transmission like the pulse Pa of above-described FIG. 46 (a). More specifically, the rise and decay of the pulse Pa are retarded by the magnitude of the time constant, the time 472 including the rise and the time 473 including the decay becomes longer, and the time 461 corresponding to the pulse cycle becomes longer like the time 471. On the other hand, in a case in which the time constant τM of the wiring HTM is small like the path kM, which passes through the location of the above-described touch drive electrode TxM, the responsiveness of the pulse 460 is good upon transmission like the pulse Pc of above-described FIG. 46 (b) compared with the pulse Pa.

Therefore, in order to ensure sufficient touch detection sensitivity also for the path including the touch drive electrode Tx1 under the above-described worst conditions, the time t0 of the pulse P0 has to be specified in consideration of the time 471 of the pulse Pa of FIG. 46 (a). FIG. 46 (a) shows a pulse 490 having time 491, which has been specified in consideration of the time 471 of the above-described pulse Pa and is longer than the time 471. The time 491, which is the pulse cycle of the pulse 490, includes time 492 including rise and time 493 including decay. In a conventional general design, the time t0 of the pulse P0 is specified in consideration of the time 471 of the above-described pulse Pa in accordance with the time constant of the location under the above-described worst conditions like the time 491 of the above-described pulse 490.

As a result of specifying the time t0 per the above-described pulse P0 in accordance with the time constant of the location of the above-described worst conditions, sufficient touch detection sensitivity is ensured also for the paths including the touch drive electrode Tx1. However, the total touch drive time Tall of FIG. 45 becomes longer. If the pulse 490 having the above-described time 491 is the pulse P0, in a short path including the touch drive electrode TxM like FIG. 46B, the time 491 of the pulse P0 is excessive performance in terms of time.

[(5) Increase in Touch Drive Time Due to Pulse Time Change]

Furthermore, FIGS. 47A and 47B show increase in the total touch drive time Tall in a case in which the time t0 of the pulse P0 is changed to be longer in relation to a sequence of touch drive using the pulse P0 of the touch drive signal St of FIG. 45. FIG. 47A shows total touch drive time TallA in touch drive using a pulse P0a of time ta, which is the same time t0 as that of FIG. 45. The frequency corresponding to the time ta is represented by fa, and the number m of pulses is constant.

On the other hand, FIG. 47B shows total touch drive time TallB of similar touch drive using pulses P0b obtained by changing the time ta of the pulses P0a to longer time tb. A frequency fb of a pulse P0b is lower than the frequency fa of the pulse P0a. According to ta<tb and T=t0×m, touch drive time Ta1 and touch drive time TMa serving as the touch drive time T of the touch drive electrodes Tx of FIG. 47A become longer like touch drive time T1b and touch drive time TMb of FIG. 47B. Because of the total touch drive time Tall≈M×t0×m, TallB>TallA.

As a function according to publicly known techniques about touch-sensor devices, there is a function of changing the time t0 and the frequency f0 of the pulse P0 of the touch drive signal St in accordance with noise detection. In the explanation thereof, this function will be referred to as "pulse changing function". For example, if noise that is synchronized with the frequency f0 of the pulses P0 of the touch drive signal St enters, in other words, if the frequency of the noise and the frequency f0 of the pulses P0 are close to each other, touch detection sensitivity is reduced. Therefore, the touch detection sensitivity can be maintained or improved by changing the time t0 and the frequency f0 of the pulses P0 by using the above-described pulse changing function.

However, for example, if the time t0 of the pulses P0 is changed to be longer like the change from the time ta of the pulses P0a of FIG. 47A to the time tb of the pulses P0b of FIG. 47B by using the above-described pulse changing function, all the touch drive electrodes Tx in the touch detection area As are driven by the same pulses P0b, and longer time is therefore required like the total touch drive time TallB. In other words, the required touch detection period Ks is increased from a touch detection period KsA to a touch detection period KsB as shown in later-described FIG. 49A. As a result, a report rate of touch detection information becomes lower. The report rate referred to herein is a rate which outputs and reports the touch detection information from a touch detection unit, which detects the presence/absence, position, etc. of touch by using the touch detection signals Sr, to outside or a higher-level device. The report rate can be represented by 1/Tall.

In the design of the pulse P0 of the touch drive signal St of the comparative example, the time t0 of the pulse P0 is specified for the location of the worst conditions as described above. Therefore, also in the case in which another function such as the pulse changing function related to a touch-sensor function as described above is desired to be used, allowance in terms of time is reduced. For example, also in a case in which the time t0 of the pulse P0 is changed to be longer by the pulse changing function, it is difficult to ensure a large shift amount from the time ta to the time tb.

[(6) Touch Drive Unit]

Figure 48:
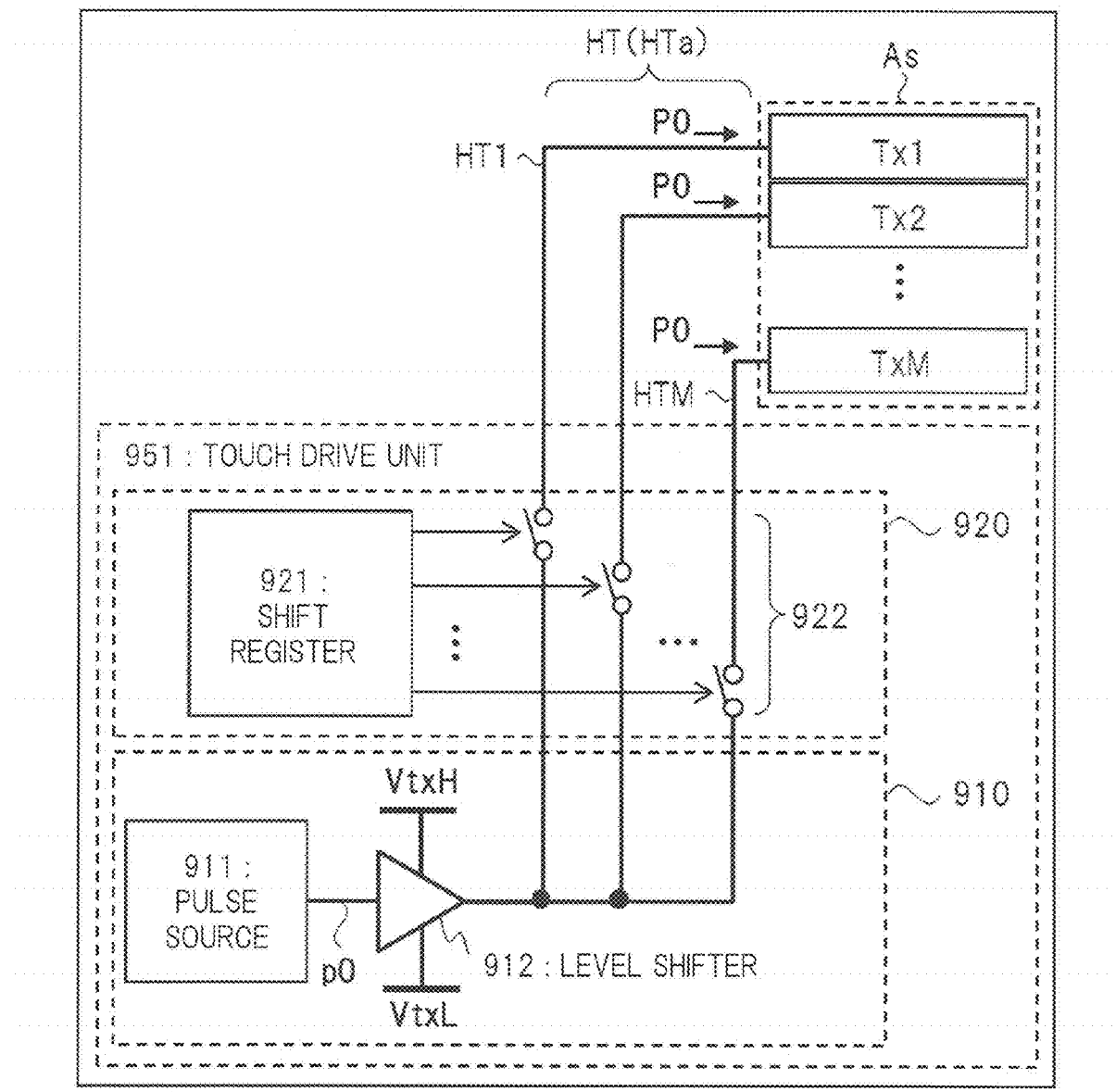
FIG. 48 is a drawing showing a configuration example of a circuit of a touch drive unit in the configuration of FIG. 45.

FIG. 48 shows a configuration example of a touch drive unit 951 mounted on the connecting side part Ac corresponding to the configuration of FIG. 43. FIG. 48 shows a circuit unit corresponding to the wiring part HTa on the left side of FIG. 43; however, the both left and right sides have the configurations similar to each other. The touch drive unit 951 has a pulse generating circuit unit 910 and a scanning circuit unit 920. The pulse generating circuit unit 910 includes a pulse source 911 and a level shifter 912. The scanning circuit unit 920 includes a shift register 921 and switches 922.

The pulse source 911 generates a single source signal p0 serving as a source of the pulses P0 of a single type to the touch drive electrodes Tx and inputs the signal to the level shifter 912. The level shifter 912 converts the voltage level of the source signal p0 and outputs the pulses P0 having a voltage level between a high-voltage-side voltage VtxH and a low-voltage-side voltage VtxL. An output line of the level shifter 912 is coupled to the wiring HT1 to the wiring HTM of the wirings HT. Switches 922 are provided at intermediate positions of the wirings HT. The scanning circuit unit 920 switches the output of the signal from the shift register 921 in accordance with the scanning order of the scanning drive of the plurality of touch drive electrodes Tx and controls on/off of the switches 922. As a result, the m pulses P0 are applied in every scanning of the touch drive electrodes Tx as shown in FIG. 45.

[(7) Drive Period]

Figure 49A:
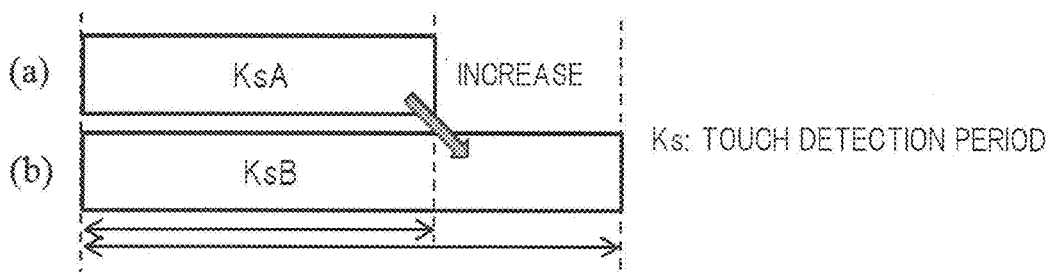
FIG. 49A shows increase in the time of a touch detection period which is a drive period of a touch sensor in the comparative example.
Figure 49B:
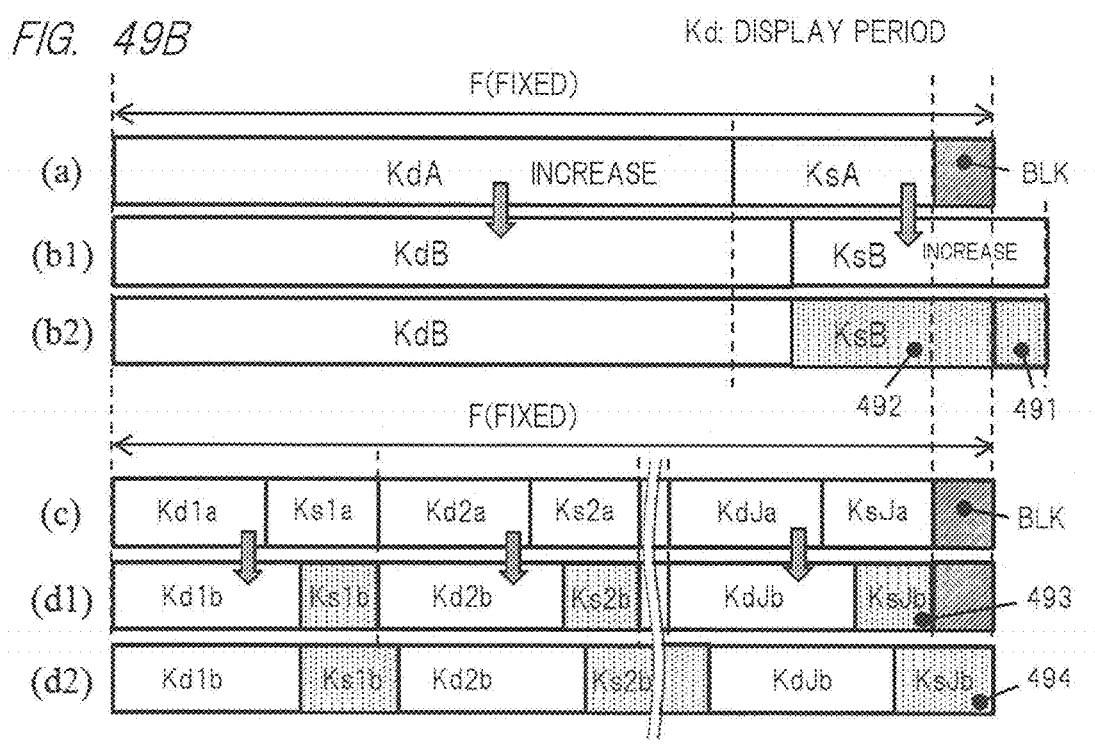
FIG. 49B is a drawing showing increase, etc. of the time of display periods and touch detection periods which are drive periods of the touch-sensor-equipped display device.

FIG. 49A shows an example of increase in the touch detection period Ks, which is a drive period of the case of the touch-sensor device of the comparative example. FIG. 49B shows an example of increase in a display period Kd, which is a drive period of the case of the touch-sensor-equipped display device of the comparative example, and the touch detection period Ks.

In FIG. 49A, (a) in FIG. 49A shows the touch detection period KsA having a length before the increase as the touch detection period Ks required for driving the entirety of the touch detection area As. (b) in FIG. 49A shows the touch detection period KsB of which length has been increased, for example, by increase in the time t0 of the above-described pulse P0 or the number of the electrodes of the touch drive electrodes Tx compared with that of (a) in FIG. 49A. In the case of the touch-sensor device dedicated to a touch-sensor function, basically, since independent from a display function of the display device and the display period thereof, the length of the touch detection period Ks is variable, and the touch detection period KS is efficient and desirable to be short. In a case in which the touch-sensor function and the display function are independently driven in, for example, an on-cell-type liquid-crystal touch panel module, the length of the touch detection period Ks is variable in the same manner as the above-described case of the touch-sensor device. However, as described above, in order to increase, for example, the report rate in order to achieve efficient touch detection, it is desired to shorten the length of the touch detection period Ks.

FIG. 49B shows configuration examples of drive periods in a case of the touch-sensor-equipped display device, which is a combination of the touch-sensor function and the display function, and shows a case of a system in which the touch-sensor function and the display function are driven in synchronization with frame periods in a case of an on-cell-type or in-cell-type liquid-crystal touch panel module. (a) in FIG. 49B shows an example in which the display period Kd and the touch detection period Ks are distributed by time division and subjected to drive in a frame period (assumed to be F) having a fixed length. Particularly, the state before increase serving as a condition is shown by a display period KdA and a touch detection period KsA. The order of the display period Kd and the touch detection period Ks in the frame period F can be reversed. BLK represents unoccupied time excluding the display period Kd and the touch detection period Ls in the frame period F and is the time which has not been originally used. There are a case in which the unoccupied time BLK is present in the frame period F and a case in which the unoccupied time is not present; however, in this case, the case with the unoccupied time is shown.

The frame period F is the time having a fixed length for displaying a 1-frame image in a display area or a screen area by the display function. The display period Kd includes drive time for displaying the 1-frame image such as a pixel writing period of a case of a liquid-crystal display device. For example, the display period Kd having a length required as the display function is ensured in the frame period F, and the touch detection period Ks is ensured by using the time excluding the display period Kd in the frame period F. In the case of the time-division drive system of the display period Kd and the touch detection period Ks as described above, there is an advantage that touch detection in the touch detection period Ks is not easily affected by the noise caused in image display in the display period Kd therebefore.

(b1) in FIG. 49B shows the example in which the display period Kd has been increased with respect to (a) in FIG. 49B. For example, the display period Kd is increased due to screen size expansion, resolution increase, etc. The increased display period is KdB. Since the remaining time is reduced by the amount of the increased display period KdB in the fixed frame period F, only short time can be ensured as the touch detection period Ks.

However, when the touch detection area As is expanded or the number of electrodes of the touch drive electrodes Tx is increased due to screen size expansion, resolution increase, or the like, the length of the touch detection period Ks is also increased like that from the touch detection period KsA to the touch detection period KsB. (b1) in FIG. 49B shows the case in which the total time of the display period KdB and the touch detection period KsB exceeds the time of the frame period F even when, for example, the unoccupied time BLK in the frame period F is utilized for ensuring the necessary touch detection period KsB. Therefore, as shown in (b2) in FIG. 49B, the time 491 exceeding the frame period F cannot be ensured, and the touch detection period KsB is insufficient as shown by the time 492. Although not shown in the drawings, if the touch detection period Ks is increased in the time of the fixed frame period F, only a short display period Kd is ensured in the frame period F, and the display function cannot be achieved (c) in FIG. 49B shows a configuration example of another drive period. (c) in FIG. 49B shows the example in which the display period Kd and the touch detection period Ks are divided into a plurality of (the number is assumed to be J) display periods Kd1$a$ to KdJ$a$ and a plurality of touch detection period Ks1$a$ to touch detection period KsJ$a$ in the fixed frame period F and subjected to drive by time division in the same manner as the case of (a) in FIG. 49B. Also in the case of this system, in the same manner as the case of (b2) in FIG. 49B, when the lengths of the display period Kd1$a$ to the display period KdJ$a$ are increased like a display period Kd1$b$ to a display period KdJ$b$, in order to include the periods in the fixed frame period F, it is difficult to ensure needed time for a touch detection period Ks1$b$ to a touch detection period KsJ$b$. As a result, each of the touch detection periods Ks1$b$ to KsJ$b$ becomes insufficient like the time 493. (d1) in FIG. 49B shows a case in which the unoccupied time BLK is not used.

(d2) in FIG. 49B shows a case in which the unoccupied time BLK is used to ensure the touch detection period Ks1$b$ to the touch detection period KsJ$b$ in the same manner as (d1) in FIG. 49B. However, even when the unoccupied time BLK is distributed, the touch detection period Ks1$b$ to the touch detection period KsJ$b$ are insufficient like time 494.

As described above, in the comparative example, along with increase in the lengths of the display period Kd and the touch detection period Ks, it is difficult to ensure the respective periods in the frame period F having a fixed length.

[(8) Principles of Touch-Sensor Device]

Figure 50A:
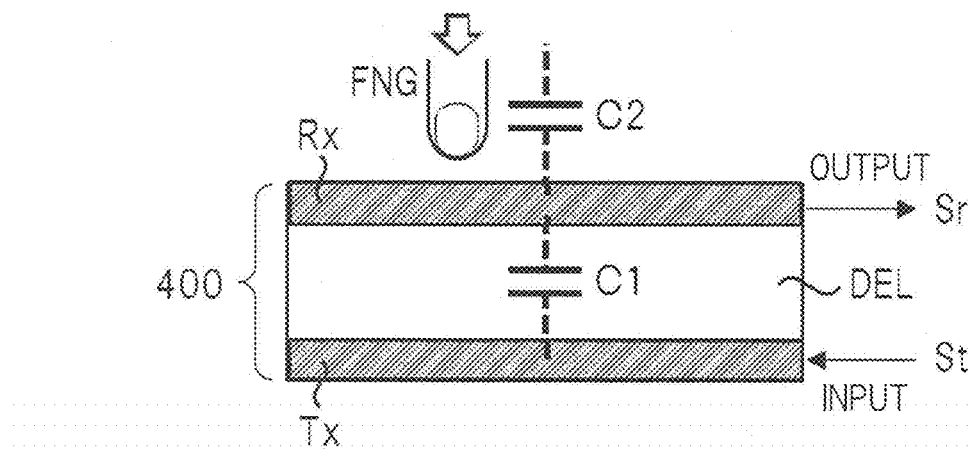
FIG. 50A is a drawing showing a principle of a touch-sensor device of an electrostatic capacitance type in the comparative example.
Figure 50B:
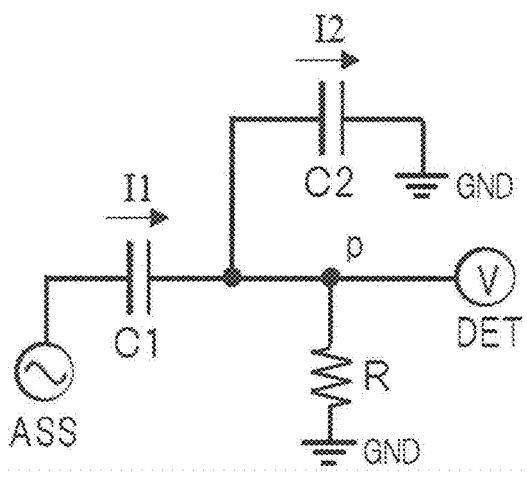
FIG. 50B is a drawing showing a principle of the touch-sensor device of an electrostatic capacitance type in the comparative example.
Figure 50C:
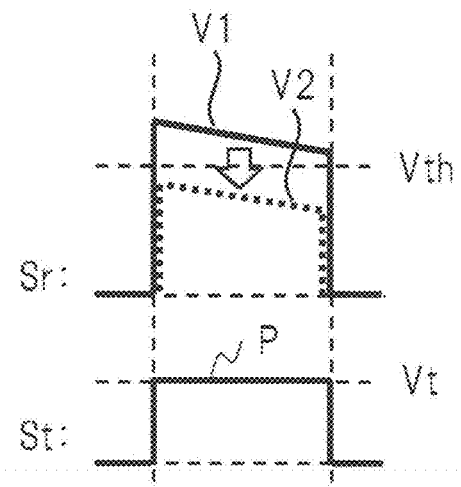
FIG. 50C is a drawing showing a principle of the touch-sensor device of an electrostatic capacitance type in the comparative example.

FIGS. 50A to 50C briefly show the principles of the touch-sensor device of an electrostatic capacitance type as a supplement. FIG. 50A shows a basic structure of a touch-sensor device 400 and a unit of touch detection thereof. FIG. 50B shows an equivalent circuit of the touch-sensor device 400 of FIG. 50A. FIG. 50C shows an example of signals and voltages upon touch drive and touch detection by the touch-sensor device 400 of FIG. 50A and FIG. 50B. In FIG. 50A, in the touch-sensor device 400, the pair of the touch drive electrode Tx and the touch detection electrode Rx disposed with a dielectric substance DEL interposed therebetween forms a capacitor C1 corresponding to the unit of touch detection. The touch-sensor device 400 of the electrostatic capacitance type of FIG. 50A utilizes a change in the capacitor C1 caused when an electrical conductor such as a finger FNG is close to or contacts the surface in the touch detection electrode Rx side to detect a state such as presence/absence of a touch.

The touch drive electrode Tx, which is a first end side of the capacitor C1 of FIG. 50B, is coupled to an alternating-current signal source ASS. A node p, which is coupled to the touch detection electrode Rx which is a second end side of the capacitor C1, is grounded via a resistance R and is coupled to a voltage detector DET. Upon touch drive, the touch drive signal St, which is an input signal, is applied from the alternating-current signal source ASS to the touch drive electrode Tx. With respect to the touch drive signal St, which is the input signal, a current I1 flows via the capacitor C1 of the touch-sensor device 400, and a touch detection signal Sr, which is an output signal, is detected by the voltage detector DET in the touch detection electrode Rx side.

In FIG. 50C, the touch drive signal St, which is the input signal, is a signal employing an alternating-current rectangular wave having a predetermined frequency and voltage Vt. When there is no touch, in other words, when in a state in which the electrical conductor is not closer to or in contact with the touch detection electrode Rx in the front surface side of the touch-sensor device 400, the voltage of the touch detection signal Sr, which is the output signal, is a voltage V1. When there is a touch, in other words, in a state in which the electrical conductor is closer to or in contact with the touch detection electrode Rx in the front surface side of the touch-sensor device 400, the voltage of the touch detection signal Sr, which is the output signal, is a voltage V2.

When there is no touch, as shown in FIG. 50B, along with charge/discharge with respect to the capacitor C1, the current I1 corresponding to the electrostatic capacitance value of the capacitor C1 flows. As a result, the voltage detected by the voltage detector DET is the voltage V1 of FIG. 50C. When there is a touch, as shown in FIG. 50B, a capacitor C2 caused by the electrical conductor is substantially additionally coupled in series with respect to the capacitor C1, and electric fields are correspondingly reduced in the region. In this state, along with charge/discharge with respect to the capacitor C1 and the capacitor C2, the current I1 and the current I2 corresponding to the respective electrostatic capacitance values of the capacitor C1 and the capacitor C2 flow. As a result, the voltage of the node p in the touch detection electrode Rx side is a divided voltage determined by the values of the current I1 and the current I2 corresponding to the respective electrostatic capacitance values of the capacitor C1 and the capacitor C2. At this point, the voltage detected by the voltage detector DET is lower than the voltage V1 of the case with no touch as shown by the voltage V2 of FIG. 50C.

In the voltage detector DET and the circuit of the touch detection unit corresponding thereto, for example, the voltage of the pulse input from the touch detection electrode Rx side is amplified and detected as the touch detection signal Sr. The voltage detector DET and the circuit of the touch detection unit compare the voltage of the touch detection signal Sr with a threshold voltage Vth; and, if the voltage is smaller than the threshold voltage Vth for example like the voltage V2, the above-described state with the touch is detected. Alternatively, the voltage detector DET and the circuit of the touch detection unit compare the amount of change between the voltage V1 and the voltage V2 of the touch detection signal Sr; and, if the amount of change is larger than a predetermined amount, the above-described state with the touch is detected. If the voltages of the pulses of the touch drive signal St and the touch detection signal Sr corresponding thereto are reduced due to a large time constant of a path, it becomes difficult to determine touch detection. If noise is superimposed on a path, determination of touch detection thereof becomes difficult.

Embodiment 1A

Based on the above-described comparative example, a touch-sensor device 1*a*, which is an embodiment 1A of the present invention, will be with reference to FIGS. 1 to 9. The embodiment 1A is a configuration in which a pulse P1 to a pulse PM, which are pulses P of a plurality (the number is M) of types adjusted to have optimum time in accordance with the time constants of wirings HT, are generated respectively for a plurality of touch drive electrodes Tx of a touch detection area As of which wirings HT serving as routed wirings of the touch drive electrodes Tx have different lengths, and the pulses P1 to PM are applied to the touch drive electrodes Tx as touch drive signals St from a circuit of a touch drive unit.

[(1) Panel Unit Plane]

Figure 7:
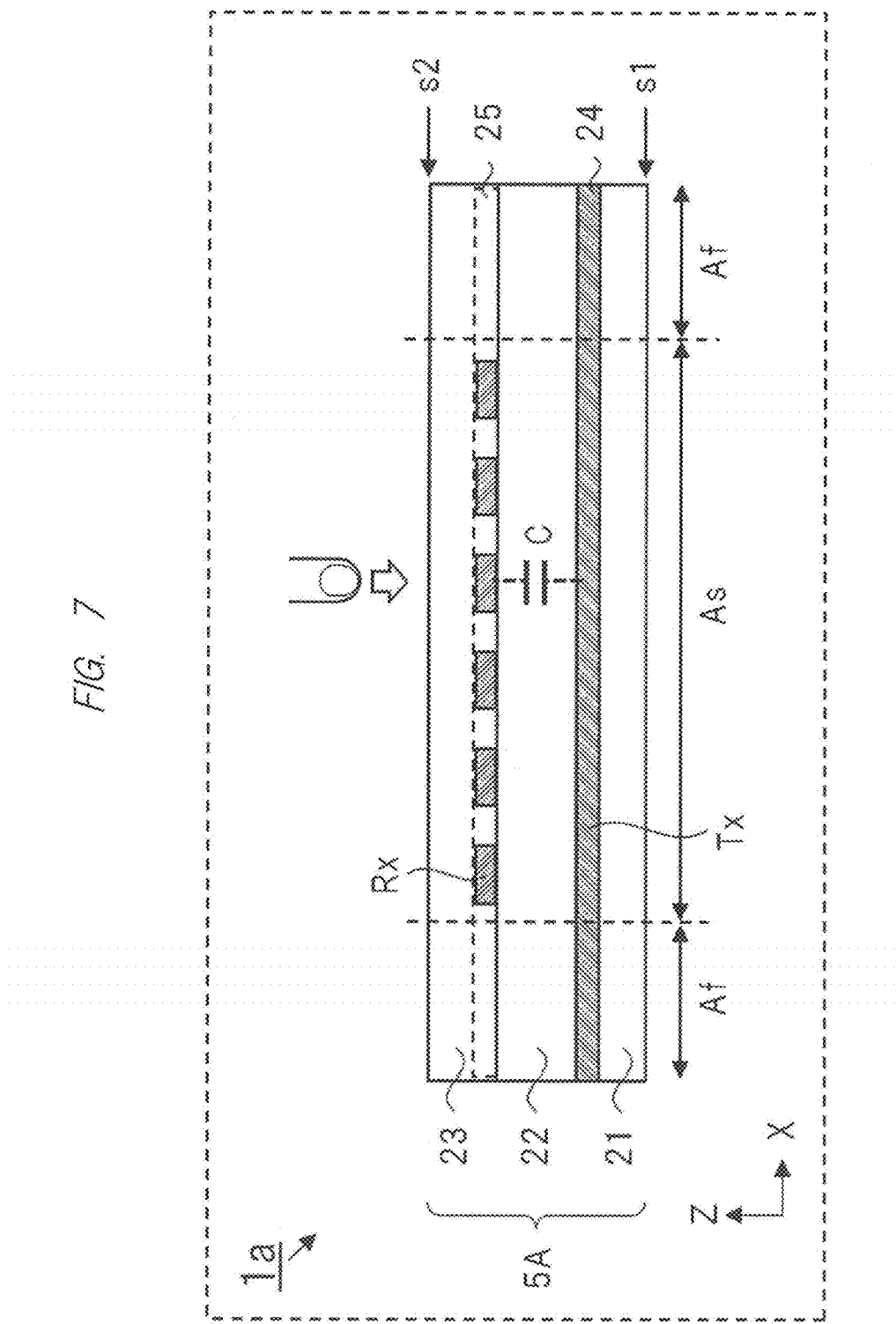
FIG. 7 is a drawing showing a schematic XZ cross section of a panel unit of the touch-sensor device of the embodiment 1A.

FIG. 1 shows a configuration example of an XY-plane including electrodes, wirings, and circuit units as an outline of the touch-sensor device 1*a* of the embodiment 1A. A panel unit 5A of the touch-sensor device 1*a* has the touch detection area As, a peripheral area Af, and a connecting side part Ac in the XY-plane. A cross-sectional configuration of the panel unit 5A is shown by FIG. 7, which will be described later. The panel unit 5A is shown as a rectangle which is long in the Y-direction in the present example.

The panel unit 5A has, in the rectangular surface serving as the touch detection area As, the plurality of touch drive electrodes Tx, which are parallel to the X-direction and juxtaposed in the Y-direction in a first layer that is in the Z-direction, and the plurality of touch detection electrodes Rx, which are parallel to the Y-direction and juxtaposed in the X-direction that is in a second layer in the Z-direction. In the touch detection area As, a plurality of units of touch detection U are formed in matrix by pairs of the plurality of touch drive electrodes Tx and the plurality of touch detection electrodes Rx. In the touch detection area As, the electrode pairs of the touch drive electrodes Tx and the touch detection electrodes Rx are disposed at predetermined distances in the Z-direction and mutually intersect in an XY planar view from the Z-direction. The capacitors formed to correspond to the vicinities of the intersecting parts of the electrode pairs are defined as units of touch detection U. The M touch drive electrodes Tx are shown as a touch drive electrode Tx1, a touch drive electrode Tx2 to a touch drive electrode TxM sequentially from the upper side of the Y-direction. The N touch detection electrodes Rx are shown as a touch detection electrode Rx1, a touch detection electrode Rx2, and a touch detection electrode RxN sequentially from the left side of the X-direction.

The plurality of touch drive electrodes Tx have shapes which are divided into a plurality of blocks in the Y-direction in the rectangle of the touch detection area As. Each of the touch drive electrodes Tx is a block which has a constant width in the Y-direction and is long in the X-direction. The shape of the touch detection electrode Rx is, for example, a line having a constant width in the X-direction, and the width of the line is smaller than the width of the block of the touch drive electrode Tx. The plurality of touch detection electrodes Rx are disposed at constant intervals in the X-direction. "M" which is the number of electrodes of the touch drive electrodes Tx, and "N" which is the number of electrodes of the touch detection electrodes Rx are M=8 and N=8 in the case shown in the present example. The number of electrodes, sizes, and detailed shapes are designed in accordance with mounting.

The connecting side part Ac corresponds to a lower side part in the Y-direction of the rectangle of the panel unit 5A and includes a region in which a circuit unit of a touch-sensor circuit 50, etc. is mounted. A connecting side Sc is a virtual line for the sake of explanation, is an upper side of the rectangle of the connecting side part Ac to which the wirings HT and the wirings HR are coupled, and represents a boundary line with the peripheral area Af. The connecting side Sc roughly shows the positions of connection between ends of the wirings HT and the wirings HR of the peripheral area Af and terminals of the circuit unit in the connecting side part Ac. As the part which are at least supposed to be included as objects of calculations of time constants upon consideration of responsiveness of pulses caused by differences between time constants, the wirings HT and the wirings HR, which are routed wirings of the part to electrode ends of the touch detection area As above the connecting side Sc. In practice, the wirings HT and the wirings HR may be further continuously extended and present in the connecting side part Ac, and the extended wiring part may be included to calculate the time constants in that case.

A touch-sensor circuit 50 mounted in the connecting side part Ac includes a touch drive unit 51 and a touch detection unit 52. The touch drive unit 51 carries out touch drive, which is carried out by scanning drive of sequentially applying the pulses P of the touch drive signals St to the plurality of touch drive electrodes Tx of the touch detection area As through the wirings HT. The pulses P, which are from the plurality of touch detection electrodes Rx of the touch detection area As, are input to the touch detection unit 52 through the wirings HR, and the touch detection unit 52 detects the pulses as touch detection signals Sr.

In the panel unit 5A, in terms of mounting, as shown in FIG. 7 described later, the touch drive electrodes Tx and the touch detection electrodes Rx are present in mutually different layers in the Z-direction. Correspondingly, in the connecting side part Ac, the touch drive unit 51 and the touch detection unit 52 of the touch-sensor circuit 50 may be mounted, for example, in mutually different layers in the Z-direction. For example, the touch drive unit 51 and the touch detection unit 52 of the touch-sensor circuit 50 can be mounted in the form of an IC chip on a glass substrate or a flexible printed board.

The peripheral area Af is a peripheral area including upper, lower, left, and right regions in the X-direction and the Y-direction with respect to the touch detection area As and is also referred to as a frame part. The peripheral area Af has the wirings HT, which are first routed wirings formed in a left side part and a right side part serving as X-direction left/right regions, and the wirings HR, which are second routed wirings formed in a lower side part serving as a Y-direction lower region. The plurality of wirings HT connect the plurality of touch drive electrodes Tx in the touch detection area As and the touch drive unit 51 in the connecting side part Ac. The wirings HT are linearly extended in the Y-direction from the connecting side Sc, bent in the X-direction, and coupled to ends of the touch drive electrodes Tx respectively corresponding to the wirings HT. The M wirings HT are shown as a wiring HT1, a wiring HT2, . . . , and a wiring HTM sequentially from the upper side in the Y-direction.

The plurality of wirings HR mutually connect the plurality of touch detection electrodes Rx in the touch detection area As and the touch detection unit 52 in the connecting side part Ac. The wirings HR are linearly extended in the Y direction from the connecting side Sc and are coupled to ends of the touch detection electrodes Rx respectively corresponding to the wirings HR. The N wirings HR are shown as a wiring HR1, a wiring HR2, to a wiring HRN sequentially from the left side in the X-direction.

In the embodiment 1A, as the wirings HT of the touch drive electrodes Tx, a left-side wiring part HTa is provided in the region of a left side part which is in the X-direction left side in the peripheral area Af, and a right-side wiring part HTb is provided in the region of a right side part. The wiring part HTa and the wiring part HTb have a left/right symmetric shape. The wirings HT are coupled to ends on both X-direction left/right sides of the blocks of the touch drive electrodes Tx, respectively. Each wiring HT of the wiring part HTa is coupled to the left-side end of the block of the touch drive electrode Tx, and each wiring HT of the wiring part HTb is coupled to the right-side end thereof. The left/right two wirings HT coupled to the same touch drive electrode Tx have the same length to the connecting side Sc.

The pulses P of the touch drive signals St of each of the touch drive electrodes Tx from the touch drive unit 51 are simultaneously applied to the electrode from the left/right both side ends of the touch drive electrode Tx through the wiring part HTa and the wiring part HTb in the left/right. The touch drive electrodes Tx and the touch detection electrodes Rx in the left-side region from the X-direction center of the touch detection area As use the touch detection signals Sr using the pulses P from the left-side wiring part HTa, and the touch drive electrodes Tx and the touch detection electrodes Rx in the right-side region use the touch detection signals Sr using the pulses P from the right-side wiring part HTb. Touch detection sensitivity can be improved by the configuration in which the pulses P are applied from the left and the right to each of the touch drive electrodes Tx in the above-described manner.

FIG. 1 shows the configuration in which the pulse P1 to the pulse PM, which are the pulses P of the plurality of (M) types adjusted in accordance with a time constant τ1 to a time constant τM, which are time constants τ of the M wirings HT, are applied as the touch drive signals St with respect to the touch drive electrodes Tx from the touch drive unit 51. As the time constants τ of the wirings HT, for example, the time constant τ1 is used for the wiring HT, a time constant τ2 is used for the wiring HT2, and the time constant τM is used for the wiring HTM. The time constants τ are different depending on the lengths of the wirings HT in the peripheral area Af and are represented by τ1>τ2> . . . >τM. At the touch drive electrode Tx1 most distant from the circuit of the connecting side Sc or the touch drive unit 51, the time constant τ1 of the wiring HT1 is relatively the largest; and, at the closest touch drive electrode TxM, the time constant τM of the wiring HTM is relatively the smallest.

Figure 3:
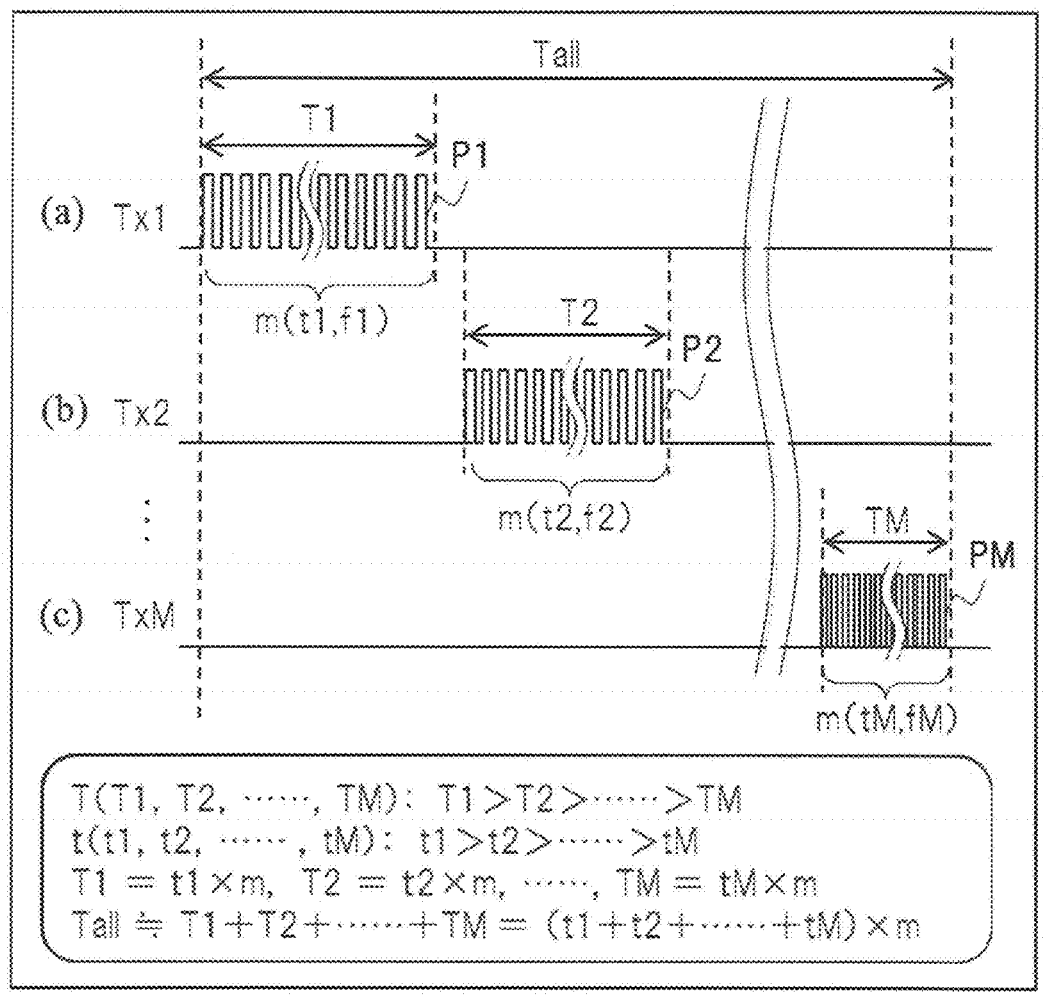
FIG. 3 is a drawing showing a touch drive sequence example of the embodiment 1A.

In the embodiment 1A, the touch drive unit 51 generates the pulse P1 to the pulse PM, which are the pulses P of the plurality of (M) types corresponding to M which is the number of electrodes of the touch drive electrodes Tx and the number of scanning, as the pulses P of the touch drive signals St. For example, the pulse P1 applied to the touch drive electrode Tx1 has time t1 adjusted to correspond to the time constant τ1 of the wiring HT1 as shown in FIG. 3, which will be described later. The pulse P2 to the touch drive electrode Tx2 has time t2 corresponding to the time constant τ2 of the wiring HT2. Similarly, the pulse PM to the touch drive electrode TxM has time tM corresponding to the time constant τM of the wiring HTM. The time t1 to the time tM, which is the time t of the pulses P, is represented by t1>t2> . . . >tM.

Upon scanning drive of the touch drive electrode Tx1 to the touch drive electrode TxM, which are the plurality of touch drive electrodes Tx of the touch detection area As, the touch drive unit 51 generates the pulse P1 to the pulse PM, which are the pulses P of which time t has been optimally adjusted, in accordance with the time constants in the paths including the wirings HT to the touch drive electrodes Tx, which are scanning objects, as the touch drive signals St. Then, the touch drive unit 51 applies the pulse P1 to the pulse PM to the touch drive electrodes Tx sequentially through the wirings HT, respectively.

[(2) Paths, Time Constants, and Pulses]

Figure 2:
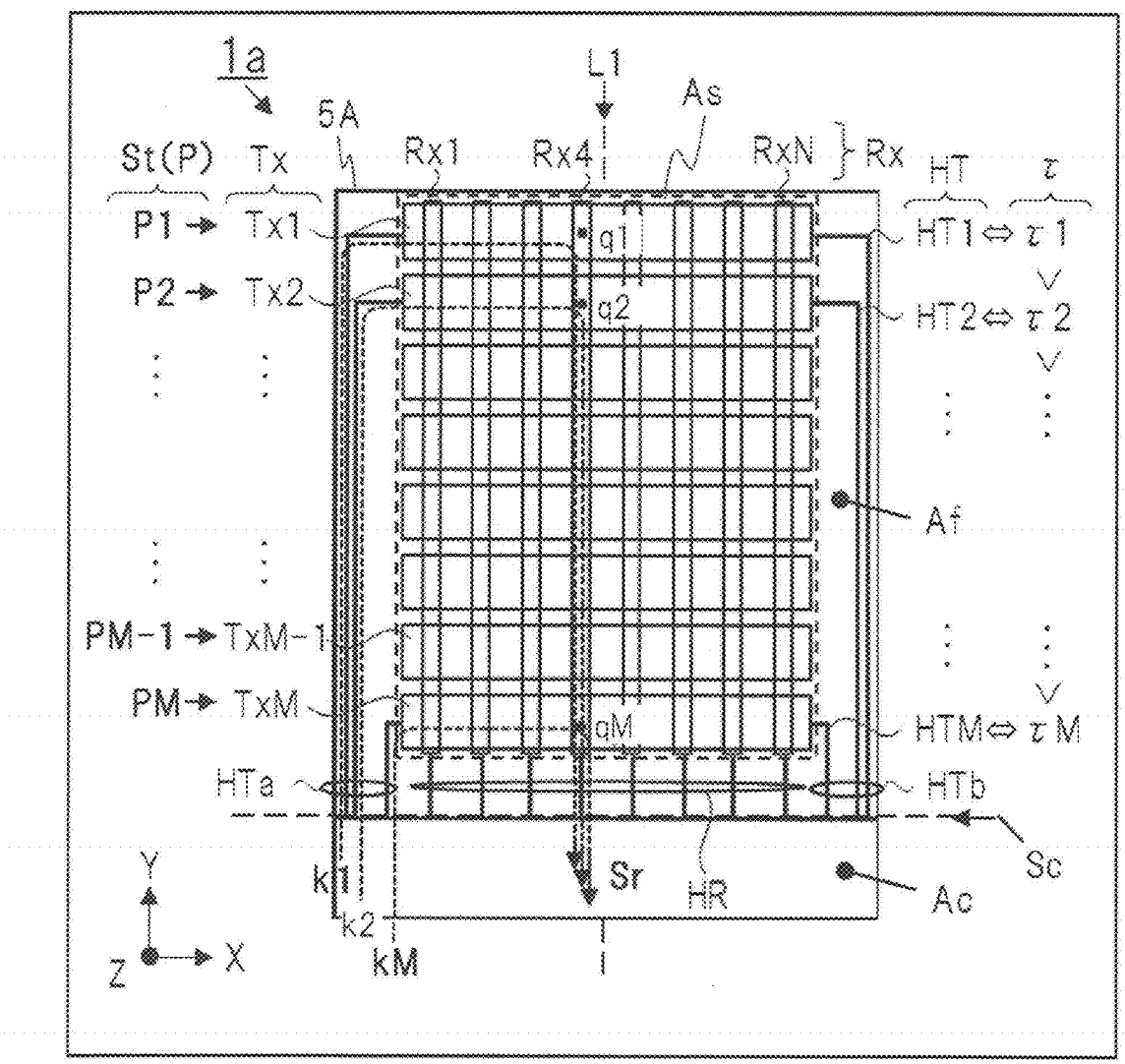
FIG. 2 is a drawing showing a configuration example of paths, time constants, pulses, etc. including the wirings of the embodiment 1A.

FIG. 2 shows a configuration example of paths including the electrodes and wirings, the time constants, the pulses P of the touch drive signals St corresponding to the configuration of FIG. 1. In order to facilitate understanding, part of wirings, etc. are arbitrarily omitted in the illustration. As the touch drive electrodes Tx, the touch drive electrode Tx1 is the most distant from the connecting side Sc, and the touch drive electrode TxM is the closest to the connecting side Sc. The touch drive electrode Tx2 is the second most distant from the connecting side Sc. A line L1 represents an X-direction center line in the touch detection area As. A point q1, a point q2, and a point qM show positions in the vicinities of the X-direction center line L1 and, in this case, show examples of the units of touch detection U at positions of the touch detection electrode Rx4. For example, the point q1 corresponds to the unit of touch detection U formed to correspond to the intersecting part of the touch drive electrode Tx1 and the touch detection electrode Rx4.

Since the pulses P are applied to each of the touch drive electrodes Tx from the left and right, the paths that pass through the units of touch detection U at the X-direction near intermediate positions of the touch drive electrodes Tx are the longest. In the region on the left side of the line L1 of the touch detection area As, the paths using the pulses P applied from the left-side ends of the touch drive electrodes Tx are shorter than the paths using the pulses P applied from the right-side ends of the touch drive electrodes Tx. Since shorter paths have better responsiveness, in the region on the left side of the line L1 of the touch detection area As uses the pulses P applied from the left-side ends of the touch drive electrodes Tx. Similarly, in the region on the right side of the line L1 in the touch detection area As, the paths using the pulses P applied from the right-side ends of the touch drive electrodes Tx are shorter than the paths using the pulses P applied from the left-side ends of the touch drive electrodes Tx. In the region on the right side of the line L1 of the touch detection area As, the pulses P applied from the right-side ends of the touch drive electrodes Tx are used. As described above, in the entire touch detection area As, the paths which pass through the units of touch detection U at the X-direction near intermediate positions are the longest.

A path k1, a path k2, and a path kM are examples of the paths from and to the connecting side Sc including the wirings Ht and the wirings Hr through which the pulses P of the touch drive signals St are transmitted. For example, the path k1 is, sequentially, the wiring HT1, the touch drive electrode Tx1, the point q1, the touch detection electrode Rx4, and the wiring HR4. The path k2 is, sequentially, the wiring HT2, the touch drive electrode Tx2, the point q2, and the wiring detection electrode Rx4. The path kM is, sequentially, the wiring HTM, the touch drive electrode TxM, the point qM, the touch detection electrode Rx4, and the wiring HR4.

Among the wirings HT, for example, the wirings HT1 on the left and right of the touch drive electrodes Tx1 are the longest and have the large time constants τ1, and the wirings HTM on the left and right of the touch drive electrode Tx are the shortest and have the small time constant τM. In the same manner as the above-described case of the time constants of the wiring units, among the path k1, the path k2, and the path kM, the path k1 which passes through the point q1 of the touch drive electrode Tx1 is the longest and has the large time constant, and the path kM which passes through the point qM of the touch drive electrode TxM is the shortest and has the small time constant. In other words, the path k1 including the wiring HT1 and the touch drive electrode Tx1 is the part having the relatively largest time constant having the worst conditions of the time constants, and the path kM including the wiring HTM and the touch drive electrode TxM is the part where performance is excessive with the pulse P0 of the above-described comparative example.

Therefore, in the embodiment 1A, corresponding to the time constants τ of the wirings HT, the time t of the pulse P1 to the pulse PM, which are the pulses P to the respective touch drive electrodes Tx, is adjusted to the optimum lengths like the time t1 to the time tM of FIG. 3, which will be described later. As the time t having the optimum lengths, the adjustment is carried out so that the pulses having sufficient magnitudes and touch detection sensitivity can be ensured, for example, as the touch detection signals Sr of the touch detection unit 52.

[(3) Touch Drive Sequence]

FIG. 3 shows a sequence example of touch drive by scanning drive from the touch drive unit 51 with respect to the touch drive electrodes Tx of the touch detection area As. Upon the scanning drive with respect to the touch drive electrodes Tx of the touch detection area As, as the touch drive signals St, the touch drive unit 51 applies the pulses P of different types associated respectively with the touch drive electrodes Tx, for example, sequentially from the touch drive electrode Tx in the Y-direction upper side, i.e., sequentially to the touch drive electrode Tx1, the touch drive electrode Tx2, . . . , the touch drive electrode TxM−1, and the touch drive electrode TxM. The pulses P of the types respectively associated with the touch drive electrodes Tx are shown as the pulse P1, the pulse P2, . . . , the pulse PM−1, and the pulse PM. The time t of the pulse P1 to the pulse PM is shown as the time t1 to the time tM. The time t is a pulse cycle, and a frequency f is f=1/t. The frequencies f of the pulse P1 to the pulse PM are shown as a frequency f1 to a frequency fM. Also, in order to increase touch detection sensitivity, the m pulses P of the frequency f associated with each electrode are applied to the single touch drive electrode Tx in each scanning.

(a) in FIG. 3 shows the pulses P1 of the touch drive signal St for the touch drive electrode Tx1, which is a first scanning object, and the touch drive time T1 of the touch drive electrode Tx1. The pulses P1 have the time t1 and the frequency f1 specified based on the time constant τ1 of the wiring HT1. The touch drive time T1 is t1×m.

Similarly, (b) in FIG. 3 shows the pulses P2 to the touch drive electrode Tx2 of a second scanning object and touch drive time T2. The pulses P2 have the time t2 and the frequency f2 specified based on the time constant τ1 of the wiring HT2. The time t2 of the pulses P2 is shorter than the time t1 of the pulses P1. The frequency f2 of the pulse P2 is lower than the frequency f1 of the pulses P1. The touch drive time T2 is t2×m, where T1>T2.

Similarly, (c) in FIG. 3 shows the pulses PM to the touch drive electrode TxM, which is an Mth scanning object, and the touch drive time TM. The pulses PM have the time tM and the frequency fM specified based on the time constant τM of the wiring HTM. The pulses PM have the shortest time tM and the lowest frequency fM among the pulses P of the plurality of (M) types. The touch drive time TM is tM×m, where T1>T2> . . . >TM.

The total touch drive time Tall in the touch detection area As is Tall≈T1+T2+ . . . +TM=(t1+t2+ . . . +tM)×m. The closer the touch drive electrode Tx to the connecting side Sc, the shorter the time t for driving the pulses P compared with the comparative example, and the shorter the touch drive time T.

As shown in FIG. 3, etc., as effects brought about by the touch-sensor device 1a of the embodiment 1A, the total touch drive time Tall and the touch detection period Ks can be shortened or increase thereof can be suppressed compared with the comparative example by the optimum design of the time t of the pulses P of the touch drive signals St corresponding to the time constant τ of the above-described wiring HT.

[(4) Touch Drive Signal Pulse]

Figure 4:
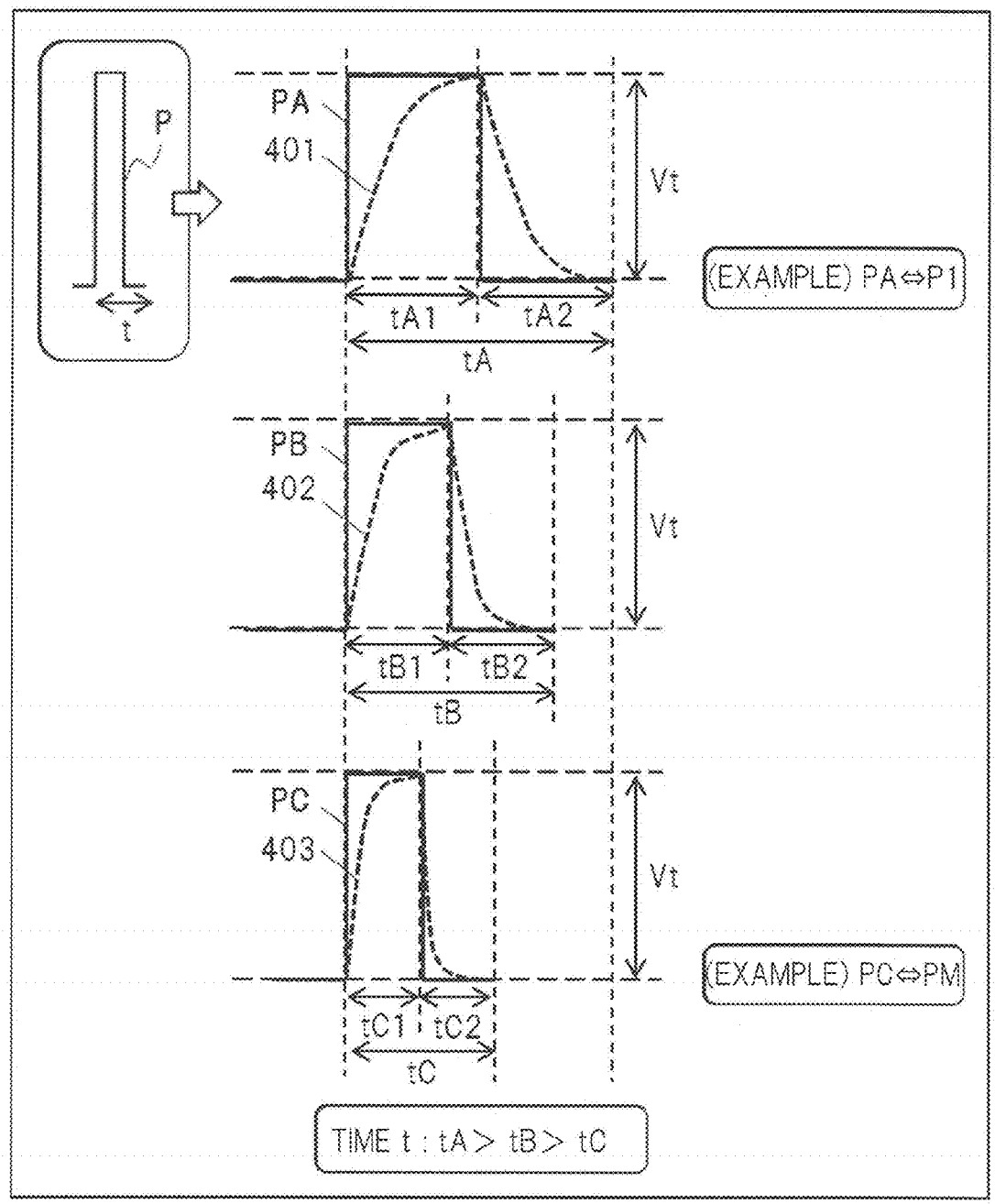
FIG. 4 is a drawing showing an example of pulses of touch drive signals of the embodiment 1A, an embodiment 1B, etc.

FIG. 4 shows details of the pulses P of the above-described touch drive signals St. A pulse PA, a pulse PB, and a pulse PC show examples of the pulses P of three types of which time t has been changed to correspond to differences in the time constants based on differences in the lengths of the wirings and paths. The pulse PA, the pulse PB, and the pulse PC show ideal rectangular waves corresponding to the states thereof generated by the touch drive unit 51. A pulse 401, a pulse 402, and a pulse 403, which are shown in combination, briefly show states in which responsiveness has been reduced due to transmission. The pulses P generated and output from the touch drive unit 51 are specified by the time t, voltages Vt, etc. The time t is a pulse cycle, and the frequency f is f=l/t.

The pulse PA has time tA corresponding to the pulse cycle. In the time tA, time tA1 is the time corresponding to a pulse width including rise time, and time tA2 is the time including decay time. The time tA is tA=tA1+tA2. Similarly, the pulse PB has time tB, where tB=tB1+tB2. Similarly, the pulse PC has time tC, where tC=tC1+tC2. The time t has a relation of tA>tB>tC.

In the embodiment 1A, for example, the pulse PA is used as the pulse P1 for the touch drive electrode Tx1 which is the above-described part of the worst conditions, and the pulse PC is used as the pulse PM for the touch drive electrode TxM which is the above-described part of excessive performance. The time tA of the pulse PA is adjusted to correspond to the time constant τ1 of the wiring HT1, and the time tC of the pulse PC is adjusted to correspond to the time constant τM of the wiring HTM. As a result, also for the part close to the connecting side Sc like the touch drive electrode Tx, efficient touch drive and touch detection can be achieved by the time tC shorter than the time tA without causing excessive performance.

[(5) First Configuration Example of Touch Drive Unit]

Figure 5:
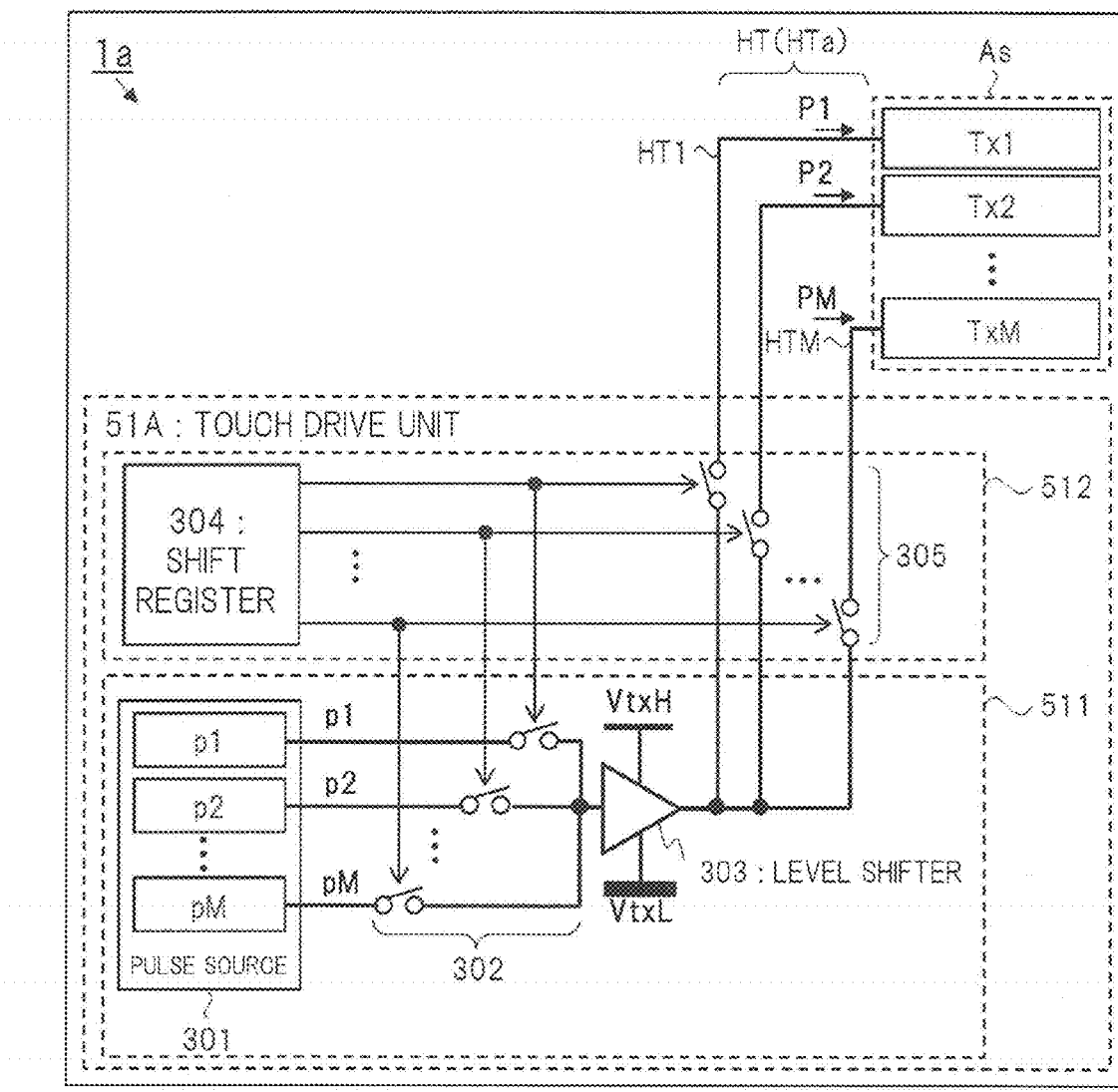
FIG. 5 is a drawing showing a configuration example of a circuit of a touch drive unit of the embodiment 1A.

Corresponding to the configuration of FIG. 1, FIG. 5 shows a touch drive unit 51A, which is a first configuration example of the touch drive unit 51. The touch drive unit 51A generates the pulse P1 to the pulse PM, which are the pulses P of the above-described plurality of (M) types, and applies the pulses to the touch drive electrodes Tx, which are the scanning objects in the touch detection area As. FIG. 5 shows a circuit unit corresponding to the wiring part HTa on the left side of FIG. 1; however, both the left/right sides have similar configurations. The configuration of the touch drive unit 51A is different from the configuration of the touch drive unit 951 of the comparative example shown in FIG. 48 and prepares a plurality of (M) source signals as input signals to a level shifter.

The touch drive unit 51A has a pulse generating circuit unit 511 and a scanning circuit unit 512. The pulse generating circuit unit 511 includes a pulse source 301, switches 302, and the level shifter 303. The scanning circuit unit 512 includes a shift register 304 and switches 305.

The pulse generating circuit unit 511 generates the pulse P1 to the pulse PM, which are the pulses P of the plurality of (M) types of the touch drive signals St for the touch drive electrodes Tx. The scanning circuit unit 512 applies the pulse P1 to the pulse PM, which have been generated in the pulse generating circuit unit 511, to the touch drive electrodes Tx, which are the scanning objects, through the wirings HT in accordance with control of predetermined scanning drive like above-described FIG. 3.

The pulse source 301 generates a source signal p1 to a source signal pM, which are a plurality of source signals serving as sources of the pulse P to the pulse PM. The source signal p1 to the source signal pM are input to the level shifter 303 through lines having the switches 302. The shift register 304 switches on and off of the switches 302 and on and off of the switches 305 by signals of shift output in accordance with the control of predetermined scanning drive as shown in above-described FIG. 3. The source signal selected by switching of the switches 302 is input to the level shifter 303. The level shifter 303 converts the voltage of the input source signal and outputs the pulse P having a voltage level between a high-voltage-side voltage VtxH and a low-voltage-side voltage VtxL. An output line of the level shifter 303 is coupled to the wiring HT1 to the wiring HTM of the wirings HT. The switches 305 are provided at intermediate positions of the wirings HT.

In accordance with the scanning order of the touch drive electrodes Tx, the scanning circuit unit 512 switches the output of the signal from the shift register 304 and switches on and off of the switches 302 and on and off of the switches 305 so that the pulses P of the type corresponding to each of the touch drive electrodes Tx of the scanning object are selected by the signal. As a result, the pulses P of the m types respectively corresponding to the scanning of the touch drive electrodes Tx as shown in FIG. 3 are applied through the wirings HT.

The embodiment 1A has the configuration in which the pulse P1 to the pulse PM, which are the pulses P of the plurality of (M) types, and the touch drive electrode Tx1 to the touch drive electrode TxM, which are the M touch drive electrodes Tx, have one-to-one correspondence relation. The configuration is not limited to this, and switching, etc. by the scanning circuit unit 512 can enable a configuration in which the pulses are applied by an arbitrary correspondence relation of the pulses P and the touch drive electrodes Tx. For example, the touch drive unit 51 may be configured to generate the pulses P of the types fewer than M, which is the number of the touch drive electrodes Tx, and apply the arbitrarily selected pulses P to each of the touch drive electrodes Tx. A later-described embodiment 1B shows such a configuration example. For example, the touch drive unit 51 may be configured to generate the pulses P of the types more than M, which is the number of electrodes of the touch drive electrodes Tx, and apply the arbitrarily selected pulses P to each of the touch drive electrodes Tx.

The source signal p1 to the source signal pM, which are the plurality of source signals of the pulse sources 301, may be variably generated by a circuit, etc. which divide the frequency of the pulses generated from a single signal source.

[(6) Second Configuration Example of Touch Drive Unit]

Figure 6:
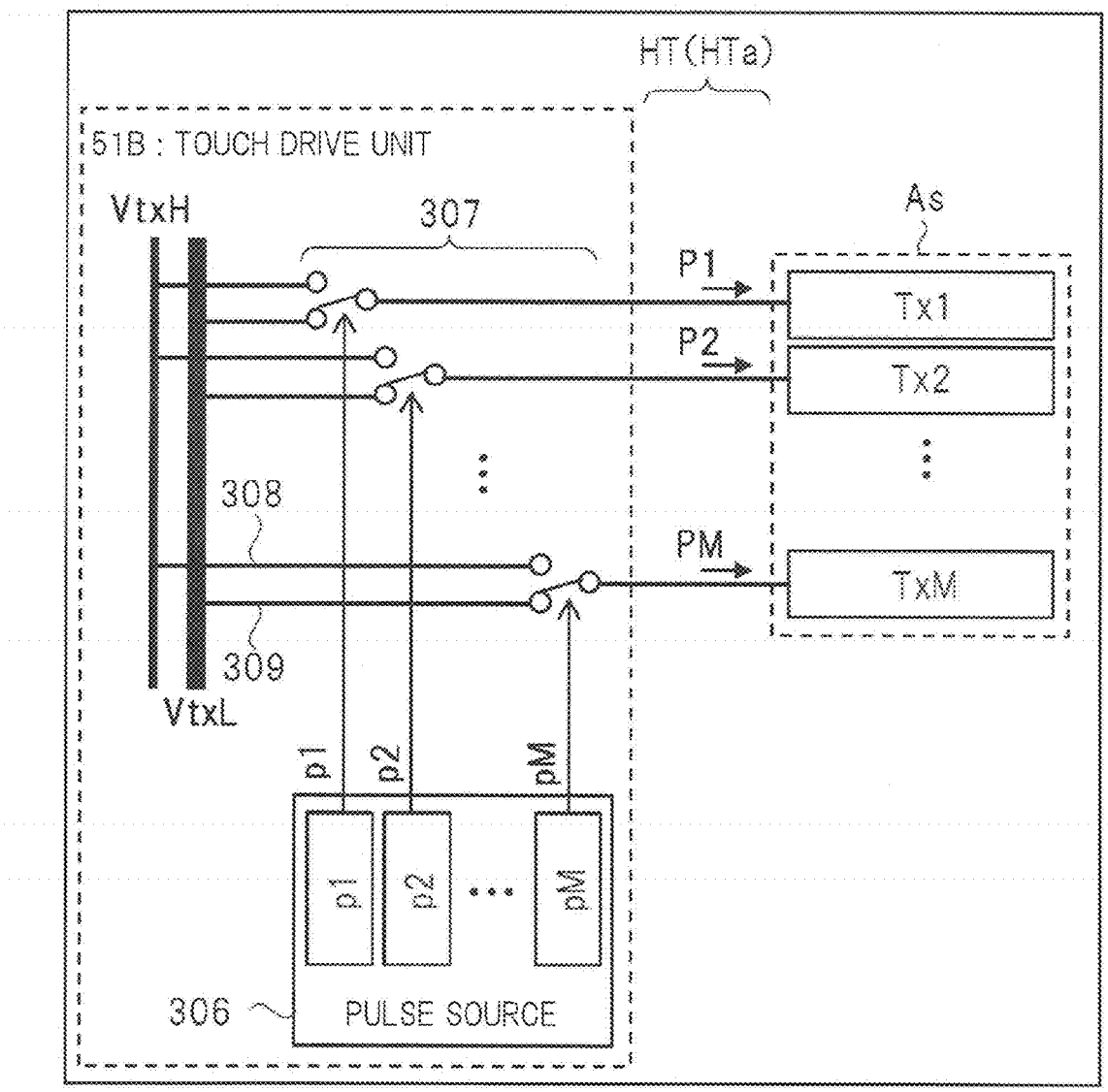
FIG. 6 is a drawing showing a configuration example of the circuit of the touch drive unit as a modification example of the embodiment 1A.

FIG. 6 shows a touch drive unit 51B, which is a second configuration example serving as a modification example of the above-described touch drive unit 51A. Different from the configuration in which the voltage levels of the pulses P are controlled by using the level shifter 303 like the touch drive unit 51A, the touch drive unit 51B has a configuration in which outputs of a high-voltage-side voltage VtxH and a low-voltage-side voltage VtxL are subjected to switch control by a source signal p1 to a source signal pM, which are a plurality of source signals from a pulse source 306.

The touch drive unit 51B has a configuration including: the pulse source 306; lines 308 coupled to the high-voltage-side voltage VtxH, which is a voltage source; lines 309 coupled to the low-voltage-side voltage VtxL; and switches 307 coupled to the line 308 of the above-described high-voltage-side voltage VtxH and the line 309 of the low-voltage-side voltage VtxL for each wiring HT.

In accordance with control of predetermined scanning drive, the touch drive unit 51B switches the input from the lines 308 of the high-voltage-side voltage VtxH of the switches 307 at first ends of the wirings HT and the input from the lines 309 of the low-voltage-side voltage VtxL by the source signal p1 to the source signal pM. The source signal p1 to the source signal pM are switch control signals of the switches 307. As a result, the m pulses P caused by alternate switching of the high-voltage-side voltage VtxH and the low-voltage-side voltage VtxL selected and output by the switches 307 are applied to the touch drive electrode Tx of the scanning object through the wiring HT.

[(7) Panel Unit Cross Section]

FIG. 7 shows a schematic XZ cross-sectional view of particularly the panel unit 5A of the touch-sensor device 1a of the embodiment 1A. The panel unit 5A has a configuration in which a board layer 21, a touch drive electrode layer 24, a dielectric layer 22, a touch detection electrode layer 25, and a protective layer 23 are stacked sequentially from the lower side in the Z-direction. C represents a capacitor which is the unit of touch detection U formed by the intersecting part of the electrode pair of the touch drive electrode Tx and the touch detection electrode Rx. s1 is a rear surface of the panel unit 5A, and s2 is a front surface which is the touch object of the panel unit 5A.

Various insulating materials such as glass and plastic can be applied to the board layer 21, the dielectric layer 22, and the protective layer 23. Particularly in a case of the touch-sensor device for a display device, the board layer 21, the dielectric layer 22, and the protective layer 23 are mainly composed of a visible-light permeable material.

The touch drive electrode layer 24 is a layer in which a pattern of the touch drive electrodes Tx is formed. The touch detection electrode layer 25 is a layer in which a pattern of the touch detection electrodes Rx is formed. The touch drive electrode layer 24 and the touch detection electrode layer 25 can be composed of various electrically conductive materials. Particularly in the case of the touch-sensor device for the display device, the touch drive electrodes 24 and the touch detection electrodes 25 are mainly composed of a visible-light permeable material such as indium tin oxide (ITO: Indium Tin Oxide). The touch drive electrode layer Tx and the touch detection electrodes Rx are not limited to ITO, but may be composed of, for example, a metal material having a resistance lower than that of ITO or may be composed of a combination of ITO and a metal material. The touch drive electrode layer 24 includes a part at which the above-described wirings HT formed in the peripheral area Af and the touch drive electrodes Tx are coupled to each other. The touch detection electrode layer 25 includes a part at which the above-described wirings HR formed in the peripheral area Af and the touch detection electrodes Rx are coupled to each other.

[(8) Configuration Example of Electrodes]

FIG. 8A shows a configuration example of an XY plane including electrode shapes of the touch drive electrodes Tx and the touch detection electrodes Rx of the panel unit 5A. FIG. 8B shows a configuration example of a matrix of the units of touch detection U of the touch detection area As corresponding to FIG. 8A. In FIG. 8A, the touch drive electrode Tx is a block having a constant Y-direction width h1 and has slits between the electrode and adjacent blocks. The touch detection electrode Rx has a configuration which is branched into, for example, three Y-direction lines such as a line a, a line b, and a line c in the touch detection area As for each wiring HR coupled to the voltage detector, etc. on the touch detection unit 52 side. Therefore, the intersecting part of the electrode pair of the touch drive electrode Tx and the touch detection electrode Rx constituting the unit of touch detection U has opening regions in an XY planar view. In the present configuration example, since many electric force lines are generated in the opening regions, sensitivity of touch detection is high. The wirings HT and the wirings HR are composed of, for example, a low-resistance metal material. The form (aspect) of connection between the touch drive electrodes Tx and the wirings HT is, for example, a form in which ends of the wirings HT are stacked in the Z-direction at the ends of the touch drive electrodes Tx.

In FIG. 8B, the intersecting parts of the electrode pairs of the touch drive electrodes Tx and the touch detection electrodes Rx form the plurality of units of touch detection U such as a unit of touch detection U11, a unit of touch detection U12, etc. In the plane of the touch detection area As, the unit of touch detection U11, the unit of touch detection U12, etc. are disposed like a matrix. The configuration example of FIG. 8B shows an example in which, for example, the regions corresponding to the units of touch detection U are roughly square, and the center points of the squares are disposed at equal intervals in the X-direction and the Y-direction. In the case of the touch-sensor-equipped display device, which will be described later, the touch detection area As and a display area Ad are overlapped with each other, and the matrix of the units of touch detection U of the electrode pairs of the touch drive electrodes Tx and the touch detection electrodes Rx is configured to correspond to a matrix of pixels of the display area Ad. The matrix of the units of touch detection U is formed, for example, at a rate by which each of the units of touch detection U is overlapped with a plurality of pixels in the X-direction and the Y-direction.

The invention is not limited to the configuration example of above-described FIG. 8, and various modification examples can be employed. For example, as a shape in which the outer peripheries of the lines of the single touch detection electrode Rx are closed, a shape having a plurality of openings in the inside of the outer peripheries may be employed. For example, a shape having line segments coupled in the X-direction at the three line a to line c of FIG. 8A may be used. Also, a shape in which the block of the single touch drive electrode Tx is branched into a plurality of lines parallel to the X-direction may be employed. Also, the shapes are not limited to the blocks and lines having constant widths, and shapes which are changed so that the width and area of each of the intersecting parts of the touch drive electrodes Tx and the touch detection electrodes Rx of the units of touch detection U are relatively increased may be employed. The touch drive electrodes Tx or the touch detection electrodes Rx may have shapes like comb teeth. For example, each of the unit of touch detection U may have an electrode part bulging in the X-direction from the lines of the touch detection electrodes Rx extending in the Y-direction. The shape of the bulging electrode part may be a line segment, a rectangle, an opening-equipped rectangle, etc.

[(9) Touch Panel Module and Electronic Device]

Figure 9:
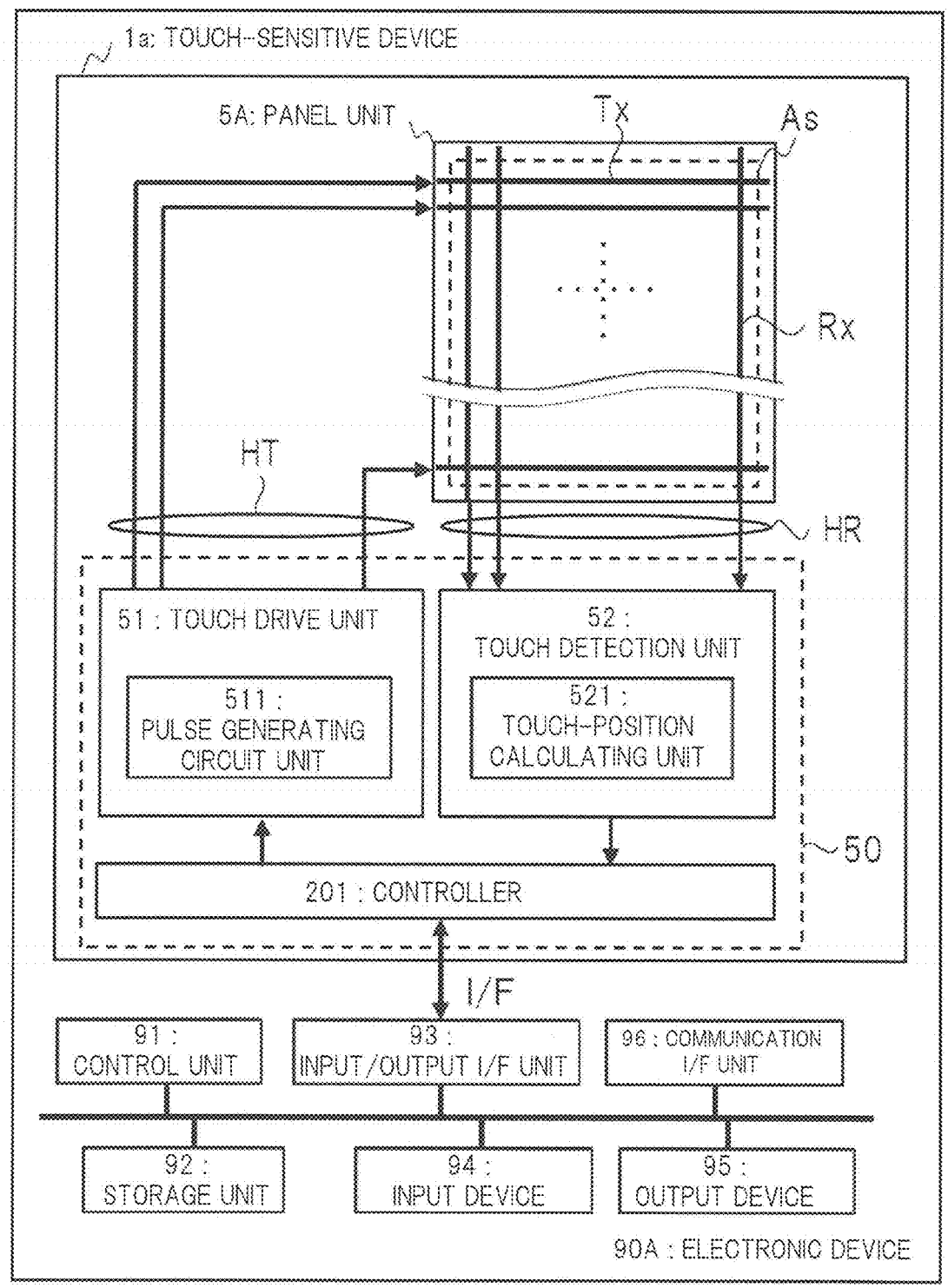
FIG. 9 is a drawing showing a configuration of an entire module of the touch-sensor device of the embodiment 1A and a configuration of an electronic device provided with the module.

FIG. 9 shows a configuration including functional blocks of the touch-sensor device 1a of the embodiment 1A and a configuration of an electronic device 90A provided with the touch-sensor device 1a. The touch panel module, which is the touch-sensor device 1a, has the above-described panel unit 5A and the touch-sensor circuit 50. The touch-sensor circuit 50 has the above-described touch drive unit 51, the touch detection unit 52, and a controller 201. The touch drive unit 51 includes the above-described pulse generating circuit unit 511, etc. The touch detection unit 52 includes a touch-position calculating part 521, etc.

The controller 201 is a control unit of the touch-sensor device 1a, works together with a control unit 91 of the electronic device 90A, which is a higher-level device, via an input/output I/F part 93 and controls a touch-sensor function based on instructions from the control unit 91. Here, I/F is an abbreviation of "interface". The controller 201 gives control instructions of touch drive unit 51 and receives touch detection information such as the presence/absence, position, etc. of touch from the touch detection unit 52. Also, the controller 201 transmits the touch detection information as a report to the control unit 91. The controller 201 may be provided with the touch-position calculating part 521, etc., or the controller 201 may be omitted and integrated with the touch detection unit 52.

Based on the control instructions from the controller 201, the touch drive unit 51 generates the pulses P of the above-described touch drive signals St and carries out scanning drive with respect to the touch drive electrodes Tx through the wirings HT. The touch detection unit 52 detects the pulses, which are input through the wirings HR from the touch detection electrodes Rx, as the touch detection signals Sr. The touch detection unit 52 is configured to include, for example, an amplifier, an analog/digital converter, etc.; and the touch detection unit 52 receives input of pulses from the touch detection electrodes Rx, amplifies them, and subjects them to analog/digital conversion to acquire digital signals. The touch-position calculating part 521 calculates the detailed presence/absence, position, etc. of touch in the touch detection area As by using the plurality of touch detection signals Sr and outputs touch detection information, which is the result of the calculation. The touch position can be calculated with finer accuracy than that of the matrix of the units of touch detection U, for example, by a publicly known calculation process using a plurality of signals corresponding to the matrix of the units of touch detection U as shown in FIG. 8B.

The electronic device 90A includes: the touch panel module, which is the touch-sensor device 1a; the control unit 91; a storage unit 92; the input/output I/F unit 93; an input device 94; an output device 95; a communication I/F unit 96; buses; other unshown power-source part, etc.

The control unit 91 is composed of, for example, a CPU, a ROM, a RAM and a program which operate thereon, etc. For example, the CPU carries out control processing of the electronic device 90A by arithmetic processing in accordance with the program loaded from the ROM to the RAM. The storage part 92 is composed of a primary memory, a secondary memory, data information stored therein, etc. The input/output I/F unit 93 is coupled to the touch-sensor device 1a and carries out interface processing thereof. The input device 94 is composed of key buttons, an interface processing part thereof, etc., but can be omitted. The output device 95 is composed of a display device, an interface processing part thereof, etc., but can be omitted. The communication I/F part 96 is composed of a board, which carries out communication interface processing, etc., but can be omitted.

Embodiment 1B

Figure 10:
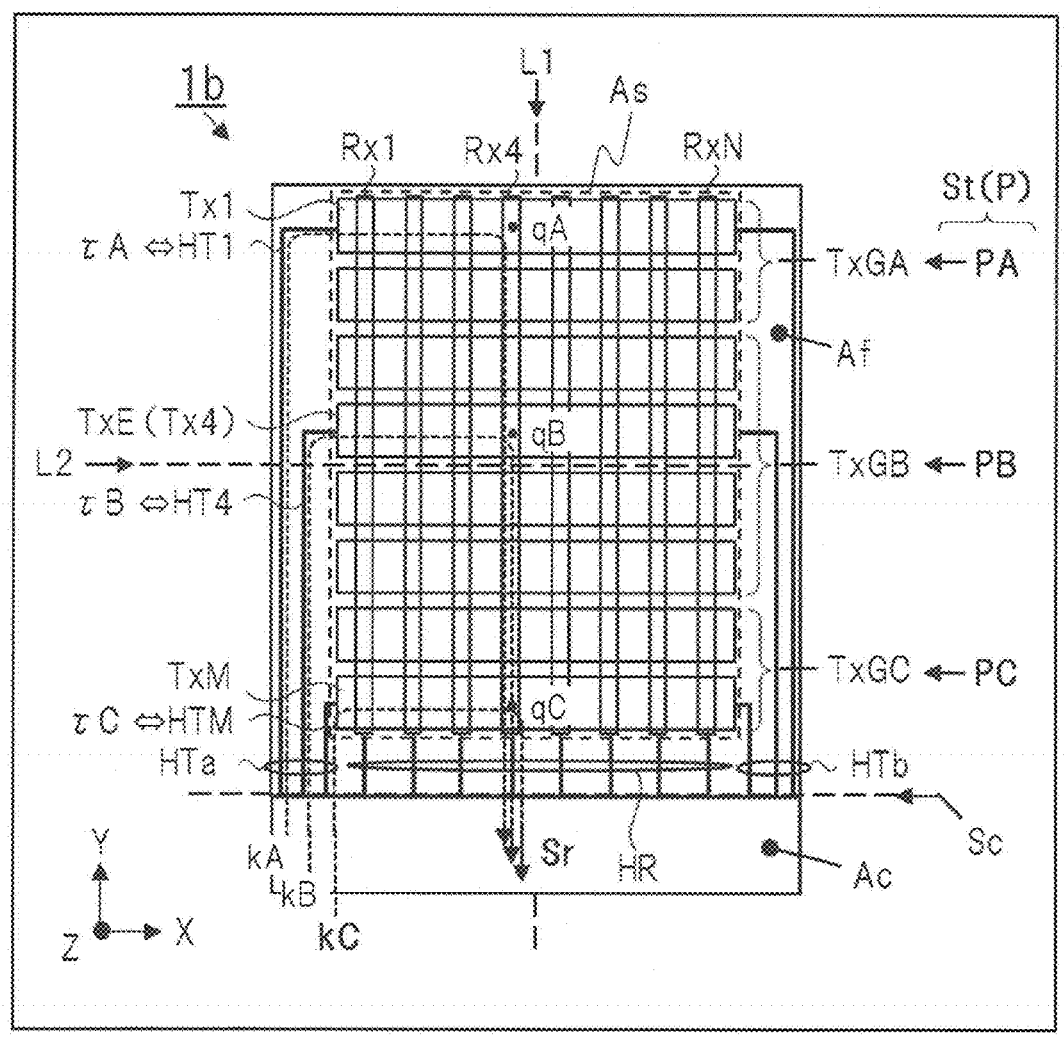
FIG. 10 is a drawing showing a configuration example of an XY-plane including electrodes and wirings of a touch-sensor device of an embodiment 1B of the present invention.

FIG. 10 shows a configuration of an XY-plane of a touch-sensor device 1b of an embodiment 1B. The embodiment 1B has a configuration in which, as the pulses P of the plurality of types generated from the touch drive unit 51, pulses P of types fewer than M which is the number of electrodes and the number of scanning of the above-described touch drive electrodes Tx are generated and applied to each of groups of the touch drive electrodes Tx in the touch detection area As. Each of the groups of the touch drive electrodes Tx composed of one or more of the touch drive electrodes Tx is represented by TxG.

In the example of FIG. 10, as the types of the pulses P, as shown in FIG. 4 described above, pulses PA, pulses PB, and pulses PC, which are the pulses P of three types of which time t has a relation of, for example, tA>tB>tC. Corresponding to this, the plurality of touch drive electrodes Tx in the touch detection area As are divided into a group TxGA, a group TxGB, and a group TxGC, i.e., three groups. For example, the Y-direction upper-side group TxGA is composed of the touch drive electrode Tx1 and the touch drive electrode Tx2. The Y-direction intermediate group TxGB is composed of the touch drive electrode Tx3 to the touch drive electrode Tx6. The Y-direction lower-side group TxGC is composed of the touch drive electrode Tx7 and the touch drive electrode Tx8.

From the touch drive unit 51, the pulses PA, the pulses PB and the pulses PC, which are the above-described pulses P of the three types are applied to the touch drive electrodes Tx of the groups associated with the respective types of the pulses P. More specifically, for example, the touch drive unit 51 applies the pulses PA sequentially to the touch drive electrodes Tx of the group TxGA, then applies the pulses PB sequentially to the touch drive electrodes Tx of the group TxGB, and then applies the pulses PC sequentially to the touch drive electrodes Tx of the group TxGC.

As the touch drive electrodes Tx, the touch drive electrode Tx1 is the most distant from the connecting side Sc, and the touch drive electrode TxM is the closest to the connecting side Sc. The touch drive electrode TxE represents the touch drive electrode Tx at a position in the vicinity of a Y-direction center line L2 of the touch detection area As and, in this case, represents the touch drive electrode Tx4. A point qA, a point qB, and a point qC represent positions in the vicinities of the X-direction center line L1 of the touch detection area As, and this case shows an example in which the points are at the positions corresponding to the units of touch detection U when they are on the touch detection electrode Rx4. When the time constants τ of the wiring HT1, the wiring HT4, and the wiring HTM, which are the wirings HT of the touch drive electrode Tx1, the touch drive electrode TxE, and the touch drive electrode TxM are a time constant τA, a time constant τB, and a time constant τC, τA>τB>τC is satisfied.

A path kA represents a path in an order of the wiring HT1, the touch drive electrode Tx1, the point qA, the touch detection electrode Rx4, and the wiring HR4. A path kB represents a path in an order of the wiring HT4, the touch drive electrode TxE, the point qB, the touch detection electrode Rx4, and the wiring HR4. A path kC represents a path in an order of the wiring HTM, the touch drive electrode TxM, the point qC, the touch detection electrode Rx4, and the wiring HR4. The touch drive unit 51 generates the pulses PA, the pulses PB, and the pulses PC, which are the pulses P of the three types having the mutually different time tA, time tB, and time tC of above-described FIG. 4 adjusted, for example, in accordance with the time constant τA of the wiring HT1, the time constant τB of the wiring HT4, and the time constant τC of the wiring HTM.

Figure 11:
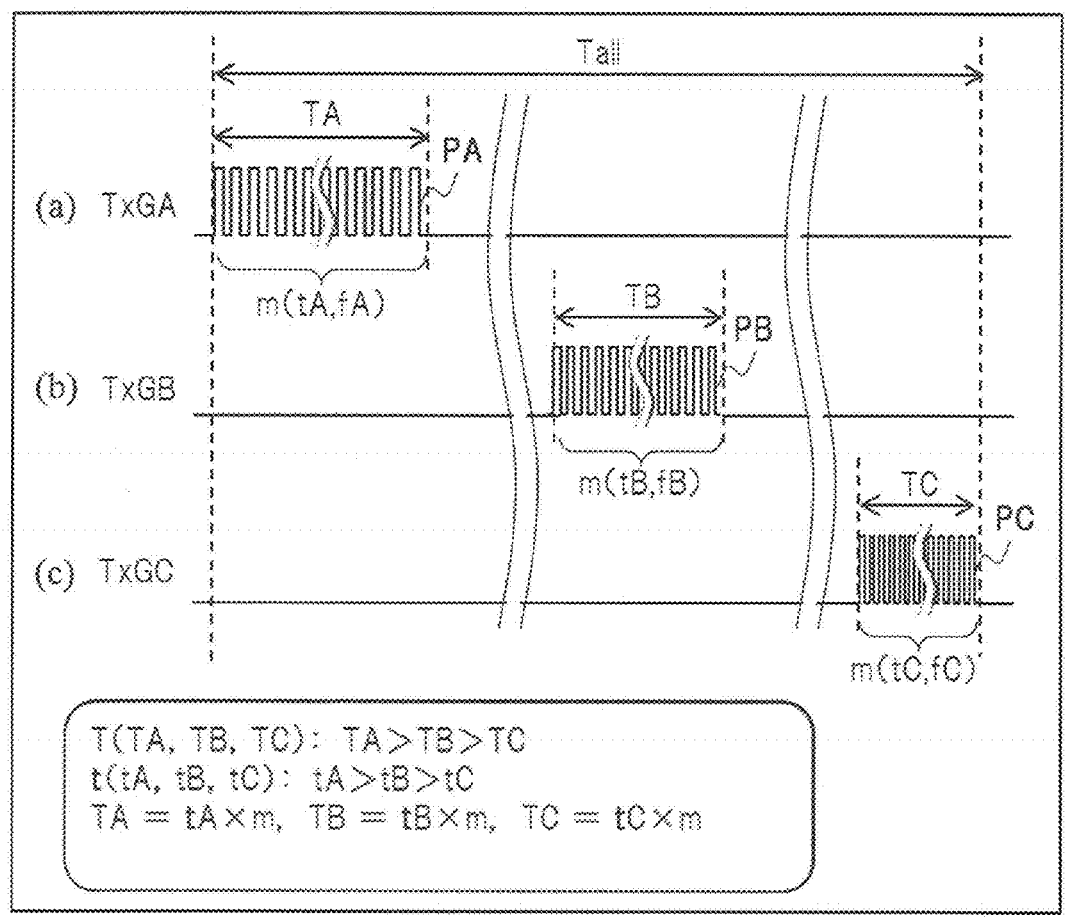
FIG. 11 is a drawing showing a touch drive sequence example of the embodiment 1B.

FIG. 11 shows a sequence example of touch drive by scanning drive of the touch drive electrodes Tx of the touch detection area As corresponding to the configuration of FIG. 10. (a) in FIG. 11 shows the pulses PA and touch drive time TA of the touch drive signal St for each of the touch drive electrodes Tx of the group TxGA. Similarly, (b) in FIG. 11 shows the pulses PB and touch drive time TB for each of the touch drive electrodes Tx of the group TxGB. (c) in FIG. 11 shows the pulses PC and touch drive time TC for each of the touch drive electrodes Tx of the group TxGC. In the case of the pulses PA for the group TxGA, TA=tA×m. In the case of the pulses PB for the group TxGB, TB=tB×m. In the case of the pulses PC for the group TxGC, TC=tC×m. According to the relation of tA>tB>tC, TA>TB>TC. The total touch drive time Tall is the sum in accordance with the multiplication of the number of electrodes of the touch derive electrodes Tx of each group associated with the type of the pulses P and the touch drive time T and is, in the present example, Tall≈TA×2+TB×4+TC×2=(tA×2+tB×4+tC×2)×m. Note that, in (a) to (c) of FIG. 11, fA, fB and fC denote a frequency of the pulse, respectively.

As shown in FIG. 11, as an effect brought about by the touch-sensor device 1b of the embodiment 1B, in the same manner as the embodiment 1A, the total touch drive time Tall and the touch detection period Ks can be shortened or increase thereof can be suppressed compared with the comparative example. Moreover, in the embodiment 1B, compared with the embodiment 1A, the number of the types of the pulses P generated by the touch drive unit 51 is smaller; therefore, the circuit configuration of the touch drive unit 51 can be comparatively simplified. Note that the types of the pulses P and the configuration of the groups of the touch drive electrodes Tx are not limited to three types.

Embodiment 1C

Figure 12:
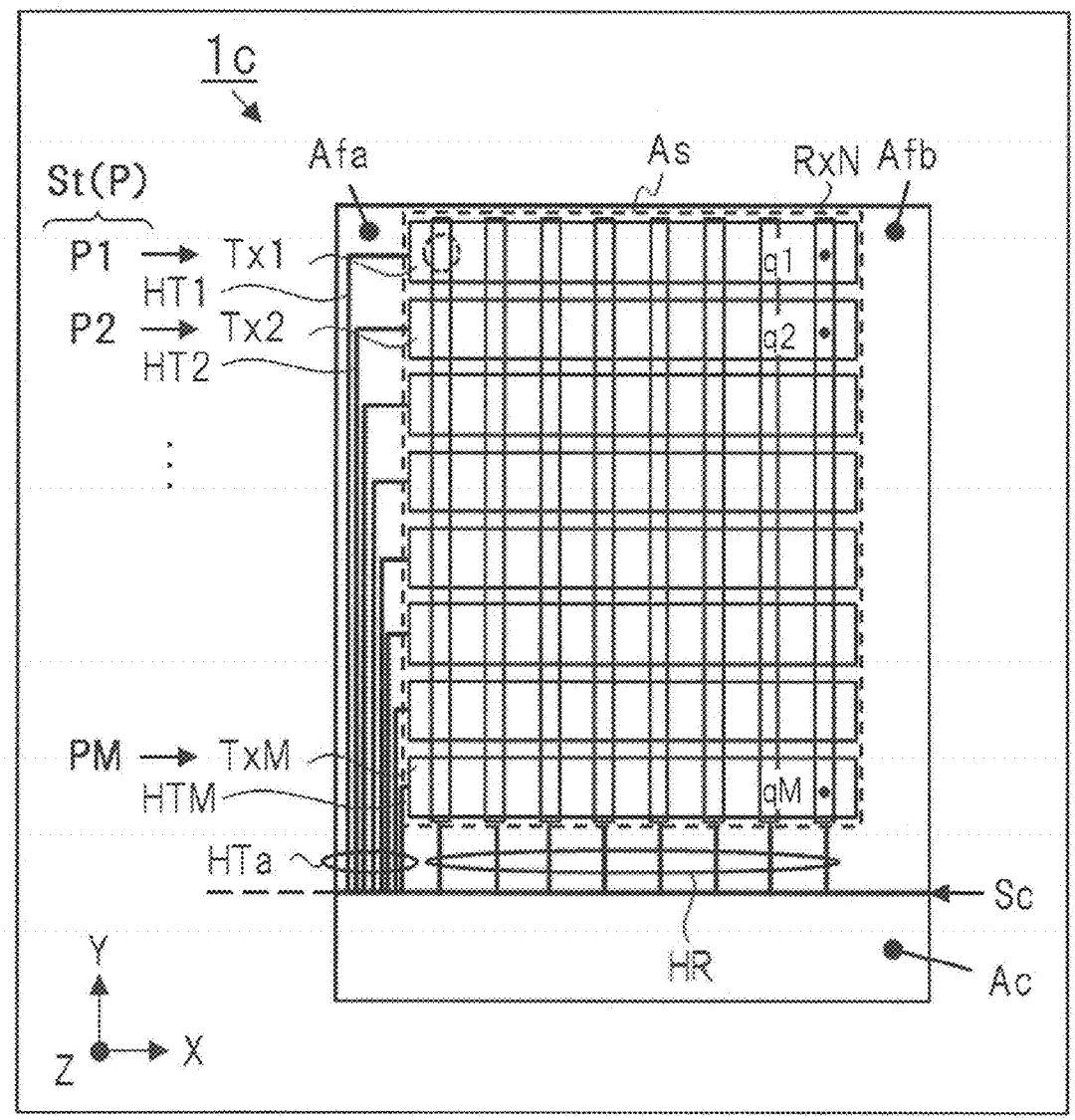
FIG. 12 is a drawing showing a configuration example of an XY-plane of a touch-sensor device of an embodiment 1C of the present invention.

FIG. 12 shows a configuration of an XY-plane of a touch-sensor device 1c of an embodiment 1C. The embodiment 1C has a configuration in which the wirings HT of the touch drive electrodes Tx of the panel unit 5A are provided only on one side of the X-direction left/right regions of the peripheral area Af. The wirings HT are provided as the wiring part HTa, for example, only in a region Afa, which is a left side part of the peripheral area Af. Since the wirings HT are not provided in a region Afb, which is on the right side of the peripheral area Af, the X-direction width of the region Afb may be reduced. The wiring HT of the wiring part HTa is coupled only to a left-side end of each of the touch drive electrodes Tx, and the pulses P of the touch drive signals St are applied thereto only from the left-side end. The pulses P applied from the left-side end of the touch drive electrode Tx are transmitted to a right-side end thereof.

In the embodiment 1C, for example in the same manner as the embodiment 1A, the pulse P1 to the pulse PM, which are the pulses P of the plurality of (M) types of which time t has been adjusted in accordance with the time constants τ of the wirings HT of the left-side wiring part HTa, are generated as the touch drive signals St from the touch drive unit 51. The touch drive unit 51 applies the pulses P of the plurality of (M) types sequentially from the touch drive electrode Tx1 in the Y-direction upper side of the touch detection area As through the wiring part HTa. The point q1, the point q2, and the point qM are examples of the positions corresponding to the units of touch detection U on the paths, which include the wirings HT of the wiring part HTa and have mutually different time constants. Particularly, the point q1, the point q2, and the point qM represent examples of the positions on the detection electrode RxN including long overall paths in the X-direction right side of the touch detection area As.

Since the pulses P are applied to each of the touch drive electrodes Tx only from the left side, the paths which pass through the above-described positions of the touch detection electrode RxN are the longest. For example, a path which passes through the wiring HT1, the touch drive electrode Tx1, and the point q1 and a path which passes through the wiring HTM, the touch drive electrode TxM, and the point qM have mutually different time constants in accordance with the lengths of the wirings HT of the wiring part HTa. Therefore, in the present embodiment 1C, the time t of the pulses P are adjusted like t1>tM in accordance with the difference in the time constants of the wirings HT of the wiring part HTa.

As an effect brought about by the touch-sensor device 1c of the embodiment 1C, in the same manner as the embodiment 1A, the total touch drive time Tall and the touch detection period Ks can be shortened or increase thereof can be suppressed compared with the comparative example. Moreover, in the case of the embodiment 1C, reduction of the X-direction width without providing the wirings HT in the region Afb in the right side of the peripheral area Af contributes to downsizing of the touch-sensor device.

Embodiment 1D

Figure 13:
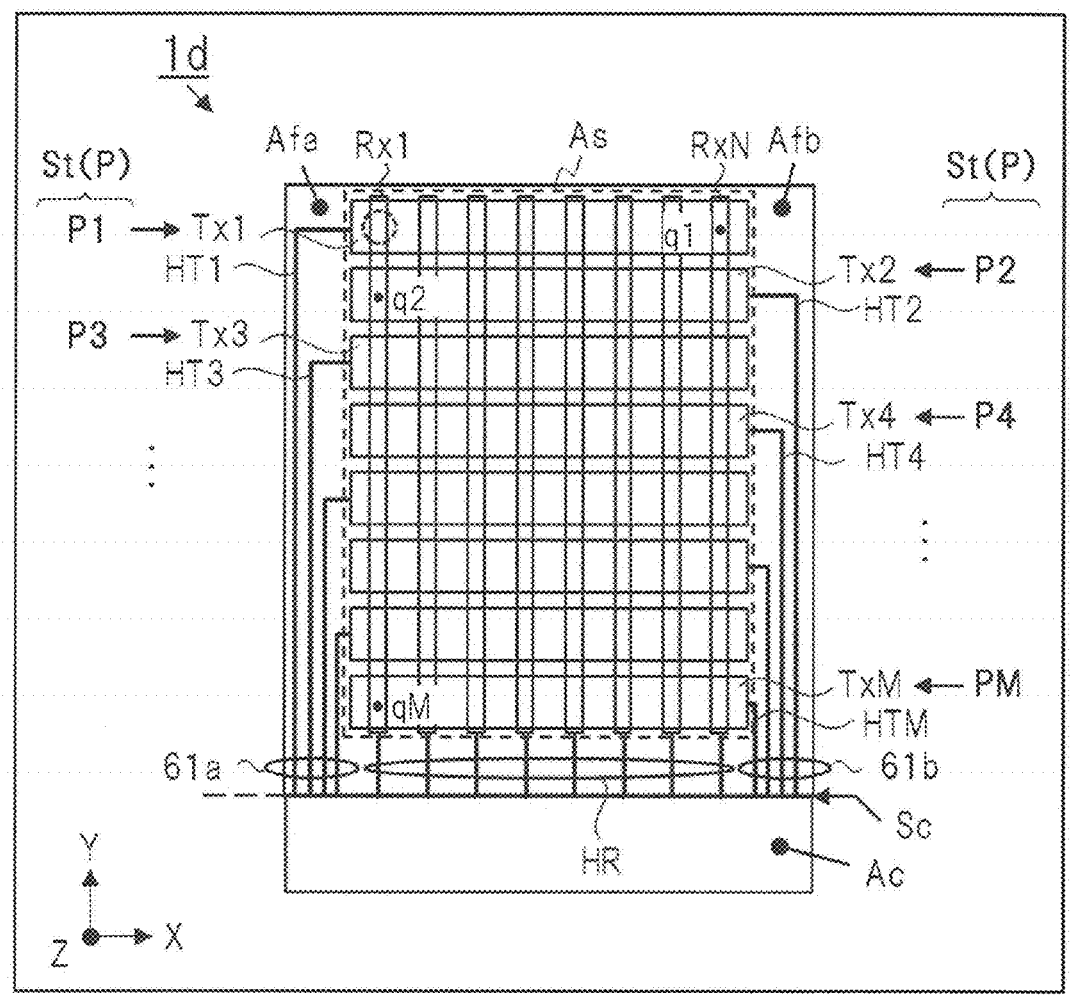
FIG. 13 is a drawing showing a configuration example of an XY-plane of a touch-sensor device of an embodiment 1D of the present invention.

FIG. 13 shows a configuration of an XY-plane of a touch-sensor device 1d of an embodiment 1D. The embodiment 1D has a configuration in which the wirings HT are provided alternately on the left and right of the Y-direction in left/right both-side regions of the peripheral areas Af, as the wirings HT of the touch drive electrodes Tx of the panel unit 5A. For example, a left-side wiring part 61a provided in the region Afa of the left side part of the peripheral area Af has the wiring HT1, the wiring HT3, etc. corresponding to the touch drive electrode Tx1, the touch drive electrode Tx3, etc., which are the touch drive electrodes Tx odd-numbered in the Y-direction regarded as a first group. Also, a right-side wiring part 61b provided in the region Afb of the right side part has the wiring HT2, the wiring HT4, etc. corresponding to the touch drive electrode Tx2, the touch drive electrode Tx4, etc., which are the touch drive electrodes Tx even-numbered in the Y-direction regarded as a second group. Each of the touch drive electrodes Tx is coupled to the wiring HT in the left or right by a first end thereof in the left or right of the X-direction, and the pulses P are applied only from the first end. The pulses P are transmitted from the first end of the touch drive electrode Tx to a second end thereof.

In the embodiment 1D, for example, in the same manner as the embodiment 1A, as the touch drive signals St from the touch drive unit 51, the pulse P1 to the pulse PM, which are the pulses P of the plurality of (M) types of which time t has been adjusted in accordance with the time constants τ caused by differences in the Y-direction lengths of the left/right wirings HT, are generated. The touch drive unit 51 applies the pulses P of the plurality of (M) types alternately to the left and right sequentially from the touch drive electrode Tx1 in the Y-direction upper side of the touch detection area As through the left-side wiring part 61a and the right-side wiring part 61b.

The point q1, the point q2, and the point qM are examples of the positions corresponding to the units of touch detection U on the paths including the wirings HT of the wiring part 61a or the wiring part 61b and having mutually different time constants. Particularly, the point q1, the point q2, and the point qM show examples of the positions on the touch detection electrode RxN having long overall paths in the X-direction right side of the touch detection area As or the positions on the touch detection electrode Rx1 on the left side.

The pulses P are applied to each of the touch drive electrodes Tx only from the left side or the right side. Therefore, if the pulses P are applied from the left side, the paths which pass through the above-described touch detection electrode RxN are the longest; and, if the pulses P are applied from the right side, the paths which pass through the above-described touch detection electrode Rx1 are the longest. For example, a path which passes through the wiring HT1, the touch drive electrode Tx1, and the point q1 and a path which passes through the wiring HTM, the touch drive electrode TxM, and the point qM have mutually different time constants in accordance with the lengths of the wirings HT of the wiring part 61a or the wiring part 61b. Therefore, in the embodiment 1D, the time t of the pulses P is adjusted to t1>tM in accordance with a difference in the time constants of the wirings HT of the wiring part 61a or the wiring par 61b.

As an effect brought about by the touch-sensor device 1d of the embodiment 1D, in the same manner as the embodiment 1A, the total touch drive time Tall and the touch detection period Ks can be shortened or increase thereof can be suppressed compared with the comparative example. Moreover, in the case of the embodiment 1D, as compared with the embodiment 1A, etc., the number of the wirings HT formed in each of the region Afa and the region Afb, which are the left/right regions of the peripheral area Af, is reduced. Therefore, there are advantages that the X-direction widths of the region Afa and the region Afb can be narrowed, or the wiring density thereof can be reduced.

As modification examples of the embodiment 1D, the group configuration of the above-described wirings HT is not limited to an aspect in which each of the wirings of the first group and the second group is alternately disposed and coupled in the left and right of the Y-direction. For example, modification examples of various group configurations such as an aspect in which a set of two wirings is alternately disposed and coupled in the left and right of the Y-direction can be employed.

Embodiment 1E

Figure 14:
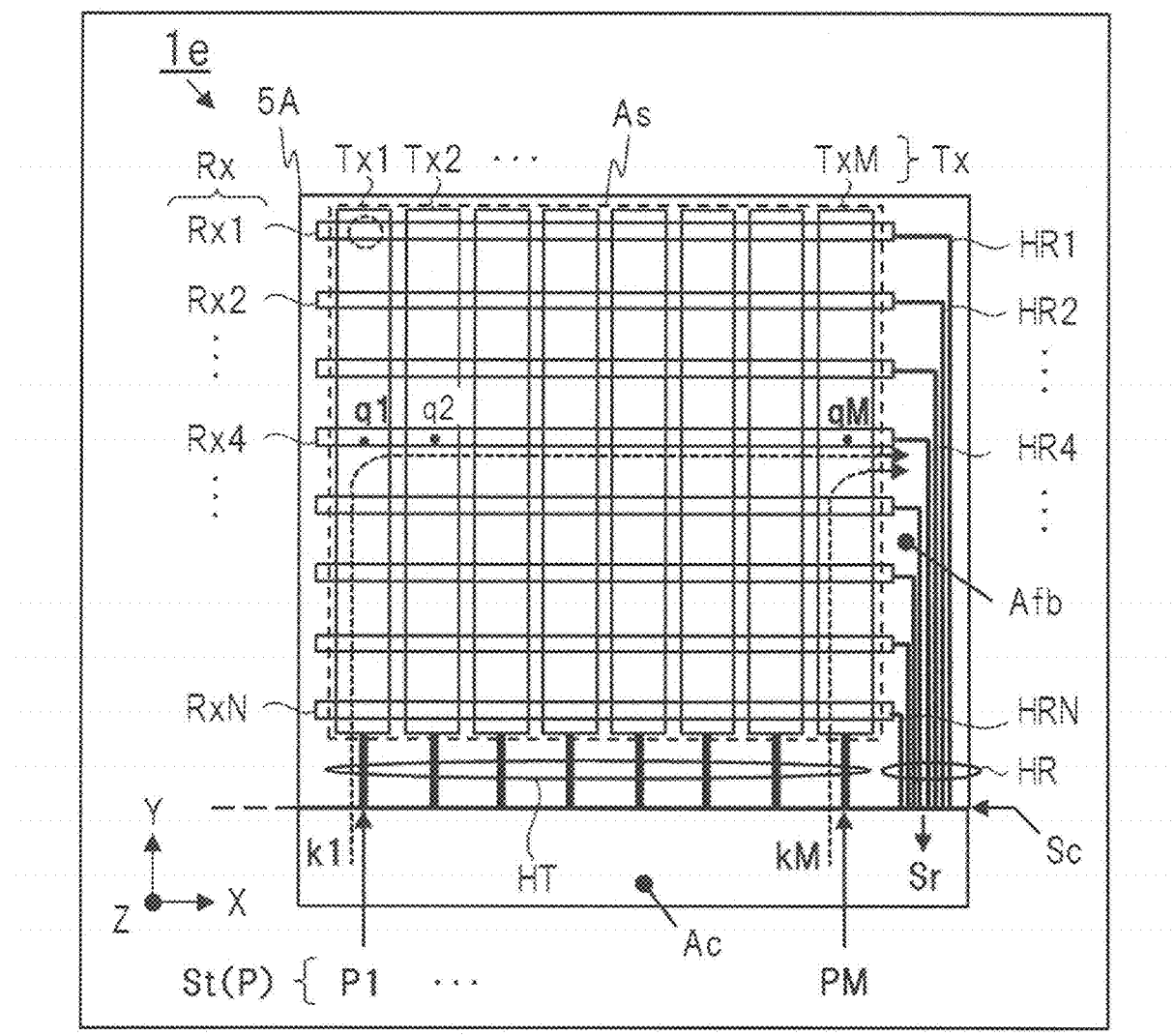
FIG. 14 is a drawing showing a configuration example of an XY-plane including electrodes and wirings of a touch-sensor device of an embodiment 1E of the present invention.

FIG. 14 shows a configuration of an XY-plane of a touch-sensor device 1e of an embodiment 1E. In the embodiment 1E, in the touch detection area As of the panel unit 5A, the disposing directions of the touch drive electrodes Tx and the touch detection electrodes Rx are opposite to those of the embodiment 1A. More specifically, in the embodiment 1E, the touch drive electrodes Tx are blocks parallel to the Y-direction, and the touch detection electrodes Rx are lines parallel to the X-direction. The peripheral area Af has, as routed wirings, the wirings HT coupled to the touch drive electrodes Tx and the wirings HR coupled to the touch detection electrodes Rx.

The wirings HT are linearly extending in the Y-direction from the connecting side Sc and are coupled to Y-direction lower-side ends of the touch drive electrodes Tx. The lengths and time constants of the wirings HT are mutually the same. The wirings HR are provided only in, for example, the X-direction right-side region Afb of the peripheral area Af and have mutually different time constants in accordance with the lengths thereof. The wirings HR are linearly extending in the Y-direction from the connecting side Sc, are bent in the X-direction, and are coupled to the right-side ends of the touch detection electrodes Rx respectively associated with the wirings HR. The N touch detection electrodes Rx are represented by the touch detection electrode Rx1 to the touch detection electrode RxN. The N wirings HR are represented by the wiring HR1 and the wiring HR2 to the wiring HRN.

The present embodiment 1E has the touch drive electrodes Tx extending in the Y-direction and the touch detection electrodes Rx extending in the X-direction, the wirings HT have mutually the same length, and the wirings HR have mutually different lengths. Also in this case, in the overall paths including the wirings HT and the wirings HR, the parts through which the pulses P in the touch detection electrodes Rx are transmitted have mutually different distances; therefore, the paths have mutually different time constants τ. Therefore, in the embodiment 1E, as the touch drive signals St from the touch drive unit 51, the pulses P of a plurality of types of which time t has been adjusted are generated in accordance with the differences in the time constants τ of the parts through which the pulses P in the above-described touch detection electrodes Rx are transmitted or the paths including the parts. For example, in the same manner as the embodiment 1A, the touch drive unit 51 generates the pulse P1 to the pulse PM, which are the pulses P of the plurality of (M) types respectively applied to the touch drive electrodes Tx. Then, the touch drive unit 51 applies the pulse P1 to the pulse PM sequentially to the touch drive electrodes Tx in the touch detection area As.

The point q1, the point q2, and the point qM are examples of the positions corresponding to the units of touch detection U corresponding to differences of the positions on the touch drive electrodes Tx in the X-direction, for example, in a case of the positions on the touch detection electrode Rx4 which is at a Y-direction near intermediate position. The point q1, the point q2, and the point qM have mutually different positions through which the pulses P are transmitted in the touch detection electrode Rx extending in the X-direction. For example, the path k1 is a path in an order of the wiring HT, the touch drive electrode Tx1, the point q1, the touch detection electrode Rx4, and the wiring HR4. The path kM is a path in an order of the wiring HT, the touch drive electrode TxM, the point qM, the touch detection electrode Rx4, and the wiring HR4. The path k1 is longer than the path kM by the distance in the touch detection electrode Rx4 and has a larger time constant τ of the path. Therefore, in the embodiment 1E, as the touch drive signals St, for example, the pulse P1 using the time t1 is applied to the touch drive electrode Tx1 from the touch drive unit 51, and the pulse PM using the time tM that is shorter than the time t1 is applied to the touch drive electrode TxM therefrom.

Note that, in the embodiment 1E, the configurations of the touch drive unit 51, which drives the touch drive electrodes Tx; the touch detection unit 52, which detects the pulses from the touch detection electrodes Rx; the touch drive sequence of the touch drive electrodes Tx; etc. can be achieved in the same manner as the above-described embodiment 1A, etc. Therefore, the explanations thereof are omitted.

As an effect brought about by the touch-sensor device 1e of the embodiment 1E, also in the case of the configuration having the touch drive electrodes Tx extending in the Y-direction and the touch detection electrodes Rx extending in the X-direction, the total touch drive time Tall and the touch detection period Ks can be shortened or increase thereof can be suppressed compared with the comparative example. As a modification example of the embodiment 1E, a modification example such as a mode in which the wirings HR of the touch detection electrodes Rx are linearly extending in the X-direction and coupled to the touch detection unit 52, which is mounted for example in the right side part of the touch-sensor device can be used.

Embodiment 1F

Figure 15:
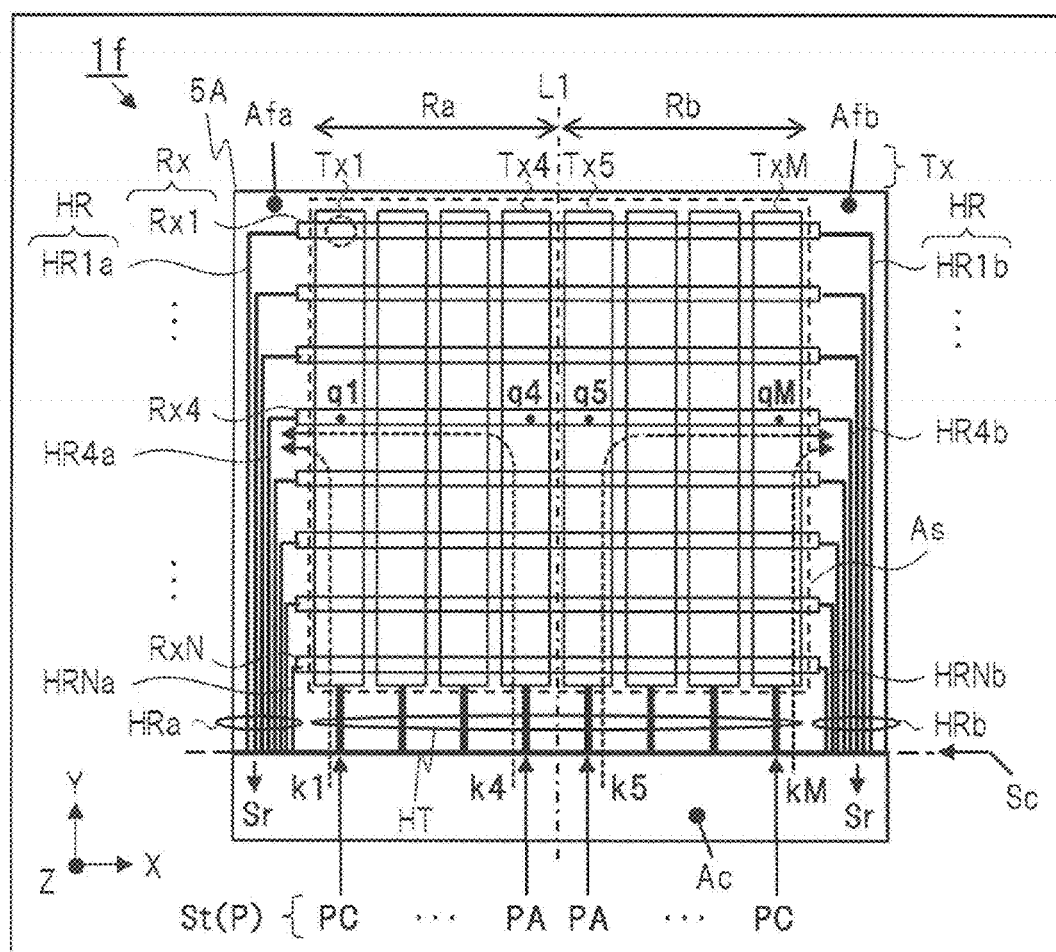
FIG. 15 is a drawing showing a configuration example of an XY-plane including electrodes and wirings of a touch-sensor device of an embodiment 1F of the present invention.

FIG. 15 shows a configuration of an XY-plane of a touch-sensor device if of an embodiment 1F. In the embodiment 1F, in the same manner as the embodiment 1E, the touch detection area As of the panel unit 5A has the touch drive electrodes Tx extending in the Y-direction and the touch detection electrodes Rx extending in the X-direction and has the wirings HR in both left/right sides of the peripheral area Af. More specifically, the panel unit 5A has a wiring part HRa in the left-side region Afa and has a wiring part HRb in the right-side region Afb. The wiring part HRa and the wiring part HRb have left/right symmetrical shapes with respect to the X-direction center line L1. The N wirings HR in the left-side wiring part HRa are represented by a wiring HR1a to a wiring HRNa sequentially from the Y-direction upper side. The N wirings in the right-side wiring part HRb are represented by a wiring HR1b to a wiring HRNb sequentially from the Y-direction upper side. The wirings HR are coupled to left/right both ends of each of the touch detection electrodes Rx.

The pulses P of the touch drive signals St applied to the touch drive electrode Tx are transmitted to X-direction left/right both sides of the touch detection electrode Rx through the capacitors corresponding to the units of touch detection U and are output from the left/right both-side ends of the touch detection electrode Rx. The pulses P are transmitted from the left/right ends of the touch detection electrode Rx to the connecting side Sc through the wirings HR of the wiring part HRa and the wiring part HRb. The pulses P input to the touch detection unit 52 in the connecting side part Ac are detected as the touch detection signals Sr. About the plurality of units of touch detection U of the same touch detection electrode Rx, the touch detection unit 52 uses the touch detection signal Sr caused by the pulses P from the shorter one of the above-described paths divided into the X-direction left and right. The pulses P from the shorter path has higher touch detection sensitivity. The touch detection unit 52 uses the touch detection signal Sr caused by the pulses P from the left-side wiring part HRa in a region Ra in the left side of the X-direction center line L1 of the touch detection area As and uses the touch detection signal Sr caused by the pulses P from the right-side wiring part HRb in a right-side region Rb.

A point q4 and a point q5 represent, for example, positions corresponding to the units of touch detection U on the touch drive electrode Tx4 and the touch drive electrode Tx5 in the vicinities of the X-direction center line L1, where the positions are on the touch detection electrode Rx4 at a Y-direction near intermediate position. A point q1 and a point qM represent positions corresponding to the units of touch detection U at the positions of the touch drive electrode Tx1 and the touch drive electrode TxM in the both X-direction left/right sides of the touch detection electrode Rx4. For example, a path k4 is a path in an order of the wiring HT, the touch drive electrode Tx4, the point q4, the touch detection electrode Rx4, and the wiring HR4a. A path k1 is a path in an order of the wiring HT, the touch drive electrode Tx1, the point q1, the touch detection electrode Rx4, and the wiring HR4a.

For example, the path k4 has a longer distance of transmission of the pulses P in the touch detection electrode Rx than that of the path k1 and has a larger time constant τ of the path. The relation between a path k5 and the path kM about the distances and time constants thereof are also similar to the above-described relation between the path k4 and the path k1 about the distances and time constants thereof. Therefore, in the embodiment 1F, as the touch drive signals St from the touch drive unit 51, for example, in the same manner as above-described FIG. 4, the pulses PA of the time tA are applied to the touch drive electrode Tx4 and the touch drive electrode Tx5 at the X-direction near intermediate positions, and the pulses PC using the time tC shorter than the time tA are applied to the touch drive electrode Tx1 and the touch drive electrode TxM at the X-direction left/right both-end positions.

Figure 16:
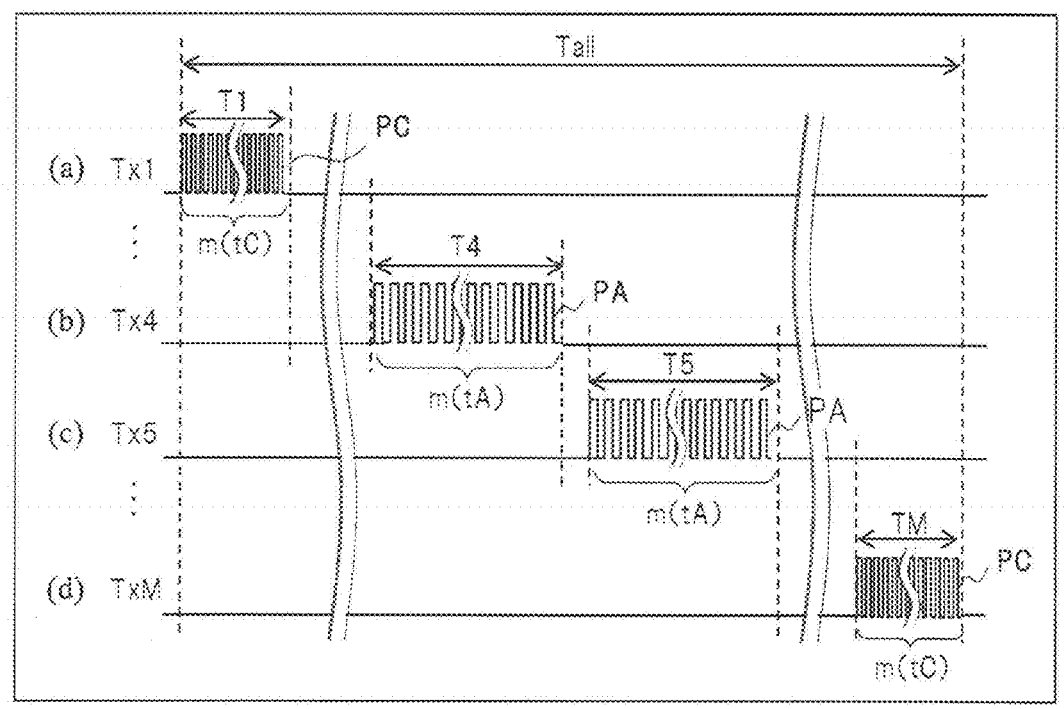
FIG. 16 is a drawing showing a touch drive sequence example of the embodiment 1F.

FIG. 16 shows a sequence example of touch drive by scanning drive of the touch drive electrodes Tx in the embodiment 1F. A scanning order of the scanning drive is, for example, sequentially from the X-direction left side, in other words, an order from the touch drive electrode Tx1 to the touch drive electrode TxM. (a) in FIG. 16 shows the pulses PC to the touch drive electrode Tx1 and touch drive time T1. (b) in FIG. 16 shows the pulses PA to the touch drive electrode Tx4 and touch drive time T4. (c) in FIG. 16 shows the pulses PA to the touch drive electrode Tx5 and touch drive time T5. (d) in FIG. 16 shows the pulses PC to the touch drive electrode TxM and touch drive time TM. For example, the touch drive unit 51 applies the pulses P having the time t which becomes longer as the touch drive electrode Tx is shifted from the X-direction left side to an near intermediate position of the touch detection area As, and applies the pulses P having the time t which becomes shorter as the touch drive electrode Tx is further shifted from the X-direction near intermediate position to the right side.

As an effect brought about by the touch-sensor device if of the embodiment 1F, also in the case of the configuration having the wirings HR in both X-direction left/right sides, in the same manner as the embodiment 1E, the total touch drive time Tall and the touch detection period Ks can be shortened or increase thereof can be suppressed compared with the comparative example. As a modification example of the embodiment 1F, in the same manner as the embodiment 1D, a modification example such as an aspect in which the wirings HR are divided into the region Afa and the region Afb, which are X-direction left/right regions of the peripheral area Af, and alternately disposed in the left and right of the Y-direction can be also used.

Embodiment 1G

Figure 17:
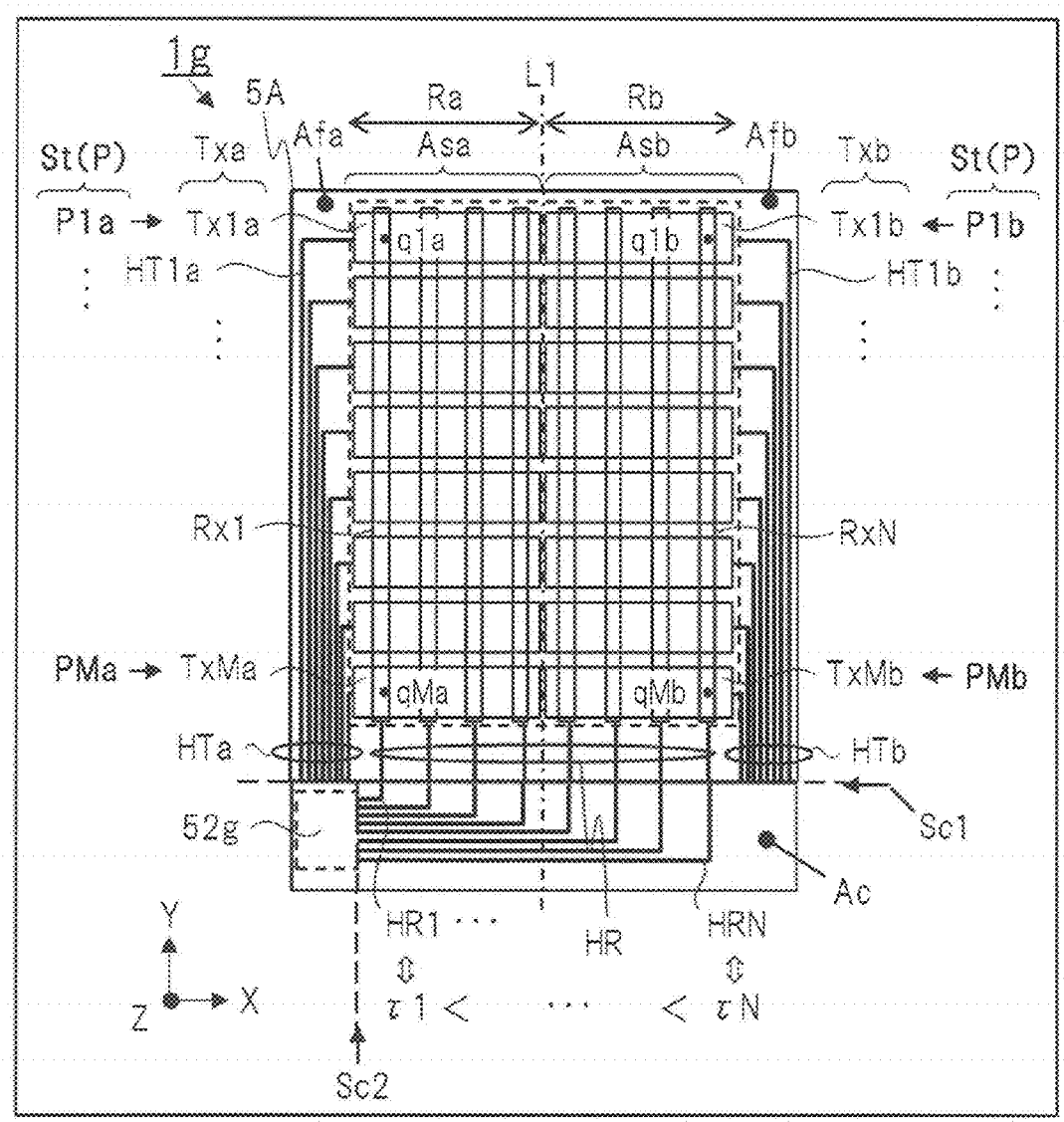
FIG. 17 is a drawing showing a configuration example of an XY-plane including electrodes and wirings of a touch-sensor device of an embodiment 1G of the present invention.

FIG. 17 shows a configuration of an XY-plane of a touch-sensor device 1g of an embodiment 1G. The embodiment 1G has the touch drive electrodes Tx and the touch detection electrodes Rx extending in the Y-direction in the touch detection area As of the panel unit 5A, and the touch drive electrodes Tx of the touch detection area As are physically divided into a region Asa and a region Asb, which are regions on the left and right of the X-direction center line L1. More specifically, the embodiment 1G has, as the touch drive electrodes Tx, a block of left-side touch drive electrodes Txa disposed in the left-side region Asa and a block of right-side touch drive electrodes Txb disposed in the right-side region Asb. The wirings HT in the peripheral area Af have the wiring part HTa coupled to left-side ends of the left-side touch drive electrodes Txa disposed in the left-side region Afa and a wiring part HTb coupled to right-side ends of the right-side touch drive electrodes Txb disposed in the right-side region Afb. The left-side wiring part HTa and the right-side wiring part HTb have left/right symmetrical shapes with respect to the X-direction center line L1 in the same manner as the above-described embodiment 1A. In the embodiment 1G, first, in the same manner as the embodiment 1A, etc., the pulses P of the types corresponding to the differences in the lengths and time constants of the wirings HT are applied for drive of the touch drive electrodes Tx in one side of the X-direction left and right, for example, the left-side touch drive electrodes Txa.

The embodiment 1G has, as the wirings HR in the peripheral area Af, the wiring HR1 to the wiring HRN having uneven lengths in the region Ra and the region Rb, which are the regions on the right and left of the X-direction center line L1 in the touch-sensor device 1g. First ends of the wirings HR are coupled to a region 52g on the X-direction left side in the connecting side part Ac. Therefore, the wirings HR formed in the left-side region Ra are shorter than the wirings HR formed in the right-side region Rb. Among the wirings HR, the wiring HR1 corresponding to the touch detection electrode Rx1 on the X-direction left side is the shortest and has a small time constant, and the wiring HRN corresponding to the touch detection electrode RxN on the right side is the longest and has a large time constant. For example, the time constant of the wiring HR1 is represented by τ1, and the time constant of the wiring HRN is represented by τN. The relation of the time constants τ of the N wirings HR is τ1< . . . <τN.

In the connecting side part Ac, a connecting side Sc1 is a connecting side of the wirings HT in the same manner as the above-described connecting side Sc. A connecting side Sc2 represents a connecting side of a region 52g on the left side of the connecting side part Ac and the wirings HR. The region 52g is an example of a region in which a circuit of the touch detection unit 52 is mounted. The wirings HR are linearly extending in the Y-direction from ends of the touch detection electrodes Rx, are bent to the left side in the X-direction, and are coupled to the region 52g at the connecting side Sc2. Thus, the lengths of the wirings HR between the Sc2 and the ends of the touch detection electrodes Rx are mutually different.

As described above, in the connecting part Ac, circuit units can be respectively mounted in layers mutually different in the Z-direction. FIG. 17 shows a configuration example about a circuit of the touch detection unit 52 corresponding to the Z-direction layer in which the touch detection electrodes Rx are formed. The region 52g in which the touch detection unit 52 is mounted is not limited to the shown left lower position of the touch-sensor device 1g, but may be present at another position of the touch-sensor device 1g.

As described above, the wirings HR have different lengths in the region Ra and the region Rb, which are left/right regions. Therefore, the overall paths including the wirings HT and the wirings HR have mutually different time constants because of the differences in the lengths thereof. For example, a point q1a corresponds to a position on the left-side touch detection electrode Rx1 on the left-side touch drive electrode Tx1a, and a point q1b corresponds to a position on the right-side touch detection electrode RxN on the right-side touch drive electrode Tx1b. For example, a first path which passes through the wiring HT1a, the touch drive electrode Tx1a, the point q1a, the touch detection electrode Rx1, and the wiring HR1, and a second path which passes through the wiring HT1b, the touch drive electrode Tx1b, the point q1b, the touch detection electrode RxN, and the wiring HRN are compared with each other. As a result, the latter second path is longer than the first path in accordance with the difference in the lengths of the wiring HR1 and the wiring HRN, and has a larger time constant in accordance with the length. The relation of the lengths and time constants of the paths which pass through a point qMa and the paths which pass through a point qMb is also similar to the above-described relation of the distances and time constants of the first path and the second path.

Therefore, the embodiment 1G has a configuration in which each of the left-side touch drive electrodes Txa and the right-side touch drive electrodes Txb of the touch detection area As is driven by independent pulses P from the circuit of the left/right-independent touch drive unit 51g mounted in the connecting side part Ac of later-described FIG. 18. In a case of the touch drive electrodes Tx at mutually the same Y-direction position such as the touch drive electrode Tx1a and the touch drive electrode Tx1b, pulses P1a of a first type are applied from a left-side touch drive unit 51a to the left-side touch drive electrode Tx1a, and pulses P1b of a different second type are applied from a right-side touch drive unit 51b to the right-side touch drive electrode Tx1b. The time t of the pulse P1a and the time t of the pulse P1b, which are the left/right independent pulses P, is adjusted to mutually different time t in accordance with a difference in the time constants of the wirings HR having different lengths in the region Ra and the region Rb. Note that, in FIG. 18, time of the pulse PMa is denoted as time tMa, time of the pulse PMb is denoted as time tMb.

Figure 18:
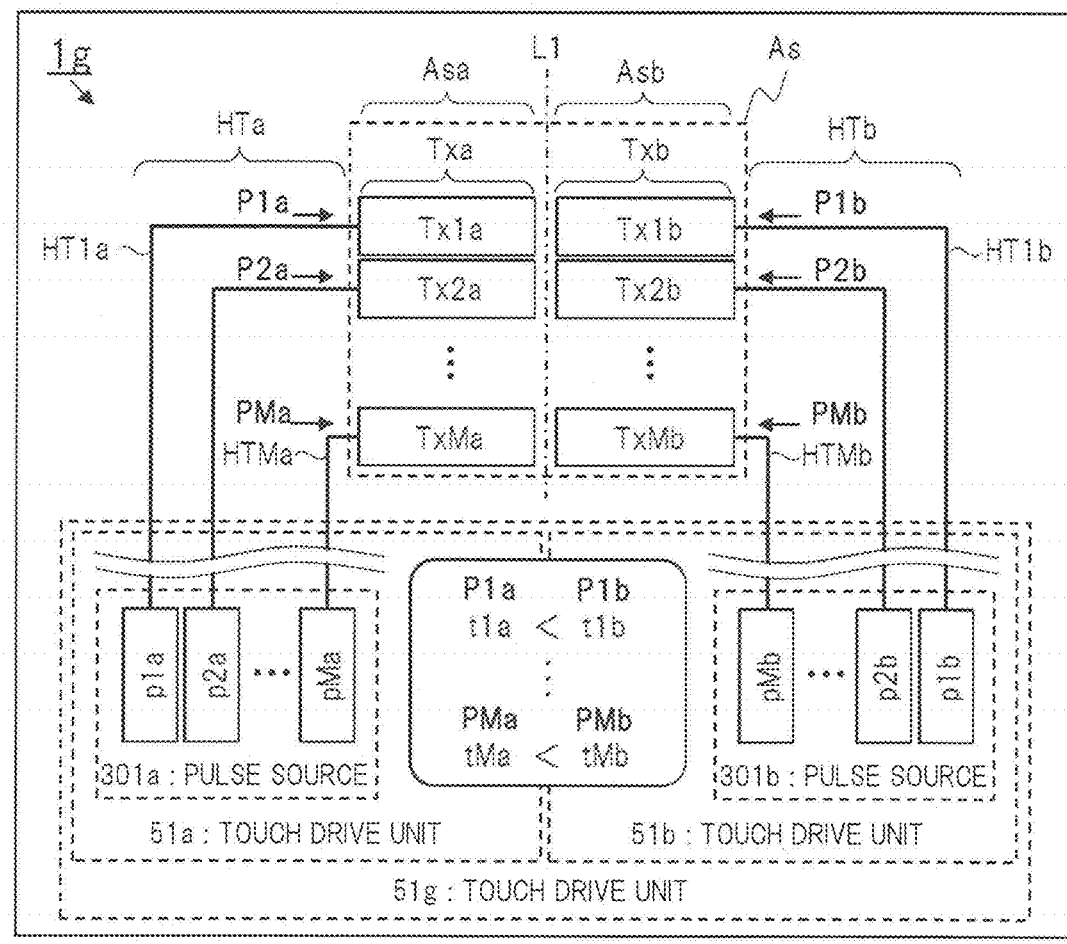
FIG. 18 is a drawing showing a configuration example of a circuit of touch drive unit of the embodiment 1G.

FIG. 18 shows a configuration of the touch drive unit 51g of the embodiment 1G. The touch drive unit 51g is composed of the left-side touch drive unit 51a and the right-side touch drive unit 51b, which are independent on the left and right. Internal circuit configurations of the touch drive unit 51a and the touch drive unit 51b can be similarly achieved although the types of the output pulses P are different. The left-side touch drive unit 51a includes a pulse generating circuit unit using a pulse source 301a. Based on a source signal p1a to a source signal pMa generated by the pulse source 301a, the pulse generating circuit unit of the touch drive unit 51a generates the pulse P1a to the pulse PMa, which are the pulses P of the plurality of (M) types adjusted in accordance with, for example, differences in the lengths and time constants of the wirings HT of the left-side wiring part HTa and differences in the lengths and time constants of the wirings HR in the above-described left/right regions. Then, the touch drive unit 51a applies the pulse P1a to the pulse PMa to the touch drive electrodes Txa in the left-side region Asa of the touch detection area As through the left-side wiring part HTa.

Similarly, the right-side touch drive unit 51b includes a pulse generating circuit unit using a pulse source 301b. Based on a source signal p1b to a source signal pMb generated by the pulse source 301b, the pulse generating circuit unit of the touch drive unit 51b generates a pulse P1b to a pulse PMb, which are the pulses P of the plurality of (M) types adjusted in accordance with, for example, differences in the lengths and time constants of the wirings HT of the right-side wiring part HTb and differences in the lengths and time constants of the wirings HR in the above-described left/right regions. Then, the touch drive unit 51b applies the pulse P1b to the pulse PMb to the touch drive electrodes Txb in the right-side region Asb of the touch detection area As through the right-side wiring part HTb. Note that, in FIG. 18, a wiring connected to the touch drive electrode TxMa is denoted as wiring HTMa, and a wiring connected to the touch drive electrode TxMb is denoted as wiring HTMb.

The differences in the lengths and time constants of the wirings HR of the region Ra and the region Rb, which are the above-described X-direction left/right regions, can be assumed as lengths and time constants of two types on the left and right, for example, by simplifying the differences in the lengths and time constants of the individual wirings HR.

At the touch drive electrodes Tx at the same Y-direction positions such as the touch drive electrode Tx1a on the left side and the touch drive electrode Tx1b on the right side, in accordance with the fact that the wiring HR on the X-direction left side is relatively short and has a small time constant compared with the wiring HR on the right side, adjustment is made so that time t1a of the pulses P1a to the left-side touch drive electrode Tx1a is shorter than time t1b of the pulses P1b to the right-side touch drive electrode Tx1b. The pulse PMa to the left-side touch drive electrode TxMa at a position on the Y-direction lower side and the pulse PMb to the right-side touch drive electrode TxMb are also similar to the relation between the above-described pulse P1a and the pulse P1b. Also at other Y-direction positions, adjustment is made so that the time t of the left-side pulses is shorter than the time t of the right-side pulses in the same manner as the relation between the above-described two pulses corresponding to each other in the X-direction left and right.

As an effect brought about by the touch-sensor device 1g of the embodiment 1G, in accordance with the differences in the paths in the left/right regions of the touch detection area As, drive using the independent pulses P can be carried out for each of the touch drive electrodes Tx divided into the left and right. As a result, in the same manner as the above-described embodiments, the total touch drive time Tall and the touch detection period Ks can be shortened or increase thereof can be suppressed. Moreover, the embodiment 1G has the touch drive electrodes Tx divided by the left/right regions in the touch detection area As and the left/right independent touch drive unit 51g; therefore, the touch drive electrodes Tx of the left/right regions can be independently driven. For example, in the embodiment 1G, drive only with the touch drive electrodes Tx in one region selected from the region Asa and the region Asb can be also carried out. Moreover, in the embodiment 1G, for example in a case in which the characteristics and state of noise and touch detection sensitivity are different in the left/right regions, the pulses P of the types corresponding to the characteristics and state of the left-right regions can be applied.

As a modification example of the embodiment 1G, also in a case of a configuration of the panel unit 5A having the touch drive electrodes Tx extending in the Y-direction and the touch detection electrodes Rx extending in the X-direction like the embodiment 1E and the embodiment 1F, the configuration of the embodiment 1G can be similarly applied to that configuration. Moreover, as a modification example of the embodiment 1G, a modification example such as an aspect in which the division is at another predetermined position can be employed, and the division is not limited to the X-direction center line L1 in the touch detection area As.

The regions in which the circuit units of the touch-sensor devices of the above-described embodiments are mounted and the connecting side part Ac including them are not limited to the lower side part of the touch-sensor device, but may be present at any location. In accordance with the positions of the regions in which the circuit units are mounted and the connecting side part Ac, the lengths of the paths including the wirings may be different in some cases. In that case, the touch drive unit of the touch-sensor device generates and outputs the pulses P of the plurality of types adjusted in accordance with the differences in the time constants of the paths including the wirings. Two or more regions in which the connecting side part Ac and the circuit unit are mounted may be present in the touch-sensor device. For example, the regions may be present in the lower side part and the left side part of the touch-sensor device or may be present in the lower side part and the upper side part of the touch-sensor device.

In the above-described embodiments, the wirings HT and the wirings HR, which are routed wirings, are coupled so as to be aggregated at the connecting side Sc of the lower side part of the touch-sensor device. Not limited to this, in accordance with the configuration of the position, etc. of the connecting side part Ac and the circuit unit, the routed wirings may be formed to be separated into a plurality of regions in the touch-sensor device. For example, if the circuit units are present in the lower side part and the upper side part of the touch-sensor device, the routed wirings may be formed to be separated into the wiring parts for connection to the Y-direction upper/lower circuit units. Moreover, the panel unit 5A of the touch-sensor device is not limited to have a rectangular shape which is long in the Y-direction, but may have a shape which is long in the X-direction.

Embodiment 1H

FIG. 19 shows a configuration of an XY-plane of a touch-sensor device 1h of an embodiment 1H. The embodiment 1H shows another configuration example of the touch drive electrodes Tx and the touch detection electrodes Rx, which are the electrodes composing the above-described touch-sensor device of the electrostatic capacitance type. In the above-described embodiment 1A, etc., for example, the units of touch detection U are formed by the intersections of the touch drive electrodes Tx and the touch detection electrodes Rx in the layers mutually different in the Z-direction as shown in FIG. 7. In more detail, the units of touch detection U are formed by the capacitors C formed to correspond to the vicinities of the XY-planar-view intersecting parts of the electrode pairs of the touch drive electrodes Tx and the touch detection electrodes Rx. Employable configurations of the units of touch detection U using the electrodes are not limited to this. As shown in FIG. 19, the embodiment 1H has first electrodes 81 extending in the X-direction and second electrodes 82 extending in the Y-direction as the electrodes, which compose the touch-sensor device, and the capacitors are formed by pairs of the electrode parts juxtaposed in the XY-plane.

Figure 20A:
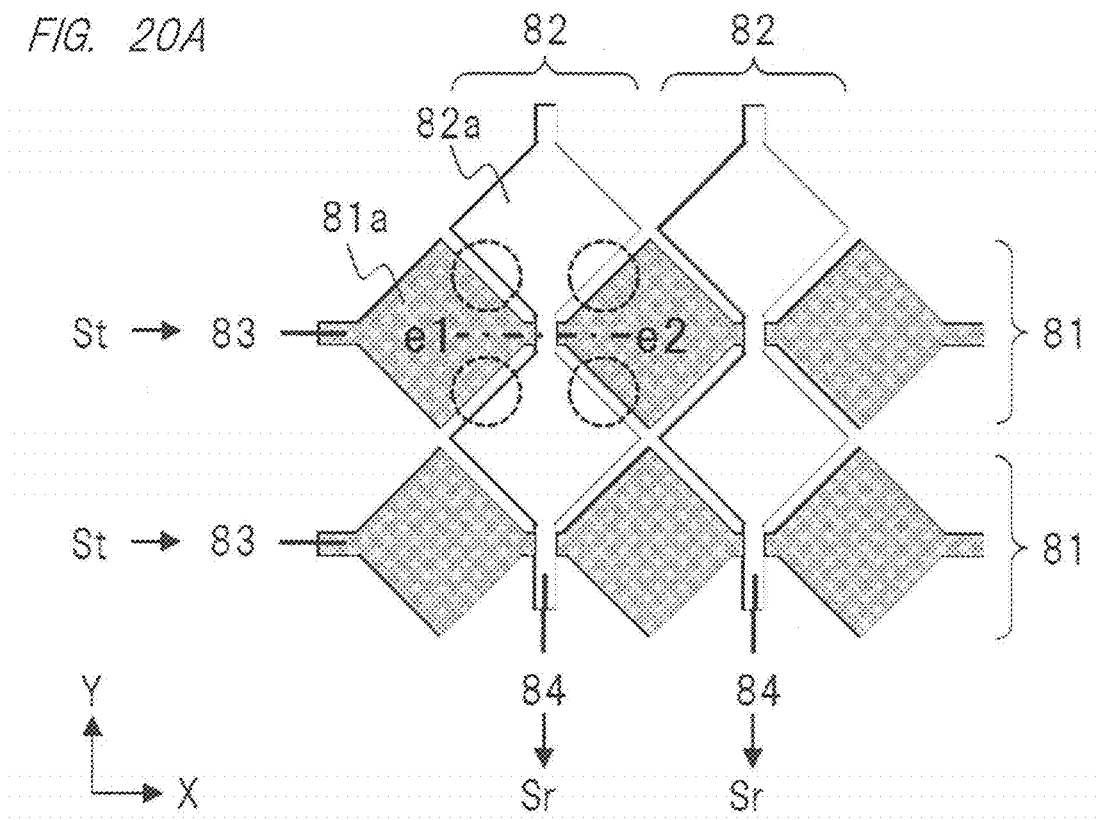
FIG. 20A is a drawing showing a configuration example of electrodes of the embodiment 1H.
Figure 20B:
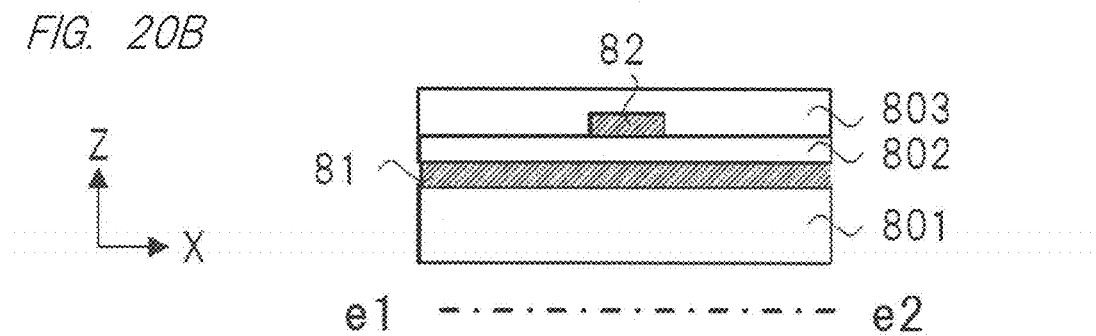
FIG. 20B is a drawing showing the configuration example of electrodes of the embodiment 1H.

FIGS. 20A and 20B show details of the shapes of the above-described first electrodes 81 and the second electrodes 82. FIG. 20A shows a partial enlarged view of the XY-plane of the touch detection area As. The first electrodes 81 have pad parts 81a, which are rhombic electrode parts having a wide width bulging in the Y-direction, and thin line parts connecting them; and the second electrodes 82 have pad parts 82a, which are rhombic electrodes parts having a wide width bulging in the X-direction, and thin line parts connecting them. In the touch detection area As, the pad parts 81a of the first electrodes 81 and the pad parts 82a of the second electrodes 82 are alternately disposed to form a houndstooth shape. The pad parts 81a and the pad parts 82a, which are pad parts of two types, are juxtaposed without mutually overlapping in the XY planar view and are adjacent to each other by the sides of the rhombic shapes of the pad parts via slits. The first electrodes 81 and the second electrodes 82 are mutually intersecting by the thin line parts thereof. Pairs of the pad parts 81a and the pad parts 82a respectively form the capacitors corresponding to the units of touch detection U. The pad parts 81a and the pad parts 82a are disposed in a substantially single XY-plane in the Z-direction.

FIG. 20B shows a schematic XZ cross-sectional view about an e1-e2 part of FIG. 20A. In the panel unit 5A, the first electrode 81 is formed on a board layer 801, and the second electrode 82 is formed thereon via an insulating layer 802 and covered with a protective layer 803. The Z-direction distance between a first layer in which the pad parts 81a of the first electrodes 81 are disposed and a second layer in which the pad parts 82a of the second electrodes 82 are disposed is sufficiently small. The first electrodes 81 and the second electrodes 82 are composed of, for example, a light permeable electrically-conductive material such as ITO, and first wirings 83 and second wirings 84 are formed of, for example, a metal material having a resistance lower than that of ITO. As a mode of the connection between the first electrodes 81 and the first wirings 83 and the connection between the second electrodes 82 and the second wirings 84, for example, a mode such as stacking of layers of ends thereof in the Z-direction can be employed.

As another mode, the pad parts 81a of the first electrodes 81 and the pad parts 82a of the second electrodes 82 may be formed in the XY-plane of the same layer in the Z-direction, and only the thin line parts of the electrodes may be formed so as to be mutually three-dimensionally intersecting in the Z-direction.

In FIG. 19, for example in the same manner as the embodiment 1C, the plurality of first electrodes 81 of the touch detection area As are coupled to the first wirings 83, which are routed wirings in one-side such as left-side region of the peripheral area Af. In the same manner as the above-described embodiments, the first wirings 83 are bent in the Y-direction from electrode ends, are extended in the Y-direction, are coupled to the connecting side Sc, and have mutually different time constants because of differences in the lengths of the wirings. The plurality of second electrodes 82 of the touch detection area As are coupled to the second wirings 84, which are routed wirings, in a lower-side region of the peripheral area Af. In the same manner as the above-described embodiments, the second wirings 84 are extended in the Y-direction, are coupled to the connecting side Sc, and have mutually the same lengths of the wirings.

The pulses P of the touch drive signals Sr are applied from the circuit of the touch drive unit mounted in the connecting side part Ac to the first wirings 83 of the first electrodes 81. The pulses P are transmitted to the second electrodes 82 via the capacitors formed by the pairs of the pad parts 81a of the first electrodes 81 and the pad pairs 82a of the second electrodes 82. The pulses P from the second wirings 84 of the second electrodes 82 are input to the circuit of the touch detection unit mounted in the connecting side part Ac and detected as the touch detection signals Sr. In the embodiment 1H, in the same manner as the embodiment 1C, etc., the time t of the pulses P of the above-described touch drive signals Sr is adjusted in accordance with differences in the time constants caused by the differences in the lengths of the paths including the first wirings 83.

As an effect brought about by the touch-sensor device 1h of the embodiment 1H, in the same manner as the embodiment 1C, etc. the total touch drive time Tall and the touch detection period Ks can be shortened or increase thereof can be suppressed compared with the comparative example.

Embodiment 2A

Next, a touch-sensor device 2a of an embodiment 2A will be described with reference to FIGS. 21 and 22. The touch-sensor device 2a of the embodiment 2A employs the configuration of the embodiment 1A, etc. as a condition and further has a pulse changing function using noise detection as a newly-added function. The pulse changing function is a function which suitably and variably changes the frequency f and the time t of the pulses P to the above-described touch drive electrodes Tx in accordance with noise detection as a measure against the noise that affects touch detection sensitivity. By virtue of the configuration of the above-described embodiment 1A, etc., the total touch drive time Tall can be shortened or increase thereof can be suppressed; therefore, including the amount of the shortening or increase suppression, time allowance is generated. Therefore, in the embodiment 2A, the pulse changing function utilizing the time allowance is achieved. Particularly, the embodiment 2A achieves a function of generating the pulses P of which frequency f and time t are shifted within a predetermined range are generated for each noise detection of the individual touch drive electrode Tx in the touch detection area As and applied to the touch drive electrode Tx.

Figure 21:
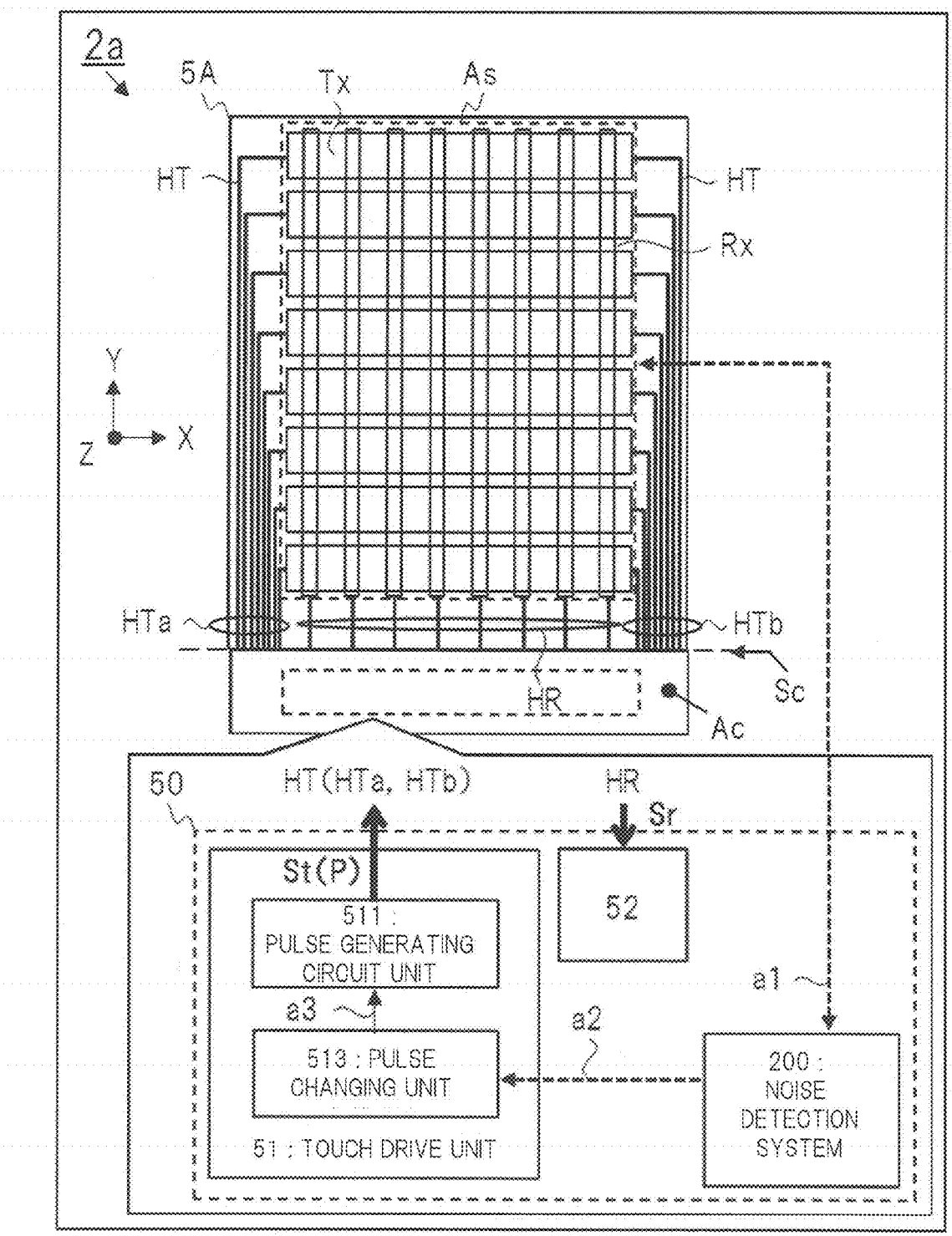
FIG. 21 is a drawing showing a configuration example of an XY-plane including electrodes, wirings, and a circuit unit as an outline of a touch-sensor device of the embodiment 2A of the present invention.

FIG. 21 shows a configuration example of an XY-plane including a functional block configuration of electrodes, wirings, and a circuit unit as an outline of the touch-sensor device 2a of the embodiment 2A. The configuration of the electrodes and wirings of the panel unit 5A of the touch-sensor device 2a are similar to that of the above-described embodiment 1A. The embodiment 2A has the touch drive unit 51, the touch detection unit 52, and a noise detection system 200 as the touch-sensor circuit 50 mounted in the connecting side part Ac. In the shown example, the noise detection system 200 is mounted as an internal circuit of the touch-sensor circuit 50. The touch drive unit 51 has a pulse generating circuit unit 511, a pulse changing unit 513, etc. The noise detection system 200 has a function of detecting noise from outside which will act on the touch detection area As of the panel unit 5A and can be attained by using various publicly known techniques. Particularly in the embodiment 2A, the noise detection system 200 is a circuit unit which has a function of detecting a noise frequency of each of the touch drive electrodes Tx in the touch detection area As. When needed, the noise detection system 200 detects the noise of each of the touch drive electrodes Tx of the touch detection area As as a1. The noise detection system 200 outputs noise detection information a2 to the pulse changing unit 513 when noise a1 is detected.

Based on the noise detection information a2 from the noise detection system 200, the pulse changing unit 513 determines whether the pulses P of the touch drive signals St to the touch drive electrodes Tx are to be changed or not. For example, if it is determined that noise for which a measure should be taken about touch detection sensitivity is detected, the pulse changing unit 513 outputs an instruction a3 for changing the type of the pulses P to the pulse generating circuit unit 511. For example, if noise at a particular touch drive electrode Tx is detected, the pulse changing unit 513 outputs the instruction a3 which temporarily increases/reduces the time t of the pulses P applied to the touch drive electrode Tx to change the frequency thereof. For example, the pulse changing unit 513 outputs the instruction a3 for changing the pulses to the pulses P of which time t of the pulses P to the touch drive electrode Tx has been shifted to be longer.

In accordance with the instruction a3 from the pulse changing unit 513, the pulse generating circuit unit 511 changes the type, particularly the time t and the frequency f, of the pulses P of the touch drive signal St applied to the touch drive electrode Tx. In the embodiment 2A, noise influence in the touch detection area As including the part of the touch drive electrode Tx affected by the noise can be reduced, and the touch detection sensitivity can be maintained or improved.

The circuit unit of the touch drive unit 51, etc. of the embodiment 2A can be formed in a manner similar to above-described embodiment 1A, etc. such as FIG. 5. Regarding the plurality of pulses P before/after change carried out by the pulse changing function, there may be used an aspect in which, for example, all of the pulses P of the plurality of types before/after the change can be generated in advance by the pulse generating circuit unit 511, and pulses can be arbitrarily selected and output therefrom. For example, there may be used an aspect in which the pulses P after change can be generated and output by generating only the pulses P of the plurality of types before change such as the pulses PA to the pulses PC which are the pulses P of the above-described three types by the pulse generating circuit unit 511 and variably control the time t of the pulses PA to the pulses PC by a circuit unit provided in a subsequent stage thereof.

Figure 22:
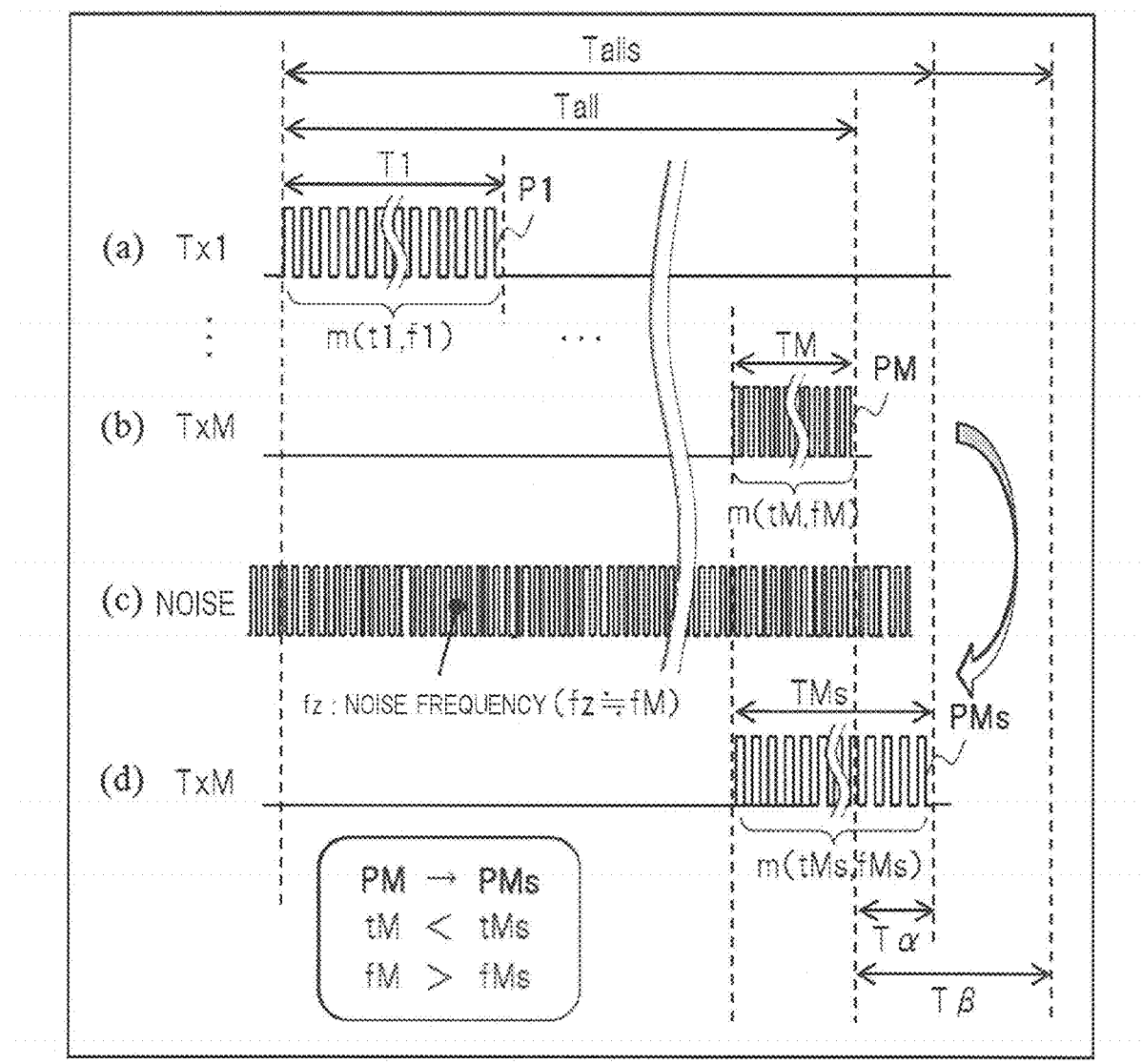
FIG. 22 is a drawing showing a touch drive sequence example of an embodiment 2A.

(a) to (d) in FIG. 22 show examples of sequences of touch drive by scanning drive of the touch drive electrodes Tx in the embodiment 2A. As a state before change by the pulse changing function, (a) and (b) in FIG. 22 show an example of scanning drive by the pulse P1 to the pulse PM which are the pulses P of the plurality of (M) types similar to those of the above-described embodiment 1A. (a) in FIG. 22 shows drive using the pulses P1 to the touch drive electrode Tx1, and (b) in FIG. 22 shows drive using the pulses PM to the touch drive electrode TxM. The pulses P are the pulses of which time t and frequency f have been adjusted in accordance with the time constants in the above-described manner. (c) in FIG. 22 shows an example of noise in the touch drive electrode Tx in the touch detection area As. The frequency of the noise is fz. (c) in FIG. 22 shows a case in which the noise detection system 200 has detected noise which is synchronized with, for example, the pulses PM of the frequency fM to the touch drive electrode TxM of (b) in FIG. 22 and has the substantially same frequency fz. If there is the noise synchronous to the pulses P of the touch drive signals Sr in this manner, touch detection sensitivity of the touch detection area As, particularly, at the touch drive electrodes TxM is lowered. Therefore, in the embodiment 2A, in order to maintain or improve the touch detection sensitivity, the type of the pulses PM to the touch drive electrode TxM of (b) in FIG. 22B is changed like (d) in FIG. 22 by using the above-described pulse changing function.

(d) in FIG. 22 shows the state of pulses PMs to the touch drive electrode TxM after the change from (b) in FIG. 22 by the pulse changing function. For example, the pulses PMs are pulses of which time t and frequency f have been shifted. Time tMs of the pulses PMs is longer than the time tM of the pulses PM, and a frequency fMs of the pulses PMs is lower than the frequency fM of the pulses PM. As a result of application of the pulses PMs to the touch drive electrode TxM, as shown in (b) and (d) in FIG. 22, the touch drive time TM of only the part of the touch drive electrode TxM is increased as shown by the touch drive time TMs. This time increase will be referred to as time Tα. As a result, the influence of the noise of (c) in FIG. 22 is avoided, and the touch detection sensitivity in the vicinity of the touch drive electrode TxM is maintained or improved. The time increase of total touch drive time Talls after changing the total time drive time Tall is only the time Tα, which is the increase of the touch drive time TMs. Thus, in the embodiment 2A, the touch detection sensitivity can be maintained or improved only with minimum time increase.

The pulse changing unit 513 of the pulse changing function changes the type of the pulses P in accordance with noise detection as described above and, then, if it is determined that it has returned to a state in which the noise is not detected, carries out control so as to return the pulses to the pulses P of the original type.

Upon change of the pulses P by the above-described pulse changing function, as a way of shifting the time t, the time t of the pulses P such as the pulses PA, the pulses PB, and the pulses PC before change may be increased or reduced by a constant rate.

In a case in which changing control is carried out so that the time t of the pulses P becomes longer in the above-described manner, the pulse changing function may limit the time Tα corresponding to the increase of the change so that the time is within time Tβ, which is certain time. Thus, the pulse changing function limits the increase of the total touch drive time Tall caused by the change of the pulses P so that the time is within certain time. In other words, the pulse changing function is achieved within the range of the time allowance obtained by the configuration of the embodiment 1A, etc. For example, in an aspect of the touch-sensor-equipped display device described later, in some cases, a frame period for display is fixed, and the touch detection period Ks has to be within the time range thereof. In that case, the pulse changing function limits the increase so that the total touch drive time Talls obtained by the change of the pulses P is within the time range.

As described above, according to the embodiment 2A, as the pulse changing function which is a new function, by effectively utilizing the time allowance obtained by the optimized configuration of the pulses P of the above-described embodiment 1A, etc., the lengths of the pulses P and the touch drive time T can be suitably changed for each of the touch drive electrodes Tx, and the touch detection sensitivity can be maintained or improved as a measure against noise. According to the embodiment 2A, compared with the comparative example shown in FIG. 47, upon change of the time t and the frequency f of the pulses P by the pulse changing function, larger shifting amounts of the time t and the frequency f can be ensured, and the touch detection sensitivity can be further enhanced.

As a modification example of the embodiment 2A, the noise detection system 200, the pulse changing unit 513, etc. are not limited to be in the connecting side part Ac or the touch-sensor circuit 50, but may employ an aspect in which they are mounted at other positions in the touch-sensor device and linked. The noise detection system 200 and the pulse changing unit 513 may be integrally mounted. The pulse changing unit 513 and the pulse generating circuit unit 511 may be integrally mounted. The pulse changing unit 513 may achieve processing such as the above-described pulse change determination by program processing, etc. of a CPU. In a case of an electronic device provided with the touch-sensor device 2a in the same manner as above-described FIG. 9, the noise detection system 200 may be provided in the electronic device and outside of the touch-sensor device.

As a modification example of the embodiment 2A, the function is not limited to the function of changing the pulses P to the particular touch drive electrodes Tx in the above-described touch detection area As, but there may be employed a modification example having a function which uniformly changes the pulses P for all the touch drive electrodes Tx in the touch detection area As or for the touch drive electrodes Tx in a divided region or a group unit in accordance with the accuracy of the noise detection system 200. For example, if noise in an arbitrary part in the touch detection area As is detected, the pulse changing function may temporarily change the pulses to the pulses P of the same type having uniform time t for all the touch drive electrodes Tx in the touch detection area As.

Embodiment 2B

Figure 23:
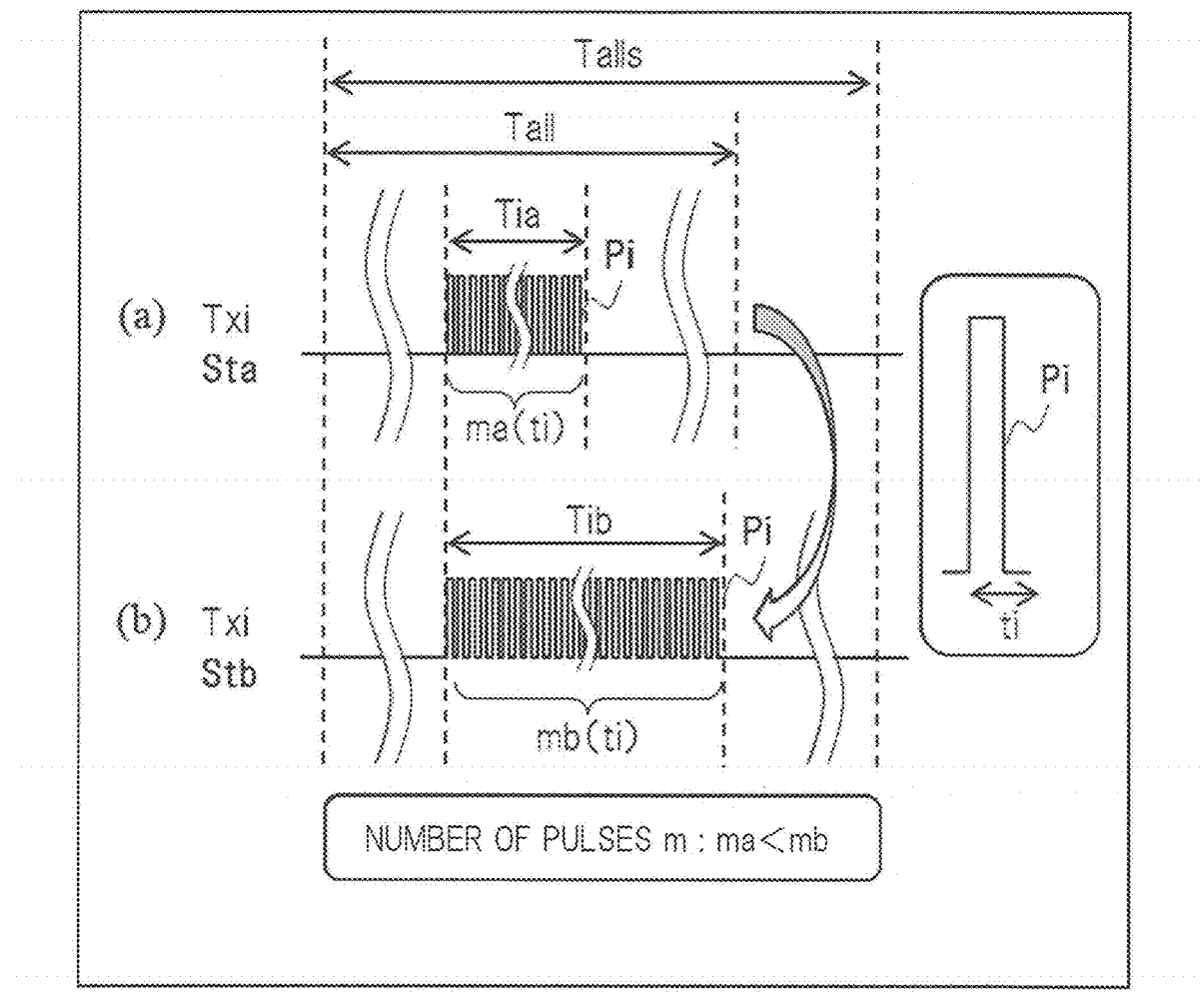
FIG. 23 is a drawing showing a touch drive sequence of a touch-sensor device of an embodiment 2B of the present invention.

FIG. 23 shows an example of a sequence of touch drive of the touch drive electrodes Tx as a configuration of a touch-sensor device 2b of an embodiment 2B. The embodiment 2B has a pulse changing function in the same manner as the embodiment 2A, and the pulse changing function of the embodiment 2B is a function which changes the number m of the pulses P of the touch drive signals St applied to each of the touch drive electrodes Tx, which is a scanning object. The touch drive time T is increased/reduced by changing the applied number m of the pulses P for each of the touch drive electrodes Tx by the function. In a case of noise detection, etc., the present pulse changing function temporarily increases/reduces the number m of the pulses P applied to part of or all of the touch drive electrodes Tx of the touch detection area As, for example, by using the above-described time allowance. For example, the present pulse changing function increases the number m of the pulses P within the range of the time allowance in a predetermined touch detection period Ks. As a result, with a trade-off of a slight increase in the touch drive time T of the touch drive electrodes Tx after the change, the touch detection sensitivity of the touch drive electrodes Tx is maintained or improved.

(a) in FIG. 23 shows touch drive time Tia of pulses Pi of a touch drive signal Sta to a certain touch drive electrode Txi before change, wherein the applied number m of the pulses Pi is ma, and the time t is ti. (b) in FIG. 23 shows touch drive time Tib of the pulses Pi of a touch drive signal Stb after change from (a) in FIG. 23 by the present pulse changing function. The applied number m of the pulses Pi is increased from ma to mb, and the time t is equal to ti. The touch drive time Tib becomes long in accordance with increase of the number m of pulses, and the total touch drive time Tall is increased to total touch drive time Talls. As a trade-off thereof, the touch detection sensitivity in the vicinity of the touch drive electrode Txi can be maintained or improved. As described above, in the embodiment 2B, in the same manner as the embodiment 2A, as the pulse changing function, the time allowance can be effectively utilized, the number m of the pulses and the touch drive time T can be suitably changed for each of the touch drive electrodes Tx, and the touch detection sensitivity can be maintained or improved as a measure against noise.

Embodiment 2C

Figure 24:
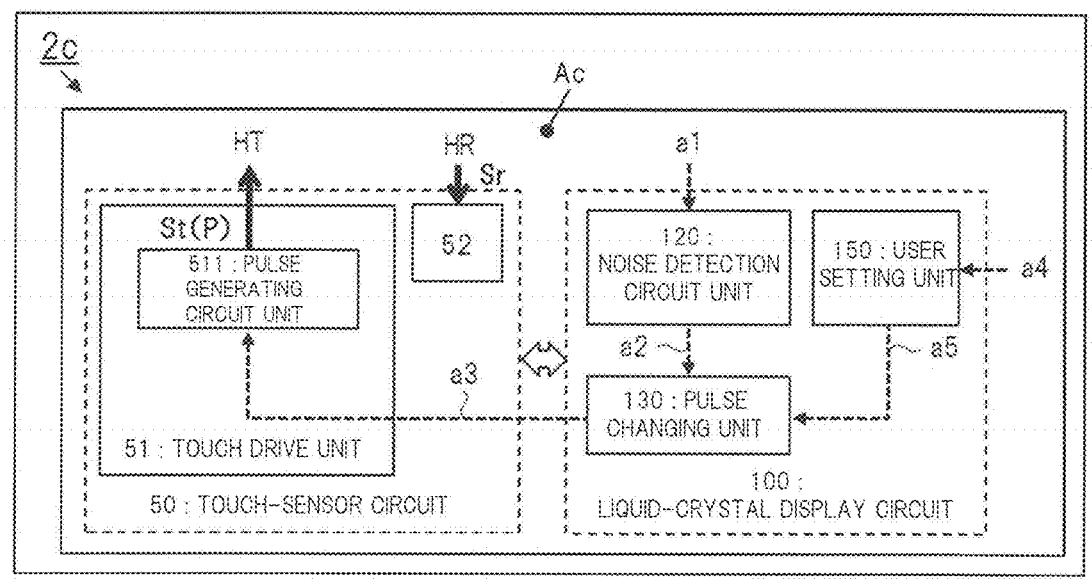
FIG. 24 is a drawing showing a functional block configuration of a circuit unit of a touch-sensor-equipped display device of an embodiment 2C of the present invention.

FIG. 24 shows a circuit functional block configuration of a touch-sensor-equipped display device 2c of an embodiment 2C. The touch-sensor-equipped display device 2c of the embodiment 2C shows a circuit configuration example of a pulse changing function corresponding to a configuration example of a later-described touch-sensor-equipped display device. The configuration of a panel unit of the touch-sensor-equipped display device 2c of the embodiment 2C is a configuration of a panel unit including a liquid-crystal display panel unit of a liquid-crystal display device like the example of FIG. 26, etc. described later. The embodiment 2C has, as circuit units mounted in the connecting side part Ac of the panel unit, the touch drive unit 51 and the touch detection unit 52, which are the touch-sensor circuit 50 similar to that of the above-described embodiments, and a liquid-crystal display circuit 100, which is a circuit unit which drives the liquid-crystal display panel unit. The liquid-crystal display circuit 100 includes a noise detection circuit unit 120, a pulse changing unit 130, and a user setting part 150.

The touch-sensor-equipped display device 2c of the embodiment 2C synchronously controls the liquid-crystal display circuit 100 and the touch-sensor circuit 50. The pulse changing unit 130 is achieved, for example, by program processing of a CPU. As a trigger of changing the above-described type of the pulses P, the embodiment 2C includes not only noise detection, but also determination by the pulse changing unit 130 in the liquid-crystal display circuit 100 side. Moreover, the embodiment 2C has the user setting part 150 as a user setting means about various functions of the present touch-sensor-equipped display device 2c including the pulse changing function.

The noise detection circuit unit 120 has a function similar to that of the noise detection system 200, detects noise a1 in a screen area of the liquid-crystal display panel unit, and outputs noise detection information a2. The screen area of the liquid-crystal display panel unit is, for example, an area in which the touch detection area As and the display area are overlapped with each other. In accordance with the noise detection information a2 from the noise detection circuit unit 120, the pulse changing unit 130 judges whether the type of the pulses P to the touch drive electrode Tx is to be changed or not, and, in accordance with the result thereof, outputs an instruction a3 of changing the type of the pulses P to the touch drive unit 51 of the touch-sensor circuit 50. The pulse generating circuit unit 511 of the touch drive unit 51 changes the type of the pulses P to the touch drive electrode Tx in the same manner as the above-described embodiment in accordance with the instruction a3. In this manner, in the embodiment 2C, control about the pulses P of the touch-sensor function is enabled by the determination by the pulse changing unit 130 in the liquid-crystal display circuit 100, which is an element in the display device side.

Moreover, the user setting part 150 enables input a4 of settings and specifications about functions of the present touch-sensor-equipped display device 2c including the pulse changing function by operations of devices such as buttons or operations on the touch detection area As by a user. For example, the touch-sensor-equipped display device 2c of the embodiment 2C prepares, in advance, some modes about the types of the pulses P and control of the change thereof such as modes corresponding to the lengths of the time t of the pulses P to enable the user to select a mode. Based on setting information a5 of the user setting part 150, the pulse changing unit 130 controls the type of the pulses P or the change thereof about the touch-sensor function. The pulse changing unit 130 gives the instruction a3 to the touch drive unit 51 so as to, for example, use the time t of the pulses P corresponding to the mode selected by the user or to change the pulses to the pulses P. As a result, for example when the user thinks the touch detection sensitivity is not good, the sensitivity can be improved by switching the mode.

As a modification example of the embodiment 2C, there may be employed a modification example such as a mode in which determination is autonomously carried out by the pulse changing unit 130 of the liquid-crystal display circuit 100 while omitting the pulse changing function using the above-described noise detection circuit unit 120 and/or the pulse changing function using the above-described user setting part 150. Moreover, there may be employed a modification example such as a mode in which the user setting part 150 is provided in the touch-sensor circuit 50 side to carry out control in a manner similar to the embodiment 2C.

Regarding the above-described embodiment 2A to the embodiment 2C, etc., combined modes of the above-described and later described embodiments can be similarly implemented. For example, in a combined mode of the embodiment 2A and the embodiment 1G, pulse change control can be independently carried out for each of the region Asa and the region Asb, which are left/right regions in the touch detection area As. In this mode, for example, only in one of the left/right regions, touch detection sensitivity can be changed by changing the frequency f of the pulses P and avoiding noise influence. In this mode, time utilization efficiency can be improved more than the case in which the types of the pulses P are changed in the entire touch detection area As.

Embodiment 3A

Next, as an embodiment 3A, application to an on-cell-type touch-sensor-equipped display device, particularly to a liquid-crystal touch panel module which is a liquid-crystal display device provided with a touch-sensor function will be described with reference to FIGS. 25 to 30. The embodiment 3A has a configuration including the touch-sensor device 1a, etc. of the embodiment 1A, etc. as elements.

[(1) Panel Unit Plane]

Figure 25:
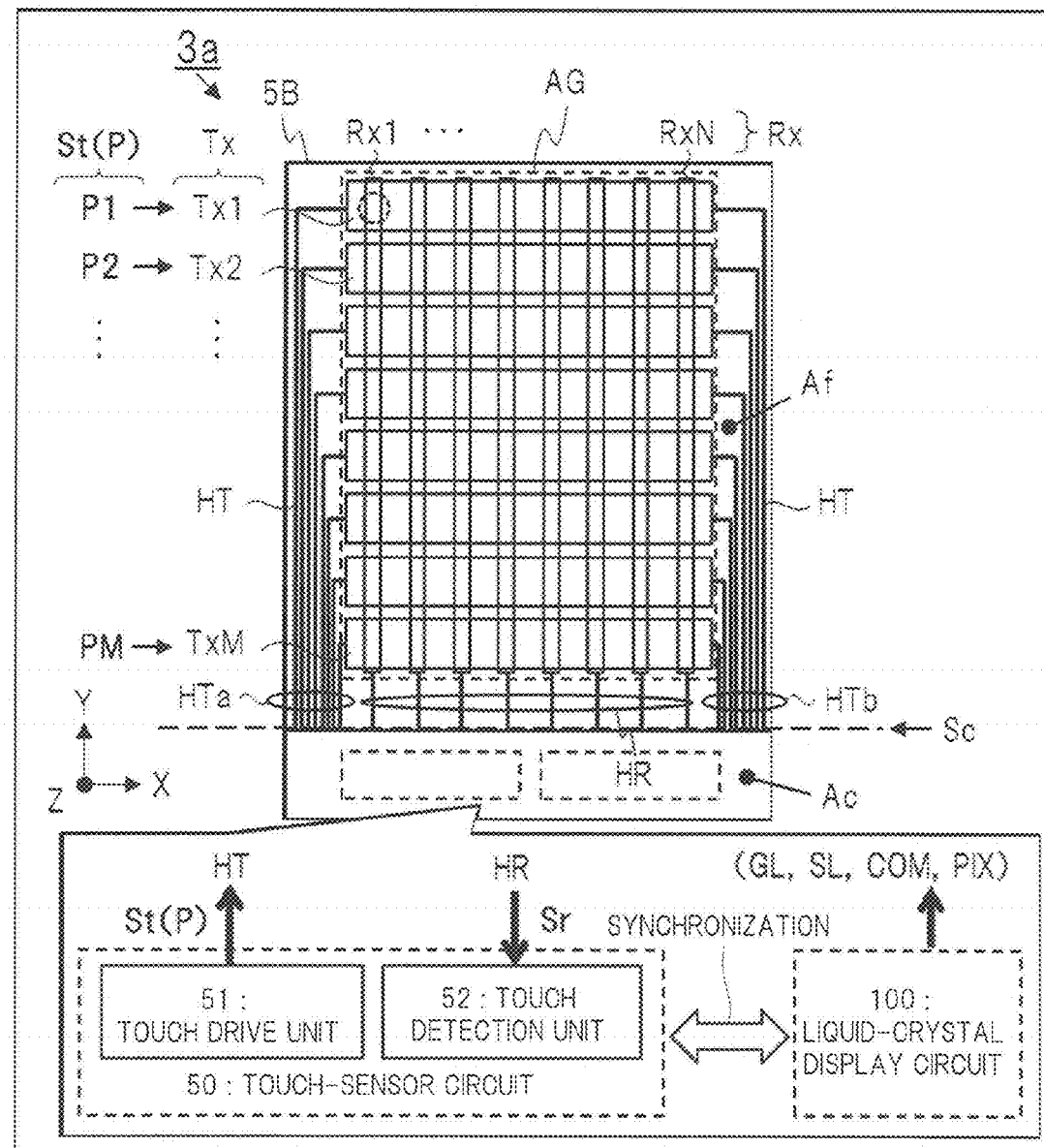
FIG. 25 is a drawing showing a configuration example of an XY-plane including electrodes, wirings, and a circuit unit as an outline of a touch-sensor-equipped display device of an embodiment 3A of the present invention.

FIG. 25 shows a configuration example of an XY-plane including electrodes, wirings, and circuit units related to a touch-sensor function as an outline of a liquid-crystal touch panel module 3a, which is a touch-sensor-equipped display device of the embodiment 3A. The part of the touch-sensor function of a panel unit 5B of the liquid-crystal touch panel module 3a has a configuration similar to that of the panel unit 5A of the touch-sensor device 1a of the above-described embodiment 1A. The constituent part related to the display function of the liquid-crystal display device will be described later. The panel unit 5B is a liquid-crystal panel unit on which the touch-sensor device is mounted and has a screen area AG, a peripheral area Af thereof, and a connecting side part Ac in a rectangle of an XY-plane. In the case of the touch-sensor-equipped display device, the screen area AG is, for example, an area in which the above-described touch detection area As and the display area Ad of the liquid-crystal display device are overlapped with each other.

In the connecting side part Ac, the circuit unit including the touch-sensor circuit 50 and the liquid-crystal display circuit 100 are mounted. The touch-sensor circuit 50 includes the touch drive unit 51 and the touch detection unit 52 in the same manner as the above-described embodiments. The liquid-crystal display circuit 100 is the circuit unit which drives the liquid-crystal display panel unit and includes the circuit unit which drives common (shared) electrodes COM, pixel electrodes PIX, gate lines GL, source lines SL, etc., which are electrodes constituting the pixels of the liquid-crystal display device of later-described FIG. 27. The liquid-crystal touch panel module 3a of the embodiment 3A causes the display function and the touch-sensor function of the liquid-crystal display device to be synchronized with each other by synchronously controlling the liquid-crystal display circuit 100 and the touch-sensor circuit 50. As the synchronous control, for example, timing signals and control signals are given from a first-side circuit unit to a second-side circuit unit, and the second-side circuit unit operates in accordance with the given signals. For example, the timing signals and control signals for synchronizing touch detection with moving-image display are given from the liquid-crystal display circuit 100 to the touch-sensor circuit 50, and touch detection information is given from the touch-sensor circuit 50 to the liquid-crystal display circuit 100.

[(2) Panel Unit Cross Section]

Figure 26:
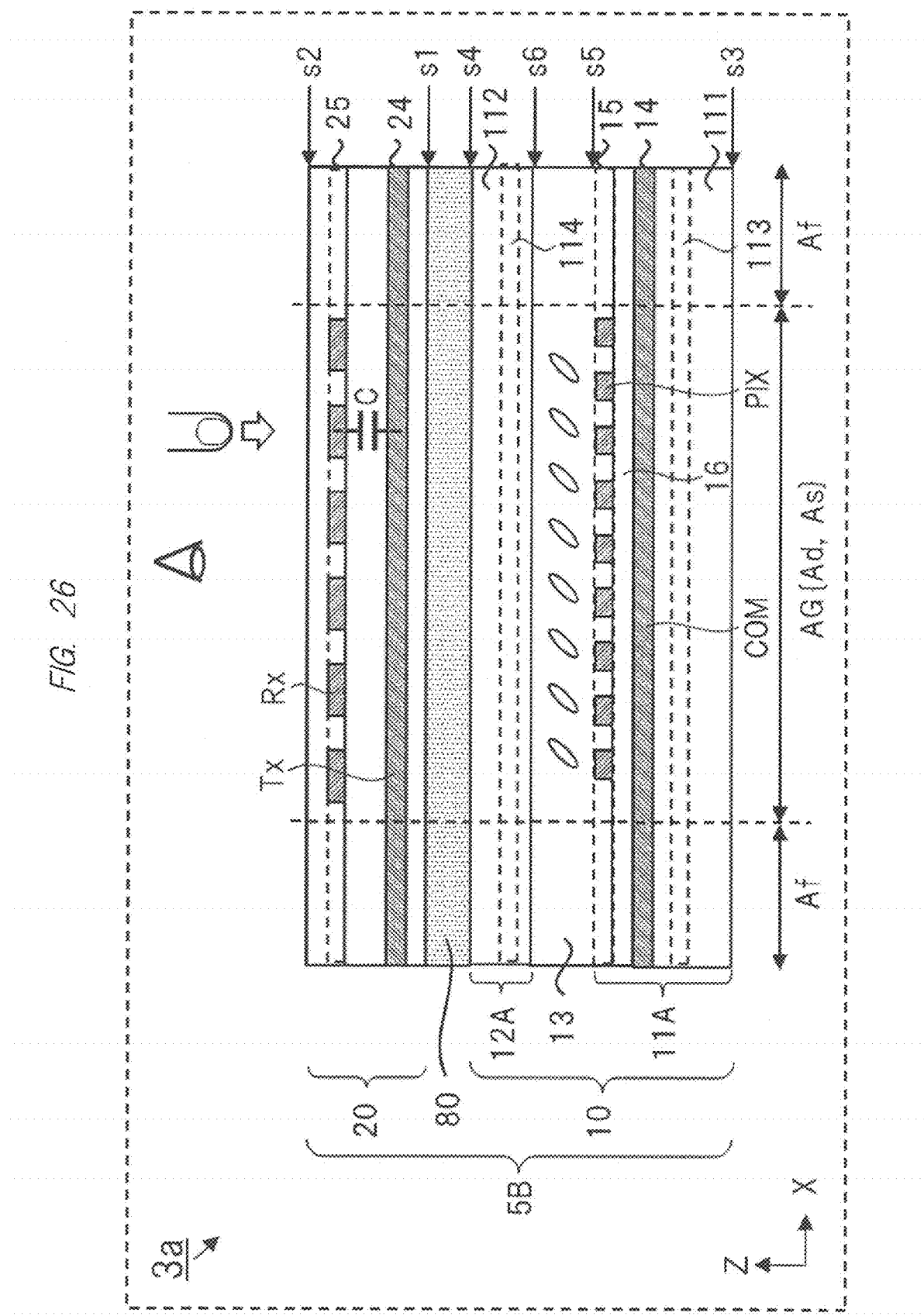
FIG. 26 is a drawing showing a schematic XZ cross section of a panel unit of the touch-sensor-equipped display device of the embodiment 3A.

FIG. 26 shows a schematic XZ cross-sectional view of particularly the panel unit 5B of the liquid-crystal touch panel module 3a of the embodiment 3A. The panel unit 5B has a liquid-crystal display panel unit 10 and a touch panel unit 20 externally coupled to the liquid-crystal display panel unit 10. The touch panel unit 20 has a configuration similar to that of the panel unit 5A of the touch-sensor device 1a of above-described FIG. 7. A front surface s4 of the liquid-crystal display panel unit 10 and a back surface s1 of the touch panel unit 20 are coupled to each other by an adhesive layer 80. The adhesive layer 80 may be an air layer. In that case, the front surface s4 of the liquid-crystal display panel unit 10 and the back surface s1 of the touch panel unit 20 are disposed, for example, so that they are in contact with each other, and the liquid-crystal display panel unit 10 and the touch panel unit 20 are retained by the peripheral area Af, etc.

The liquid-crystal display panel unit 10 has a TFT board 11A, which is a first board structure in a Z-direction rear surface side; a color filter board 12A, which is a second board structure in the front surface side; and a liquid crystal layer 13, which is a display function layer sealed therebetween. A publicly known polarizing plate, etc. are coupled to a rear surface s3 and the front surface s4 of the liquid-crystal display panel unit 10, and a publicly known backlight, etc. are coupled to the rear surface s3, although illustration thereof is omitted.

The liquid crystal layer 13 is a layer which seals liquid crystals and controls the orientations thereof. Publicly known oriented films are formed on a lower surface s5 and an upper surface s6 which are Z-direction lower/upper surfaces of the liquid crystal layer 13; however, illustration thereof is omitted. Moreover, the liquid crystal layer 13 includes a sealing part in a region corresponding to the peripheral area Af, but illustration thereof is omitted. The present embodiment shows a case in which fringe field switching (FFS), which is a type of a transverse electric field type is applied as a liquid crystal type to the liquid crystal layer 13; however, the type is not limited to this, and various types can be applied. In the case of FFS, in a TFT board 11A, the common electrodes COM and the pixel electrodes PIX are provided to be overlapped in the Z-direction perpendicular to the board surface via a dielectric layer 16 therebetween. Based on control of the voltages from the circuit units with respect to the common electrodes COM, the pixel electrodes PIX, etc., the orientations of the liquid crystals of the liquid crystal layer 13 are controlled. In FFS, an electric field which is oblique or parabolic mainly to the surface of the board, a so-called fringe electric field is generated.

Figure 27:
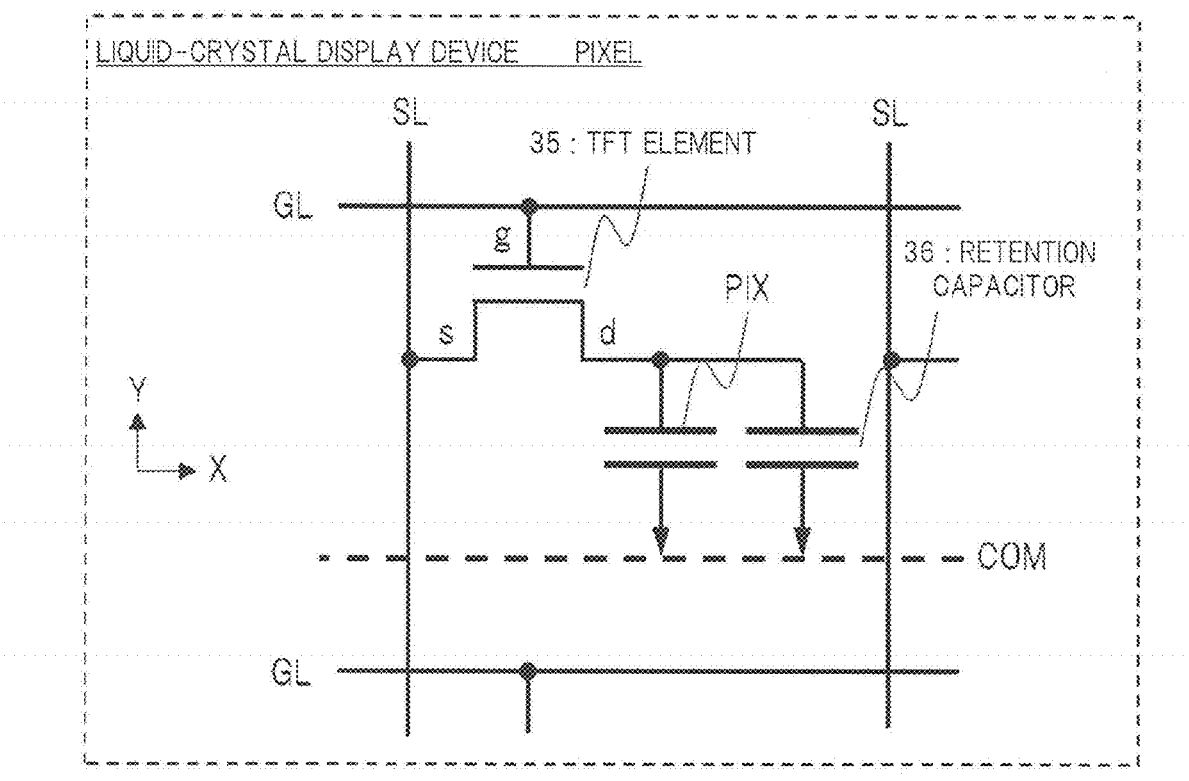
FIG. 27 is a drawing showing a configuration of a pixel of a liquid-crystal display device of the embodiment 3A.

In the TFT board 11A, a TFT layer 113, a common electrode layer 14, the dielectric layer 16, a pixel electrode layer 15, etc. are formed on a glass substrate 111. The TFT layer 113 briefly shows a layer in which TFT elements 35, the gate lines GL, the source lines SL, etc. as shown in later-described FIG. 27 are formed on the glass substrate 111. The common electrode layer 14 shows a layer in which a pattern of the common electrode COM is formed. The pixel electrode layer 15 shows a layer in which a pattern of the pixel electrodes PIX is formed. In the display area Ad included in the screen area AG, the common electrode COM is formed as a common electrode part regardless of the pixels, and the pixel electrodes PIX are formed as individual electrode parts corresponding to an arrangement of the pixels.

In the color filter board 12A, a color filter layer 114, etc. are formed in a glass substrate 112. The color filter layer 114 briefly shows a layer in which color filters of colors, a light shielding film, an overcoat film, etc. are formed. For example as a result of forming the light shielding film, in the peripheral area Af, the above-described wirings HT and the wirings HR, which are routed wirings, become invisible from the Z-direction front surface side.

[(3) Pixels of Liquid Crystal Display Device]

FIG. 27 shows a configuration of an equivalent circuit of the pixels in the liquid-crystal display device of a thin-film transistor (TFT) type corresponding to the configuration of FIG. 26. In the liquid-crystal display panel unit 10, pixels are formed corresponding to respective intersecting parts of the gate lines GL parallel to the X-direction and the source lines SL parallel to the Y-direction. The pixel has the TFT element 35, which is a switch element, the pixel electrode PIX, and a retention capacitor 36. A gate terminal g of the TFT element 35 is coupled to the gate line GL, a source terminal s is coupled to the source line SL, a drain terminal d is coupled to first-side terminals of the pixel electrode PIX and the retention capacitor 36. The gate lines GL are a scanning line for selecting the pixels of the display area Ad, and the source lines SL are data lines for giving display data to the pixels of the display area Ad. In the present specification, the data lines are also referred to as signal lines. Second-side terminals of the pixel electrode PIX and the retention capacitor 36 are commonly coupled among the pixels as the common electrode COM.

[(4) Liquid-Crystal Touch Panel Module and Electronic Device]

Figure 28:
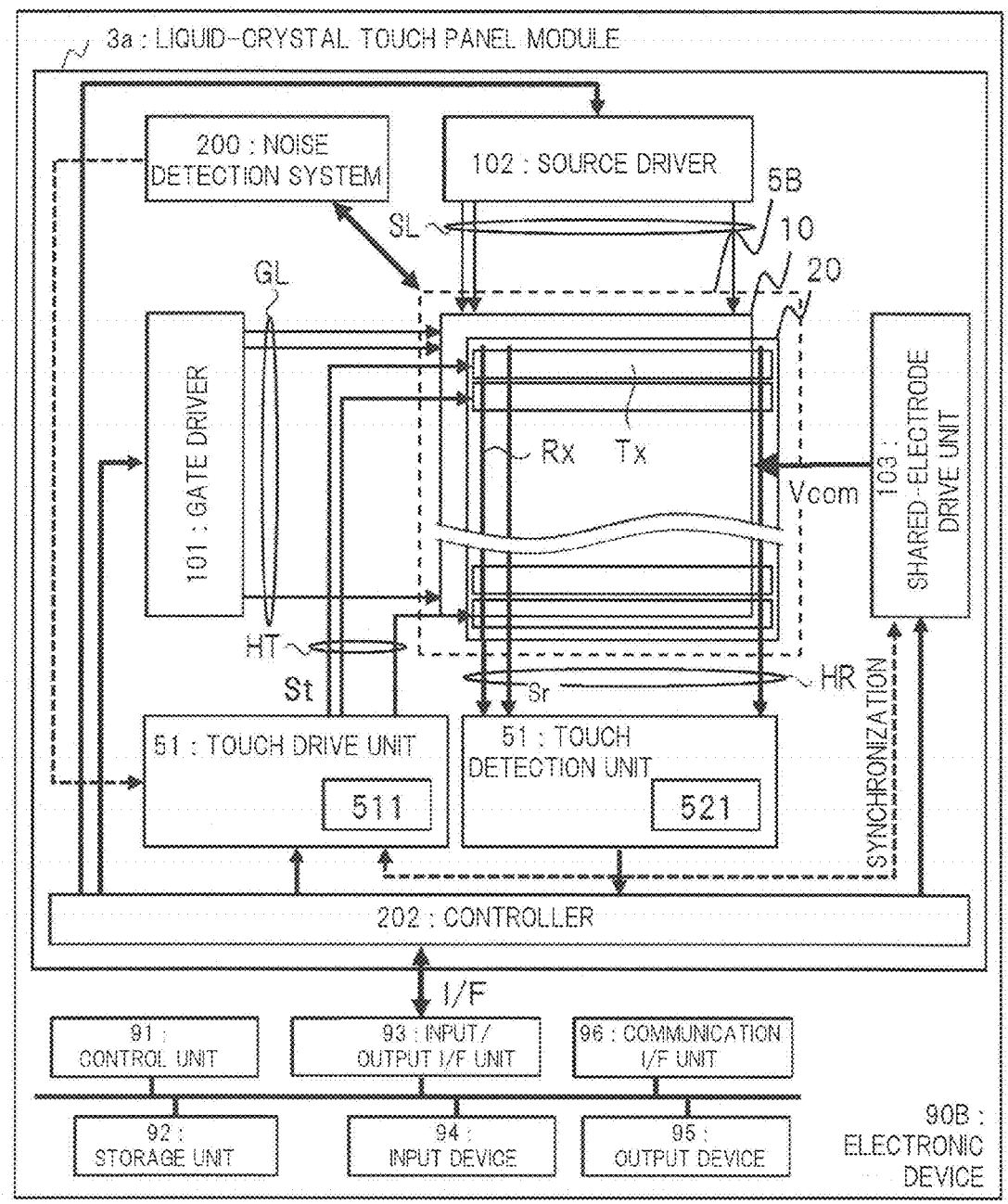
FIG. 28 is a drawing showing a configuration including circuit functional blocks of the touch-sensor-equipped display device of the embodiment 3A and a configuration of an electronic device provided with the display device.

FIG. 28 shows particularly a circuit functional block configuration of the liquid-crystal touch panel module 3a of the embodiment 3A and a configuration of an electronic device 90B including the liquid-crystal touch panel module 3a. The liquid-crystal touch panel module 3a includes: a controller 202; a gate driver 101, which is a drive part of the gate lines GL serving as the liquid-crystal display circuit 100; a source driver 102, which is a drive part of the source lines SL; a common-electrode drive part 103, which is a drive part of the common electrode COM; and the touch drive unit 51 and the touch detection unit 52 serving as the above-described touch-sensor circuit 50. The liquid-crystal touch panel module 3a of the present embodiment 3A is further provided with the noise detection system 200 and the pulse changing function of the embodiment 2A.

The controller 202 is provided as a higher-level control unit of the liquid-crystal display circuit 100 and the touch-sensor circuit 50, i.e., as a control unit of the present liquid-crystal touch panel module 3a. The above-described liquid-crystal display circuit 100 and the touch-sensor circuit 50 may be configured to be synchronously controlled while omitting the controller 202. The controller 202 works together with the control unit 91 of the electronic device 90B via the input/output I/F part 93 and controls the touch-sensor function and the display function based on instructions from the control unit 91. The controller 202 gives control instructions of touch drive to the touch drive unit 51 and receives touch detection information such as presence/absence, position, etc. of touch from the touch detection unit 52. Moreover, the controller 202 gives drive control signals to the gate driver 101, the source driver 102, and the common-electrode drive part 103, which are the circuit units related to the liquid-crystal display circuit 100. Moreover, the controller 202 transmits touch detection information as a report to the control unit 91.

The gate driver 101 subjects the group of the gate lines GL of the liquid-crystal display panel unit 10 to scanning drive by scanning signals. The source driver 102 gives data signals to the group of the source lines SL of the liquid-crystal display panel unit 10 in synchronization with the scanning of the gate lines GL. The common-electrode drive part 103 applies a common-drive voltage Vcom to the common electrode COM of the liquid-crystal display panel unit 10.

Based on the control instructions from the controller 202, the touch drive unit 51 applies the pulses P of the touch drive signals St to the plurality of touch drive electrodes Tx of the touch panel unit 20 by the above-described pulse generating circuit unit 511, etc. while synchronizing with the common-electrode drive part 103. Along with that, the touch detection unit 52 detects the touch detection signals Sr caused by the pulses P from the plurality of touch detection electrodes Rx of the touch panel unit 20, calculates the presence/absence, positions, etc. of touch by the touch-position calculating part 521 similar to that of above-described FIG. 9, and obtains the touch detection information. Moreover, based on the noise detection information of the panel unit 5B according to the noise detection system 200, the touch drive unit 51 changes the types of the pulses P by using the pulse changing unit 513 in the same manner as above-described FIG. 21.

In the liquid-crystal touch panel module 3a of the embodiment 3A, the aspect of mounting the touch-sensor circuit 50 and the liquid-crystal display circuit 100 may be, for example, an aspect in which an IC chip is mounted on the glass substrate in the connecting side part Ac or an aspect in which a flexible printed board on which an IC chip is mounted is coupled. In the drawing, the panel unit 5B is separated from the circuit units; however, the circuit units can be mounted on the glass substrate of the panel unit 5B. The circuit units can be in such aspects that they are arbitrarily integrated or separated from each other.

The electronic device 90B includes the liquid-crystal touch panel module 3a, the control unit 91, the storage unit 92, the input/output I/F unit 93, the input device 94, the output device 95, the communication I/F unit 96, buses, other unshown power-source parts, etc. The control unit 91 is composed of, for example, a CPU, a ROM, a RAM, a program(s) operated thereon, etc. For example, the CPU carries out control processing of the electronic device 90B by arithmetic processing in accordance with the program loaded from the ROM to the RAM. The storage unit 92 is composed of a primary memory, a secondary memory, data information stored therein, etc. The input/output I/F unit 93 is coupled to the liquid-crystal touch panel module 3a and carries out interface processing thereof. The control unit 91 of the electronic device 90B, for example, receives input of video signals from outside or generates video signals therein and stores the signals in the storage unit 92. The video signals and control instruction information are given from the control unit 91 to the controller 202 via the input/output I/F unit 93. In accordance with that, the controller 202 gives video data, timing signals, etc. to the liquid-crystal display circuit 100.

[(5) Drive Period]

Figure 29:
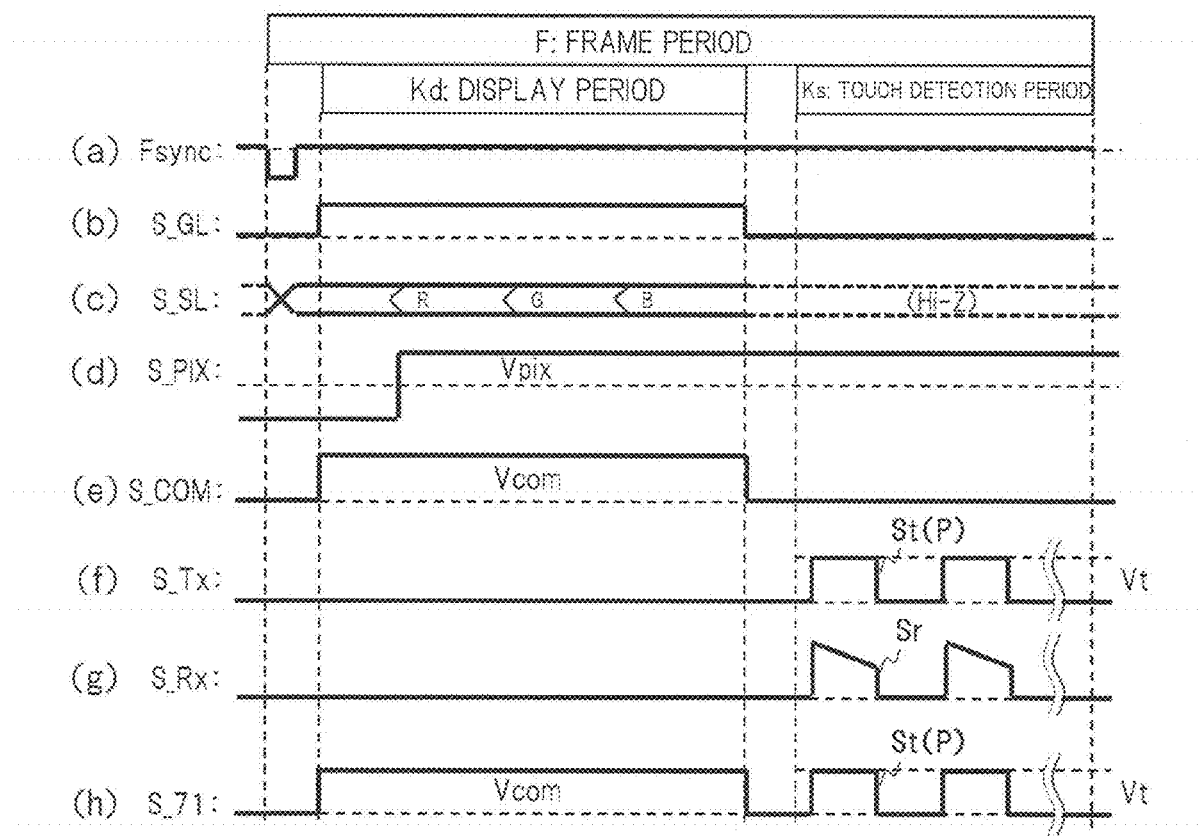
FIG. 29 shows a configuration example of a timing chart of signals and voltages in a frame period of the embodiment 3A or an embodiment 4A.

FIG. 29 shows a timing chart of the signals and voltages to the electrodes of the panel unit 5B as a configuration example of frame periods in the embodiment 3A. Particularly, the drawing shows a case of the type in which the display period Kd for the display function of the liquid-crystal display device and the touch detection period Ks for the touch-sensor function are provided by time division in the frame period F. The display period Kd includes a pixel writing period for displaying frame images of the liquid-crystal display device. The order of the display period Kd and the touch detection period Ks in the frame period F may be reversed.

An Fsync signal of FIG. 29 (a) specifies the frame period F. S_GL of FIG. 29 (b) shows the scanning signal from the gate driver 101 to the gate line GL. S_SL of FIG. 29 (c) shows the data signal from the source driver 102 to the source line SL. S_PIX of FIG. 29 (d) shows an example of a pixel voltage Vpix applied to the pixel electrode PIX in accordance with the transmission rate of the pixel. S_COM of FIG. 29 (e) shows the common voltage Vcom applied from the common-electrode drive part 103 to the common electrode COM in the display period Kd. S_Tx of FIG. 29 (f) shows the pulses P of the touch drive signal St applied from the touch drive unit 51 to the touch drive electrode Tx, which is a scanning object, in the touch detection period Ks. S_Rx of FIG. 29 (g) shows the pulses input from the touch detection electrode R to the touch detection unit 52 and detected as the touch detection signal Sr in the touch detection period Ks. S_71 of FIG. 29 (h) shows a drive example of a shared electrode 71 in a case of an in-cell-type touch-sensor-equipped display device of a later-described embodiment 4A.

Figure 30:
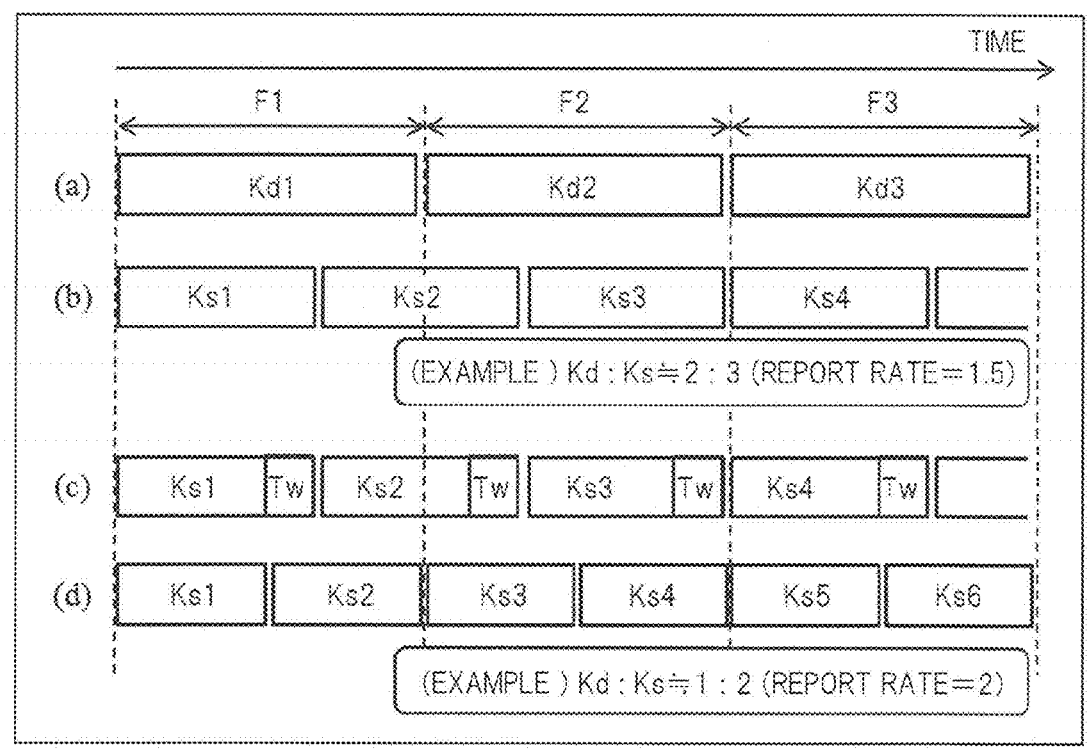
FIG. 30 is a drawing showing a configuration example of drive periods of the embodiment 3A.

FIG. 30 shows other configuration examples of the drive period in the embodiment 3A. The examples of FIG. 30 show the cases in which the frame periods F such as a frame period F1, a frame period F2, etc. are synchronized with the display periods Kd; however, the display periods Kd and the touch detection periods Ks are asynchronously driven. FIG. 30 (a) shows a display period Kd1, a display period Kd2, etc., which are the plurality of display periods Kd synchronized with the frame periods F in a time direction. FIG. 30 (b) shows a touch detection period Ks1, a touch detection period Ks2, etc., which are the plurality of touch detection periods Ks using the touch detection period Ks shorter than the display period Kd. In the case of the on-cell-type touch-sensor-equipped display device like the embodiment 3A, basically, the liquid-crystal display panel unit 10 and the touch panel unit 20 can be independently driven; therefore, the display periods Kd and the touch detection periods Ks can be asynchronously driven like FIG. 30. In the example of FIG. 30, the time ratio of the display period Kd to the touch detection period Ks is 2:3. When referred to as a report rate of the touch detection information, the ratio is 1.5, and touch detection information can be reported three times per two-frame display.

FIG. 30 (c) shows the touch detection periods Ks of which lengths have been shortened with respect to FIG. 30 (b) by the above-described adjustment of the pulses P. In FIG. 30(c), as an example of the touch detection periods Ks, touch detection periods Ks1 to Ks4 are illustrated. Tw shows time generated by the shortening. In order to facilitate understanding, illustration of Tw is somewhat enlarged. As shown in FIG. 30 (d), the ratio of the time of the touch detection period Ks with respect to the frame period F and the display period Kd can be reduced, for example, the ratio of the display period Kd to the touch detection period Ks can be changed to 1:2, and, for example, the report rate can be increased to 2. Note that, in FIG. 30, the frame period Kd3 is a frame following the frame period F3. In FIG. 30(a), the display period Kd3 is a display period for synchronizing with the frame period F3. In FIG. 30(d), between the frame period F1 and the frame period F3, the touch detection periods Ks1 to Ks6 are provided.

As described above, according to the embodiment 3A, in the on-cell-type liquid-crystal touch panel module 3a, the total touch drive time and the touch detection period Ks of the screen area AG can be shortened or increase thereof can be suppressed, and efficient touch detection can be achieved. According to the embodiment 3A, for example, the report rate can be improved. Moreover, in the embodiment 3A, by providing the pulse changing function using the noise detection, even when there is noise in the screen area AG, the touch detection sensitivity can be maintained or improved.

Embodiment 4A

Next, as an embodiment 4A, a case of application to an in-cell-type touch-sensor-equipped display device, particularly, a liquid-crystal touch panel module which is a liquid-crystal display device provided with the touch-sensor function will be explained by using FIGS. 31 to 36. The embodiment 4A has a configuration including the touch-sensor device 1a, etc. as elements, but has a configuration of the panel unit, circuit units, etc. different from that of the embodiment 3A since this is an in-cell type. In the embodiment 4A, as the in-cell type, the above-described touch drive electrodes Tx are formed as shared electrodes 71, which are formed by integration with the common electrode COM of the liquid-crystal display panel unit, and are built in the liquid-crystal display panel unit.

[(1) Panel Unit Plane]

Figure 31:
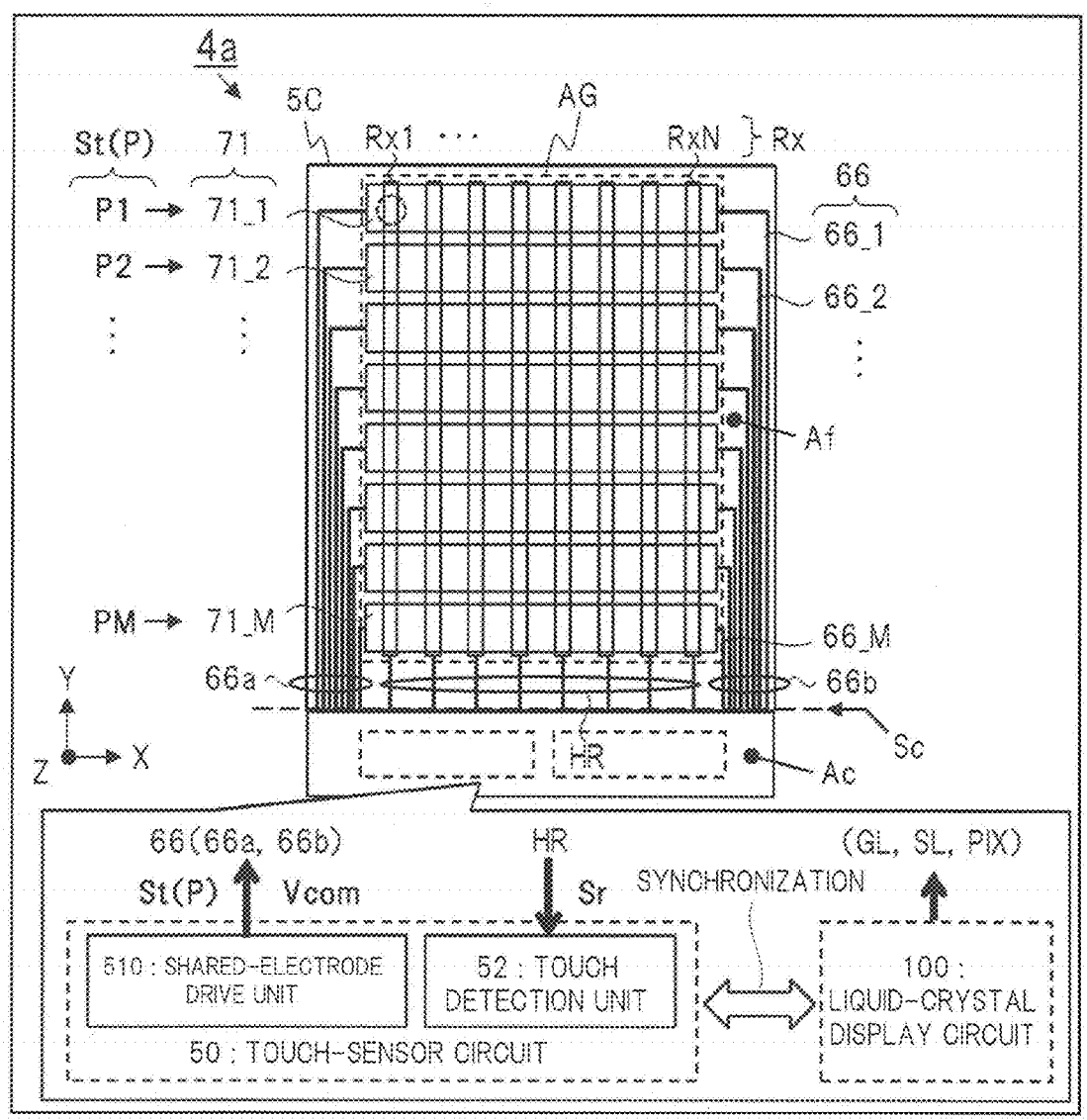
FIG. 31 is a drawing showing a configuration example of an XY-plane including electrodes, wirings, and a circuit unit as an outline of a touch-sensor-equipped display device of the embodiment 4A of the present invention.

FIG. 31 shows a configuration example of an XY-plane including electrodes, wirings, and circuit units related to the touch-sensor function as an outline of the liquid-crystal touch panel module 4a, which is a touch-sensor-equipped display device of the embodiment 4A. A panel unit 5C of the liquid-crystal touch panel module 4a has the screen area AG, the peripheral area Af thereof, and the connecting side part Ac in the rectangle of the XY-plane. The screen area AG has the shared electrodes 71 instead of the above-described touch drive electrodes Tx. The shared electrodes 71 have shapes, for example, similar to those of the above-described touch drive electrodes Tx and are composed of a plurality of blocks parallel to the X-direction. As the blocks of the plurality of (M) shared electrodes 71, a shared electrode 71_1, a shared electrode 71_2, to a shared electrode 71_M are shown sequentially from the Y-direction upper side.

The blocks of the shared electrodes 71 are respectively coupled to wirings 66, which are routed wirings for the shared electrodes 71, in the peripheral area Af. For example, as the wirings 66, in the same manner as the above-described embodiment 1A, a wiring part 66a and a wiring part 66b, which are wiring parts of left/right regions in the peripheral area Af, are provided. In the shown case, the shapes of the wirings are similar to those of the embodiment 1A, the time constants thereof are different depending on the differences in the lengths of the wirings 66. Sequentially from the Y-direction upper side, the plurality of (M) wirings 66 are shown by a wiring 66_1, a wiring 66_2 to a wiring 66_M.

In the connecting side part Ac, circuit units including the touch-sensor circuit 50 and the liquid-crystal display circuit 100 supporting the in-cell type are mounted. The touch-sensor circuit 50 includes a shared-electrode drive unit 510 and the touch detection unit 52. In the same manner as the above-described embodiment 3A, the liquid-crystal display circuit 100 includes circuit units which drive the pixel electrodes PIX, the gate lines GL, the source lines SL, etc., which are the electrodes composing the display function of the liquid-crystal display device. In the embodiment 4A, the display function and the touch-sensor function are synchronized by synchronously controlling the liquid-crystal display circuit 100 and the touch-sensor circuit 50. For example, from the liquid-crystal display circuit 100 to the touch-sensor circuit 50, timing signals and control signals for synchronizing touch detection with moving-image display are given, control signals, etc. for driving the shared electrodes 71 as a shared electrode function are given, and touch detection information is given from the touch-sensor circuit 50 to the liquid-crystal display circuit 100.

From the shared-electrode drive unit 510, the voltages Vcom for common drive are output when the shared electrodes 71 are to be driven as a common electrode function, and the touch drive signals St are output when the shared electrodes 71 are to be driven as a touch drive electrode function. The shared-electrode drive unit 510 generates, as the touch drive signals St, the pulses P of a plurality of types of which time t has been adjusted in accordance with the time constants depending on the differences in the lengths of the wirings 66 for the shared electrodes 71, for example, generates the pulses P to the pulses PM, which are the pulses P of the plurality of (M) types similar to those of the embodiment 1A. Then, the shared-electrode drive unit 510 applies the pulses P1 to the pulses PM to the shared electrodes 71 associated with the pulses P in the screen area AG through the wirings 66.

In FIG. 31, as a configuration example of mounting of the circuit units of the panel unit 5C, there can be used a configuration in which the touch-sensor circuit 50 and the liquid-crystal display circuit 100 excluding the touch detection unit 52 are mounted as respective IC chips, and synchronous control is carried out by the two IC chips. As another configuration example of mounting, there can be employed a configuration in which the touch-sensor circuit 50 and the liquid-crystal display circuit 100 excluding the touch detection unit 52 are mounted as one IC chip. Other than that, there can be used a configuration in which the circuit units are mounted as respective IC chips, and synchronous control is carried out.

[(2) Panel Unit Cross Section]

Figure 32:
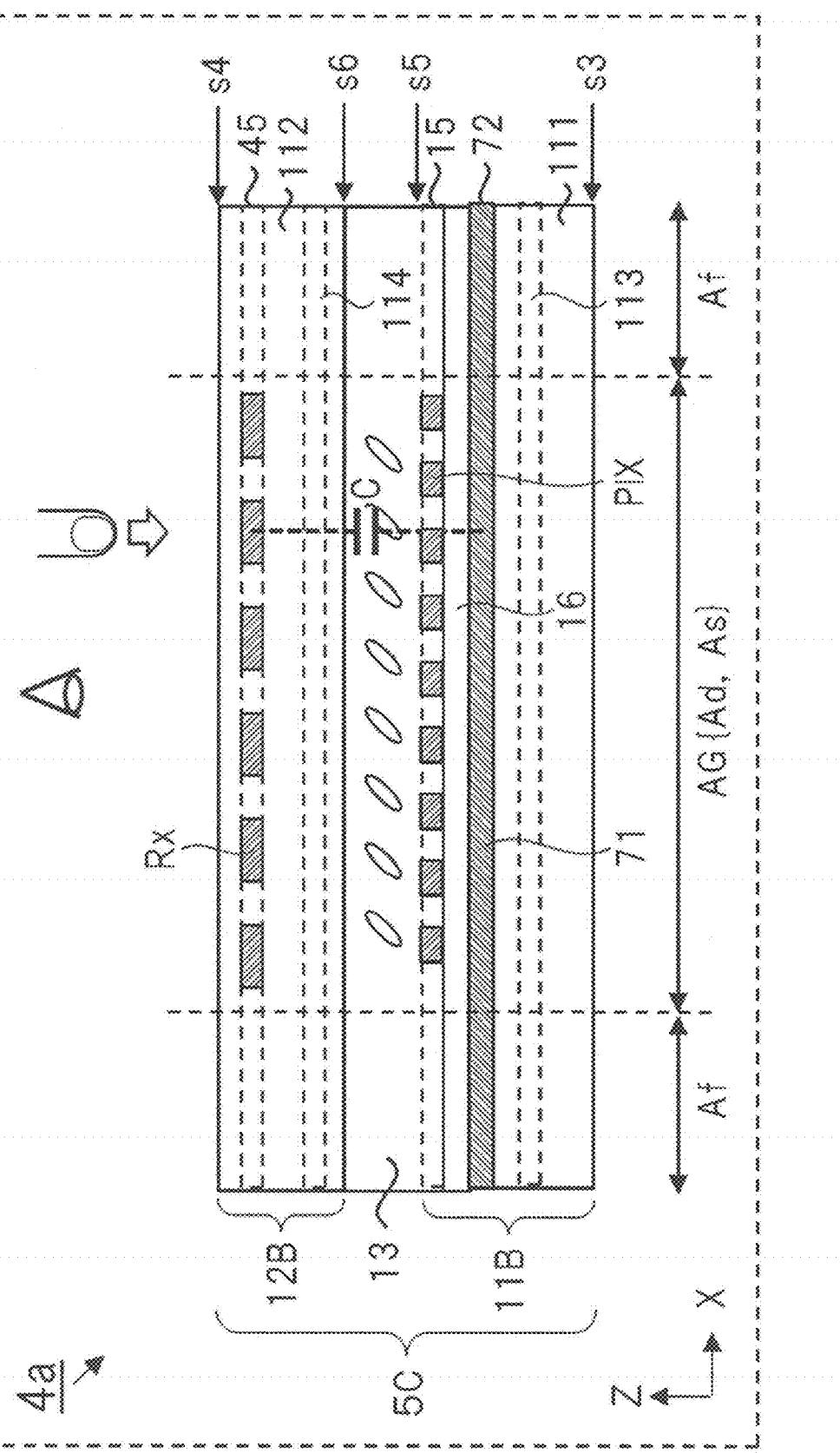
FIG. 32 is a drawing showing a configuration of a schematic XZ cross section of a panel unit of the touch-sensor-equipped display device of the embodiment 4A.

FIG. 32 is a schematic XZ cross-sectional view of the liquid-crystal touch panel module 4a of the embodiment 4, particularly, the panel unit 5C. The panel unit 5C is a liquid-crystal display panel unit in which the shared electrodes 71 are built as the in-cell type and has a TFT board 11B, which is a first board structure in the Z-direction rear surface side; a color filter board 12B, which is a second board structure on the front surface side; and the liquid crystal layer 13, which is a display function layer sealed therebetween. The liquid crystal layer 13 shows a case in which FFS is applied in the same manner as the embodiment 3A. In the TFT board 11B, the shared electrodes 71 and the pixel electrodes PIX are provided to be overlapped with each other in the Z-direction perpendicular to the board surface via the dielectric layer 16. Based on control of the electrodes from the circuit units to the shared electrodes 71, the pixel electrodes PIX, etc., the orientations of the liquid crystals of the liquid crystal layer 13 are controlled.

In the TFT board 11B, the TFT layer 113, a shared electrode layer 72, the dielectric layer 16, and the pixel electrode layer 15 are formed on the glass substrate 111. The TFT layer 113 briefly shows a layer in which the TFT elements 35, the gate lines GL, the source lines SL, etc. are formed on the glass substrate 111. The shared electrode layer 72 shows a layer in which a pattern of the shared electrodes 71 is formed. The position of the shared electrode layer 72 is same as the position at which the common electrode layer 14 is formed in the embodiment 3A. The pixel electrode layer 15 shows a layer in which a pattern of the pixel electrodes PIX is formed. The shared electrode layer 72 includes a part where ends of the shared electrodes 71 and the wirings 66 for the shared electrodes are coupled to each other in the peripheral area Af.

In the color filter board 12B, the color filter layer 114 and a touch detection electrode layer 45 are formed in the glass substrate 112. The color filter layer 114 briefly shows a layer in which color filters of colors, a light shielding film, an overcoat film, etc. are formed in the same manner as the above-described embodiment 3A. The color filter layer 114 is formed, for example, in a side close to the upper surface s6 of the liquid crystal layer 13. The touch detection electrode layer 45 is a layer in which a pattern of the touch detection electrodes Rx is formed and is formed, for example, at a position close to the front surface s4 of the color filter board 12B.

The capacitor C corresponding to the unit of touch detection U is formed by the pair of the shared electrode 71 in the TFT board 11B side and the touch detection electrode Rx in the color filter board 12B side. The cross-sectional views of FIG. 32, etc. are schematic; and, upon mounting, for example, the Z-direction thickness of the liquid crystal layer 13 is smaller than that of the board, and other dimensions and ratios are also changed to those supporting the mounting. The structure of the in-cell-type liquid-crystal touch panel module 4a not limited to the above-described one can be used; and, for example, the type is not limited to the FFS type, and others can be applied.

[(3) Liquid-Crystal Touch Panel Module and Electronic Device]

Figure 33:
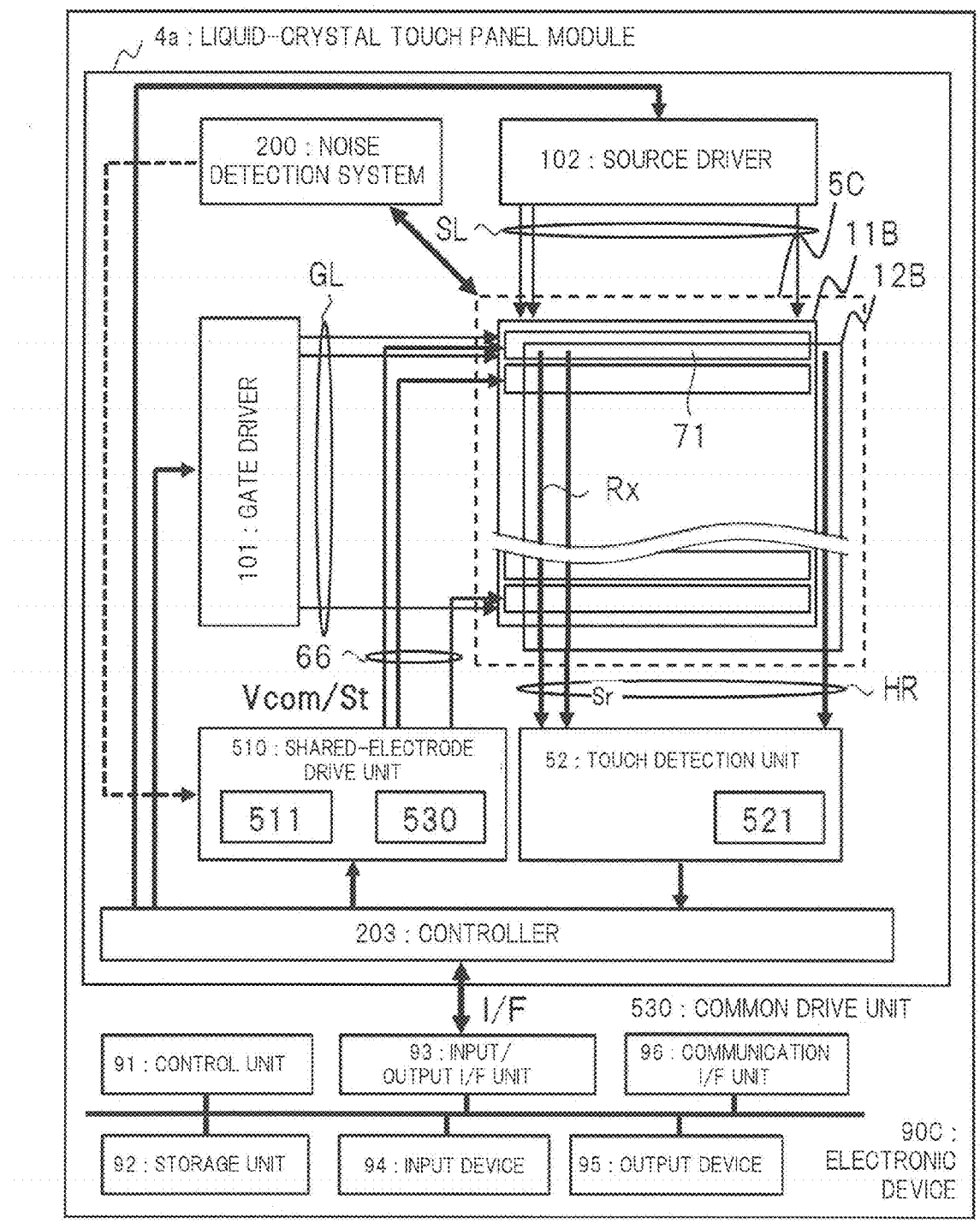
FIG. 33 is a drawing showing a configuration including circuit functional blocks of the touch-sensor-equipped display device of the embodiment 4A and a configuration of an electronic device provided with the display device.

FIG. 33 shows, particularly, a circuit function block configuration of the liquid-crystal touch panel module 4a of the embodiment 4A and a configuration of an electronic device 90C including the liquid-crystal touch panel module 4a. The liquid-crystal touch panel module 4a includes a controller 203, the gate driver 101 and the source driver 102 serving as the liquid-crystal display circuit 100, and the shared-electrode drive unit 510 and the touch detection unit 52 serving as the above-described touch-sensor circuit 50. The liquid-crystal touch panel module 4a of the embodiment 4A is further provided with the noise detection system 200 and the pulse changing function of the embodiment 2A.

The controller 203 is provided as a higher-level control unit of the liquid-crystal display circuit 100 and the touch-sensor circuit 50, i.e., as a control unit of the liquid-crystal touch panel module 4a. The above-described liquid-crystal display circuit 100 and the touch-sensor circuit 50 may be configured to be subjected to synchronous control while omitting the controller 203. The controller 203 works together with the control unit 91 of the electronic device 90C via the input/output I/F unit 93 and controls the touch-sensor function and the display function based on instructions from the control unit 91. The controller 203 gives control signals of common drive related to the shared electrodes 71 and control signals of touch drive to the shared-electrode drive unit 510 and receives touch detection information from the touch detection unit 52. Moreover, the controller 203 gives drive control signals to the gate driver 101 and the source drive 102, which are the circuit units related to the liquid-crystal display circuit 100. Moreover, the controller 203 transmits the touch detection information as a report to the control unit 91. The gate driver 101 and the source driver 102 drive the group of the corresponding electrodes of the TFT board 11B in the same manner as the embodiment 3A.

The shared-electrode drive unit 510 is provided with a common drive unit 530 in addition to the above-described pulse generating circuit unit 511, the scanning circuit unit 512, etc. The pulse generating circuit unit 511, etc. are used when the shared electrodes 71 are driven as the touch drive electrode function in the touch detection periods Ks of later-described FIG. 36. The common drive unit 530 is a circuit unit for common drive related to the plurality of shared electrodes 71 and is used when the shared electrodes 71 are subjected to common drive as the common electrode function in the display periods Kd of later-described FIG. 36.

Based on the control instruction from the controller 203, the shared-electrode drive unit 510 drives the shared electrodes 71 while synchronizing the pulse generating circuit unit 511, etc. with the common drive unit 530 by time division. In the display periods Kd, the shared-electrode drive unit 510 applies the common voltage Vcom to the shared electrodes 71 of the TFT board 11B through the wirings 66 by the common drive unit 530. In the touch detection periods Ks, the shared-electrode drive unit 510 applies the pulses P of the touch drive signals St to the plurality of shared electrodes 71 of the TFT board 11B through the wirings 66 by the pulse generating circuit unit

511, etc. Along with that, the touch detection unit 52 detects the pulses P, which are from the plurality of touch detection electrodes Rx of the color filter board 12B, as the touch detection signals Sr, calculates the presence/absence, positions, etc. of touch by the above-described touch-position calculating part 521, and obtains the touch detection information. Based on the noise detection information of the panel unit 5C by the noise detection system 200, the shared-electrode drive unit 510 changes the types of the pulses P by using the above-described pulse changing unit 513.

In the same manner as the embodiment 3A, the electronic device 90C includes the control unit 91, the storage unit 92, the input/output I/F unit 93, the input device 94, the output device 95, the communication I/F unit 96, buses, other unillustrated power source units, etc. in addition to the liquid-crystal touch panel module 4a. The input/output I/F unit 93 is coupled to the liquid-crystal touch panel module 4a and carries out interface processing thereof.

[(4) Shared-Electrode Drive Unit]

Figure 34:
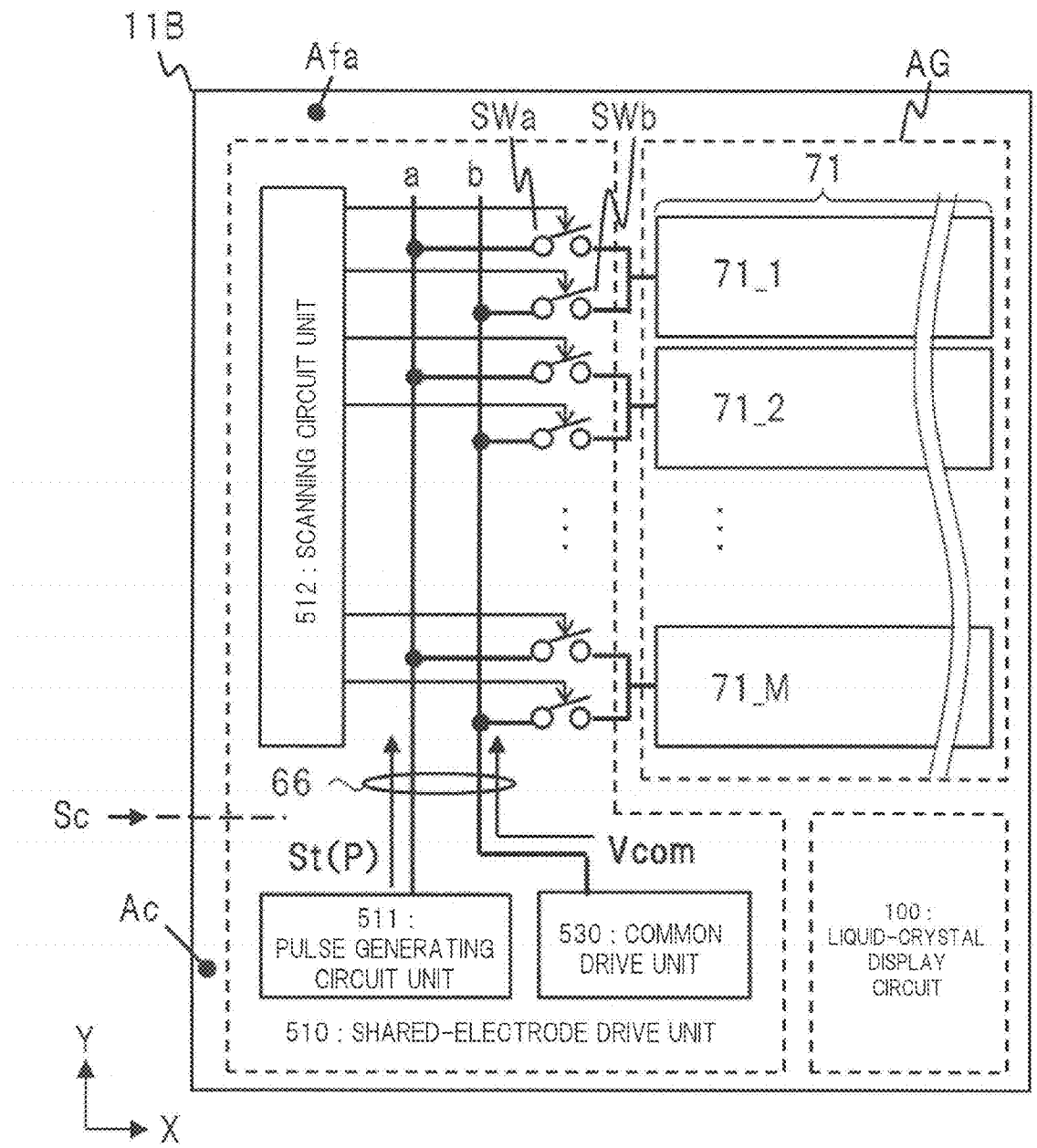
FIG. 34 is a drawing showing a configuration example about a shared electrode drive part of the embodiment 4A.
Figure 35:
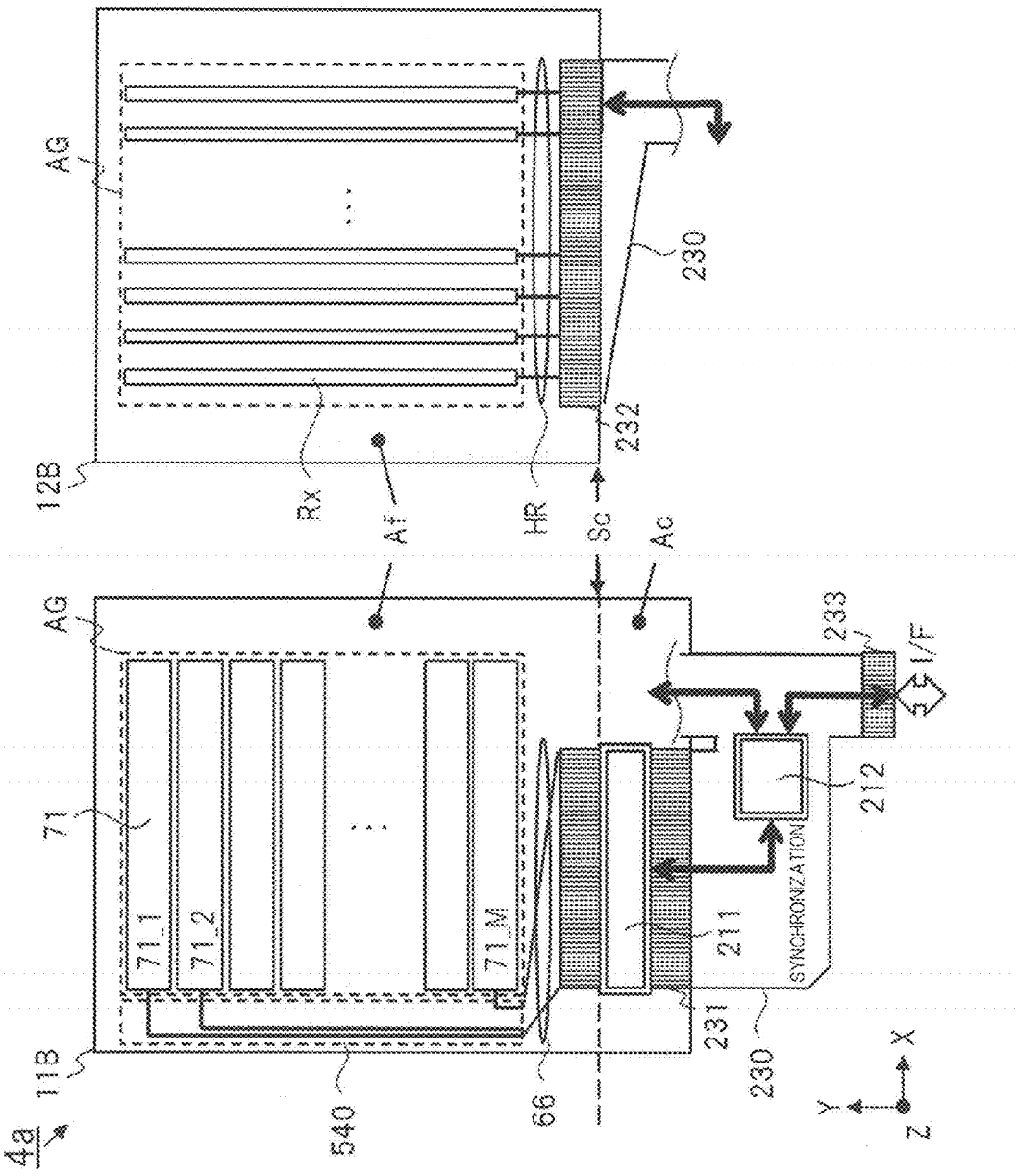
FIG. 35A is a drawing showing a configuration example of mounting of a liquid-crystal touch panel module of the embodiment 4A.
FIG. 35B is a drawing showing a configuration example of mounting of the liquid-crystal touch panel module of the embodiment 4A.

FIG. 34 shows a configuration example of the shared-electrode drive unit 510 of the panel unit 5C of the embodiment 4A. As the configuration example, for example in the left-side part region Afa of the peripheral area Af and the connecting side part Ac which is a lower side part, the shared-electrode drive unit 510 and the liquid-crystal display circuit 100 are mounted. In the region Afa of the left side part, the above-described scanning circuit unit 512 is formed. As described above, the pulses P of the touch drive signals St are generated from the pulse generating circuit unit 511 and output to the wirings 66. The common voltage Vcom is generated from the common drive unit 530 and applied to the wirings 66. The wirings 66 for the shared electrodes 71 include a line a through which the pulses P of the touch drive signals St are transmitted and a line b to which the common voltage Vcom is applied. The line a is coupled to ends of the plurality of shared electrodes 71 of the screen area AG via switches SWa. The line b is coupled to ends of the plurality of shared electrodes 71 of the screen area AG via switches SWb.

In accordance with drive of the shared electrodes 71, the scanning circuit unit 512 switches and controls on and off of the switches SWa and the switches SWb. In the display periods Kd, in accordance with control by the scanning circuit unit 512, the switches SWa in the line a side are turned off, the switches SWb in the line b side are turned on, and the common voltage Vcom is applied to the shared electrodes 71 of the screen area AG. In the touch detection periods Ks, in accordance with control of scanning drive by the scanning circuit unit 512, only the switches corresponding to the shared electrodes 71 of scanning objects among the switches SWa in the line a side are turned on, and the switches SWb in the line b side are turned off. As a result, the pulses P of the touch drive signals St are applied to the shared electrodes 71 of the scanning objects.

Like the above-described configuration example, a circuit unit(s) other than routed wirings may be provided in the left side part, etc. of the peripheral area Af. The plurality of wirings 66 for the shared electrodes 71 have differences in the lengths of the wirings 66 between the connecting side Sc and the shared electrodes 71. Moreover, for example, the mounting aspect of the above-described shared-electrode drive unit 510 and the liquid-crystal display circuit 100 may be a mode in which they are mounted as two different IC chips and subjected to synchronous control or may be an aspect in which they are integrated and mounted as one IC chip.

[(5) Configuration Examples of Mounting]

FIGS. 35A and 35B show a configuration example of mounting of the liquid-crystal touch panel module 4a of the embodiment 4A. FIG. 35A shows a configuration including the shared electrodes 71 in the TFT 11B side which is the rear surface side. FIG. 35B shows a configuration including the touch detection electrodes Rx in the color filter board 12B side which is the front surface side. In FIGS. 35A and 35B, illustration of the liquid-crystal display device part is omitted. FIGS. 35A and 35B show an example in which, in the connecting side part Ac, the circuit units other than the touch detection unit 52 disposed on the TFT board 11B side are mounted as a first IC chip 211, and the touch detection unit 52 disposed on the color filter board 12B side is mounted as a second IC chip 212.

The configuration of the TFT board 11B of FIG. 35A has, for example in a left-side region of the peripheral area Af, a region 540 in which circuit units such as the above-described wirings 66 of the shared electrodes 71, the scanning circuit unit 512, etc. are formed. Although illustration is omitted, the right-side region of the peripheral area Af also has a similar configuration. The connecting side part Ac has the first IC chip 211 in which the circuit units including the shared-electrode drive unit 510 and the liquid-crystal display circuit 100 of FIG. 34 is mounted. The first IC chip 211 is mounted, for example, on the glass substrate constituting the TFT board 11B. Ends of the wirings 66 of the shared electrodes 71 are coupled to first-side connection terminals of the first IC chip 211. Second-side connection terminals of the first IC chip 211 are coupled to first ends 231 of a flexible printed board 230 for connection with the second IC chip 212.

The second IC chip 212 is mounted on the flexible printed board 230. The mounting position of the second IC chip 212 may be changed to another position. The first IC chip 211 and the second IC chip 212 carry out synchronous control. Second ends 232 of the flexible printed board 230 are coupled to ends of the wirings HR of the touch detection electrodes Rx on the color filter board 12B side as shown in FIG. 35B. Third ends 233 of the flexible printed board 230 serve as interfaces of connection with the electronic device 90C. In the present configuration example, the above-described time constants may be calculated while including the lengths of the wiring parts from terminals of the IC chip 211 or the IC chip 212 in the connecting side part Ac.

[(6) Drive Period]

Figure 36:
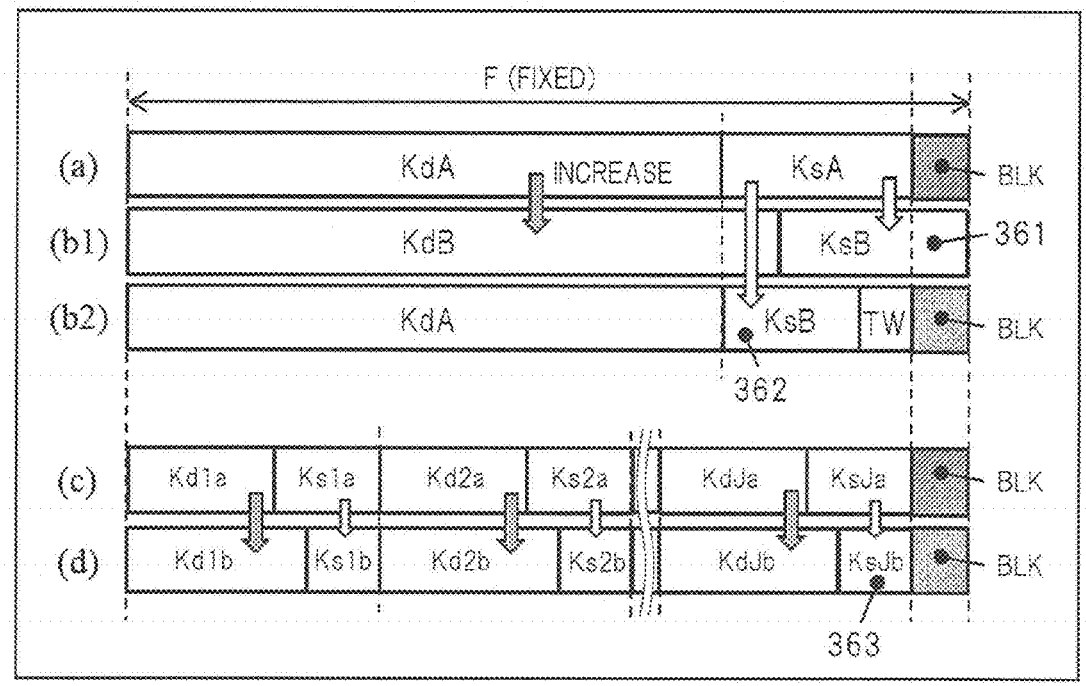
FIG. 36 is a drawing showing configuration examples of drive periods of the embodiment 4A.

FIG. 36 shows a configuration example of the drive periods of the embodiment 4A. As describe above, the case of the in-cell type has the shared electrodes 71 of the common electrodes COM, which are elements constituting the display function as described above, and of the touch drive electrodes Tx, which are elements composing the touch-sensor function. Therefore, in the drive type of the embodiment 4A, the shared electrodes 71 are driven by time division by the common electrode function of the display function and the touch drive electrode function of the touch-sensor function. FIG. 36 shows a type in which the display period Kd and the touch detection period Ks are synchronized for each of the frame periods F, and the display period Kd and the touch detection period Ks are separated from each other and driven by time division in the frame period F.

Above-described FIG. 29 (h) shows an example of drive of the shared electrode 71 of the embodiment 4A. S_71 shows an example of a signal and a voltage applied from the shared-electrode drive unit 510 to the shared electrode 71. In the display period Kd in the frame period F, the common voltage Vcom is applied from the shared-electrode drive unit 510 to all of the shared electrodes 71 of the screen area AG in order to cause the shared electrodes to be driven as the common electrode function. The common voltage Vcom can be also referred to as a voltage signal of common drive in the display period Kd. In the touch detection period Ks, the pulses P of the touch drive signals St are sequentially applied to the shared electrodes 71 from the shared-electrode drive unit 510 in order to drive the shared electrodes 71 of scanning objects as the touch drive electrode function. That process has a touch drive sequence having contents similar to, for example, those of FIG. 3. As a result, the total touch drive time Tall is shortened than that of a conventional in-cell-type touch-sensor-equipped display device. The voltage Vcom of the display period Kd and the voltage Vt of the touch detection period Ks can be made common to each other.

FIG. 36 (a) shows a case in which the display period Kd and the touch detection period Ks are distributed by time division in the frame period F having a fixed length, and unoccupied time BLK, which is a remainder thereof, is provided. FIG. 36 (b) shows a display period KdA having a length serving as a condition and a touch detection period KdB. Compared with FIG. 36 (a), FIG. 36 (b1) shows a case in which the display period KdA is increased to a display period KdB because of size expansion of the display area Ad in the screen area AG, resolution increase, etc. With respect to this, when the configuration in which the time t of the pulses P of the touch drive signals St is optimized in accordance with the time constants in the above-described manner is employed, increase of the touch detection period KsA can be suppressed or the period can be shortened, and a touch detection period KsB shown by 361 is obtained. More specifically, the display period KdB and the touch detection period KsB can be contained in the frame period F while using the unoccupied time BLK. In the same manner as the above-described case, also in the case of size expansion, sensitivity increase, etc. of the touch detection area As, increase of the touch detection period Ks can be suppressed by the present configuration. By virtue of increase suppression of the touch detection period Ks, the display period Kd can be easily contained in the frame period F.

With respect to FIG. 36 (a), FIG. 36 (b2) shows a case in which, when the display period Kd is a constant display period KdA, the touch detection period KsA can be shortened by the above-described optimizing configuration of the pulses P to obtain a touch detection period KsB shown by 362. As a result, in the frame period F, time allowance such as time TW or the time obtained by adding the time TW to the unoccupied time BLK is generated. Such time allowance may be used for increasing the display period Kd or may be used for increasing the touch detection period Ks. Also, the time allowance can be effectively utilized for another function such as the above-described pulse changing function. If the time allowance is utilized for the pulse changing function, as described above, a large shifting amount of the time t and the frequency f upon change of the pulses P can be reserved.

As a configuration example of other drive periods, FIG. 36C shows an example in which, in the fixed frame period F, the display period Kd and the touch detection period Ks are divided into a plurality of (J) display period Kd1a to a display period KdJa and a plurality of touch detection period Ks1a to touch detection period KsJa and driven by time division. FIG. 36 (d) shows a case of a display period Kd1b to a display period KdJb having increased lengths of the display periods Kd in the frame period F with respect to FIG. 36 (c). Along with that, the touch detection periods Ks can be shortened or increase thereof can be suppressed by the above-described optimizing configuration of the pulses P so as to obtain a touch detection period Ks1b to a touch detection period KsJb shown by 363. As a result, the display periods Kd and the touch detection periods Ks can be contained in the frame period F.

As described above, according to the embodiment 4A, in the in-cell-type liquid-crystal touch panel module 4a, the total touch drive time Tall and the touch detection period Ks of the screen area AG can be shortened or increase thereof can be suppressed, and efficient touch detection can be achieved. According to the embodiment 4A, also with respect to the tendency of screen size expansion and resolution increase, the display period Kd and the touch detection period Ks can be easily ensured in the frame period F. Moreover, according to the embodiment 4A, since the pulse changing function by the noise detection is provided, the touch detection sensitivity can be maintained or improved even when noise is detected in the screen area AG.

The embodiment 3A and the embodiment 4A have been explained by the cases based on the embodiment 1A and the embodiment 2A. However, combined modes with the above-described various embodiments can be also employed. For example, in the same manner as the embodiment 1E or the embodiment 1F, there can be employed an aspect such as a liquid-crystal touch panel module provided with the touch drive electrodes Tx extending in the Y-direction and the touch detection electrodes Rx extending in the X-direction in the screen area AG.

<Electronic Devices>

Figure 37A:
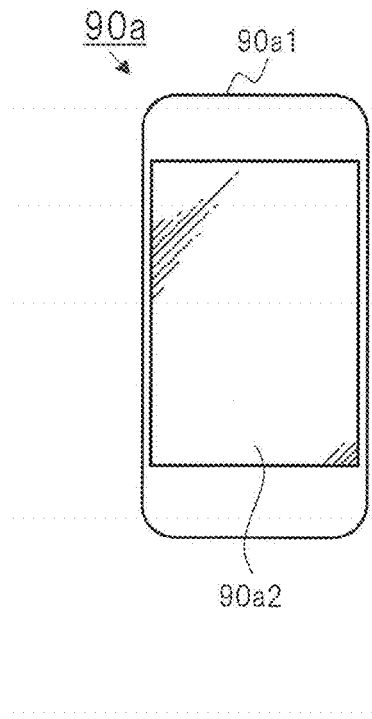
FIGS. 37A and 38B show an external appearance of a case in which an electronic device of an embodiment is a smartphone.
Figure 37B:
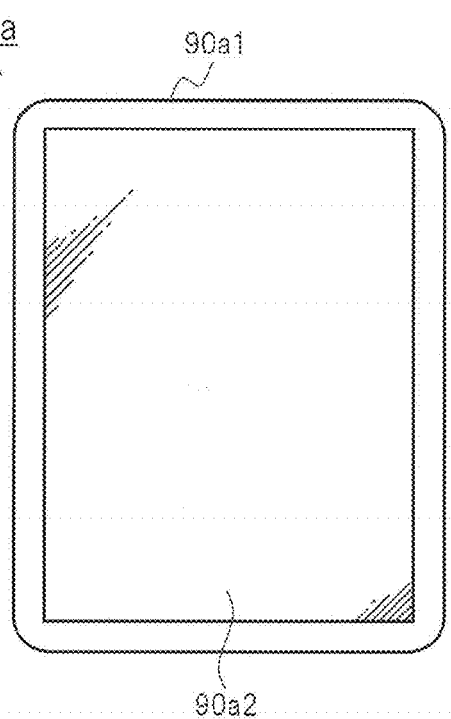

FIG. 37A to FIG. 42 show application examples of the above-described electronic device 90A, the electronic device 90B, and the electronic device 90C. FIG. 37A schematically shows an external appearance shape example of a case in which the electronic device 90a is a smartphone. FIG. 37B schematically shows an external appearance shape of a case in which the electronic device 90a is a tablet terminal. A chassis 90a1 of the electronic device 90a of FIG. 37A or FIG. 37B has a region 90a2 corresponding to the above-described screen area AG.

Figure 38A:
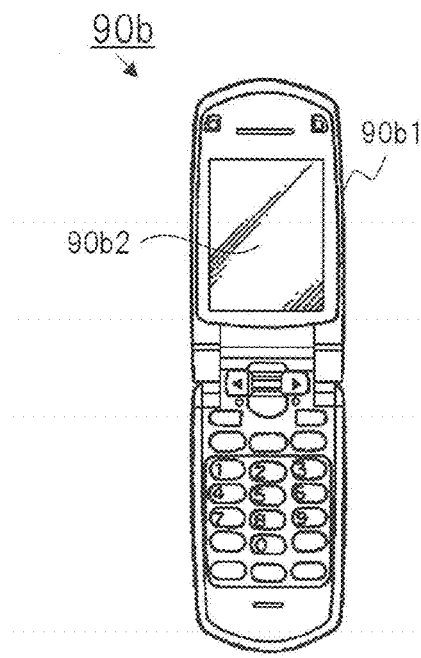
Figure 38B:
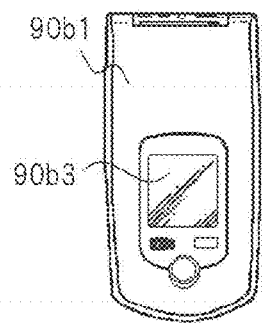

FIGS. 38A and 38B show external appearance shape examples of a case in which the electronic device 90b is a mobile phone. FIG. 38A and FIG. 38B show a state before/after folding a chassis 90b1 of the electronic device 90b. The chassis 90b1 of the electronic device 90b of FIG. 38A has, in an inner surface side thereof, a region 90b2 corresponding to the above-described screen area AG. The folded chassis 90b1 of FIG. 38B has, on an outer surface side, a region 90b3 corresponding to the above-described screen area AG.

Figure 39:
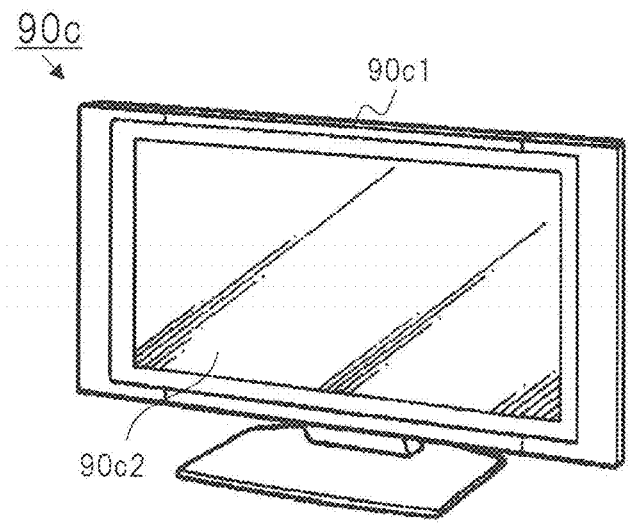
FIG. 39 is a drawing showing an external appearance of a case in which an electronic device of an embodiment is a television device.
Figure 40:
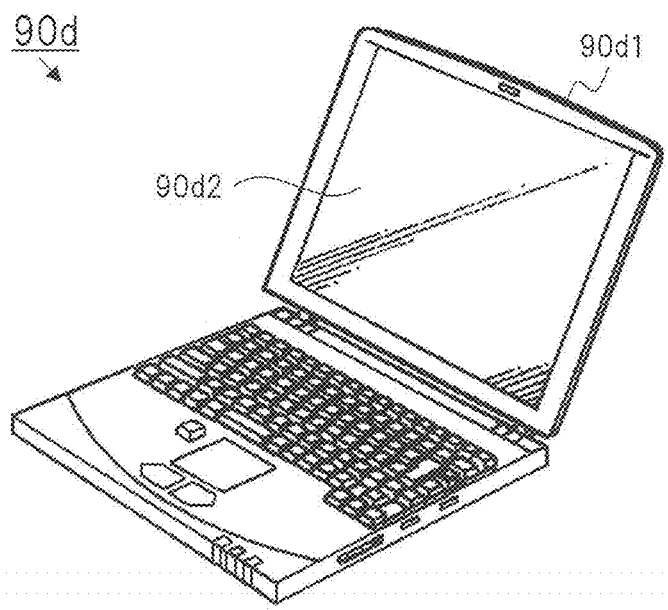
FIG. 40 is a drawing showing external appearance of a case in which an electronic device of an embodiment is a notebook PC.

FIG. 39 shows an external appearance shape example of a case in which the electronic device 90c is a television device. A chassis 90c1 of the electronic device 90c has, in a front surface side thereof, a region 90c2 corresponding to the above-described screen area AG. FIG. 40 shows an external appearance shape example of a case in which an electronic device 90d is a notebook PC. A foldable chassis 90d1 of the electronic device 90d has, on a surface serving as a display side thereof, a region 90d2 corresponding to the above-described screen area AG.

Figure 41:
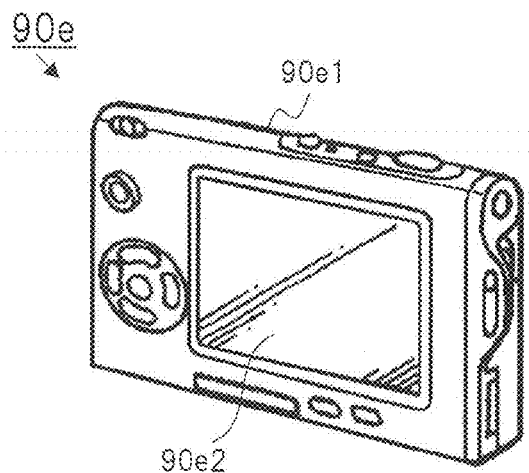
FIG. 41 is a drawing showing external appearance of a case in which an electronic device of an embodiment is a digital camera.
Figure 42:
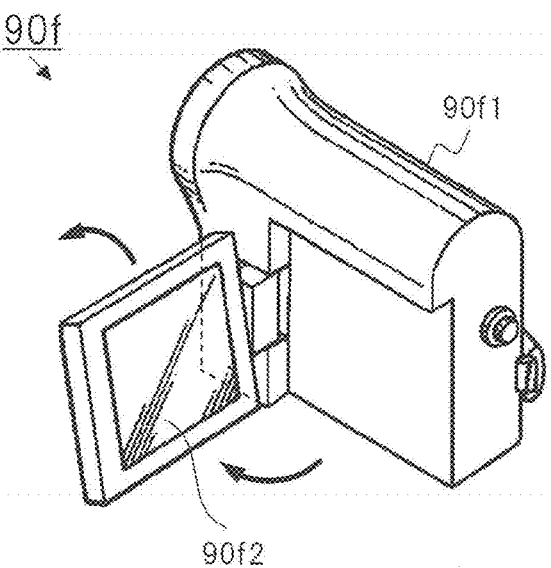
FIG. 42 is a drawing showing external appearance of a case in which an electronic device of an embodiment is a digital video camera.

FIG. 41 shows an external appearance shape example of a case in which an electronic device 90e is a digital camera. A chassis 90e1 of the electronic device 90e has, on a surface serving as a monitor side thereof, a region 90e2 corresponding to the above-described screen area AG. FIG. 42 shows an external appearance shape example in which an electronic device 90f is a digital video camera. A chassis 90f1 of the electronic device 90*f* has, on a surface serving as a monitor side when an openable/closable part thereof is opened to outside, a region 90*f*2 corresponding to the above-described screen area AG.

<Effects, Etc.>

As described above, according to the embodiments, the touch-sensor devices and the touch-sensor-equipped display devices have a configuration in which, as the touch drive signals St for the plurality of touch drive electrodes Tx of the touch detection area As by the touch-sensor function, the pulses of the plurality of types of which time t has been optimally adjusted in accordance with differences in the lengths and time constants of the paths including routed wirings are generated and applied from the circuit units. According to the present configuration, the total touch drive time and the touch detection period can be shortened or increase thereof can be suppressed while sufficiently ensuring touch detection sensitivity. Therefore, efficient touch detection by the touch-sensor function can be achieved. The time allowance caused by shortening of the touch drive period can be effectively utilized as, for example, time for display periods or other functions. Particularly when the time allowance is utilized for the pulse changing function, the touch detection sensitivity can be improved. Particularly in an aspect of a combination of a display device and a touch sensor such as the in-cell-type liquid-crystal touch panel module 4*a*, efficient touch detection can be carried out while sufficiently ensuring the sensitivity of touch detection. For example, also in a case of screen size expansion, resolution increase, etc., the display period and the touch detection period can be easily ensured with respect to the frame period.

Hereinabove, the invention made by the present inventors has been described in detail based on the embodiments. However, the present invention is not limited to the above-described embodiments, and it goes without saying that various modifications can be made within a range not departing from the gist thereof.

As another embodiment, in a case in which there are differences in time constants of the parts having different lengths, etc. in the paths including the wirings of the touch drive electrodes Tx and the wirings of the touch detection electrodes Rx, the present invention can be applied in the same manner as the above-described embodiments. Moreover, for example, also in a case in which the widths of the plurality of routed wirings are different in addition to the lengths of the plurality of routed wirings, the present invention can be applied in the same manner as the above-described embodiments. If there are differences in the widths of the wirings, the resistance values and capacitance values thereof are changed; therefore, differences are generated in the time constants. In that case, there may be employed a mode in which the time of the pulses of the plurality of types is adjusted in the same manner as the above-described embodiments in accordance with the differences in the widths and time constants of the wirings. For example, regarding the plurality of wirings HT between the touch drive electrodes Tx and the connecting side Sc, if there are parts in which the wirings HT have mutually the same or different lengths and each of the wirings HT has a different width, there may be employed an aspect in which the time constants thereof are estimated in consideration of the lengths and widths of the plurality of wirings HT to adjust the time of the pulses.

As another embodiment, the case of application to the liquid-crystal display device having the liquid crystal layer 13 as the display function layer has been explained in the above-described mode; however, the invention can be also applied to a display device having another display function layer. For example, the invention may be applied to a touch-sensor-equipped organic EL display device having an organic EL layer as the display function layer. Moreover, the invention may be applied to a plasma display having a plasma gas layer as the display function layer. The glass substrate, etc. constituting the above-described panel unit is not limited to a material having high rigidity. When the glass substrate, etc. are composed of a material having low rigidity, the invention can be applied to electronic paper, etc.

The present invention can be utilized in various input devices, display devices, electronic devices, etc.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device comprising:
a display panel including a display area, a frame area;
pixel electrodes including first pixel electrodes and second pixel electrodes in the display area;
share electrodes including first share electrodes opposed to the first pixel electrodes and second share electrodes opposed to the second pixel electrodes;
a display function layer controlled by the pixel electrodes and the share electrodes;
a driving circuit electrically connected to the first and second share electrodes, and configured to drive the first and second share electrodes; and
a first group of wirings coupled between the driving circuit and the first share electrodes in the frame area,
a second group of wirings coupled between the driving circuit and the second share electrodes,
wherein each of the first group of wiring is longer than each of the second group of wirings,
wherein the first and second share electrodes are driven with a display drive signal during a display period, and the first share electrodes are driven with a first touch detection drive pulse simultaneously during a first touch detection period, and the second share electrodes are driven with a second touch detection drive pulse simultaneously during a second touch detection period, and
wherein a width of the first touch detection drive pulse is longer than the second touch detection drive pulse.

2. The display device according to claim 1, wherein the display function layer is a liquid crystal layer.

3. The display device according to claim 1, wherein, in a touch detection area, capacitors are formed by each of the share electrodes.

4. The display device according to claim 1, wherein, the first group of wirings are disposed in a first region of the frame area and the second group of wirings are disposed in a second region of the frame area which is closer than the first region from the driving circuit;
the first group of wirings is respectively coupled to both ends of the corresponding first share electrodes among the share electrodes;
the second group of wirings is respectively coupled to both ends of the corresponding second share electrodes; and the first and second touch detection drive pulses are sequentially applied to the first and second share electrodes from the driving circuit.

5. The display device according to claim 1, wherein,
the first and second groups of wirings are disposed in the frame area;
the first and second groups of wirings are respectively coupled to first ends of the corresponding share electrodes; and,
the first and second touch detection drive pulses are sequentially applied to the first and second share electrodes of a touch detection area through the plurality of wirings.

6. The display device according to claim 1, wherein,
the first group of wirings are disposed in a first region of the frame area and the second group of wirings are disposed in a second region of the frame area;
the first group of wirings is respectively coupled to first ends of the first share electrodes;
the second group of wirings is respectively coupled to second ends of the second share electrodes; and,
the first and second touch detection drive pulses are sequentially applied to the first and second share electrodes of a touch detection area through the wirings.

7. The display device according to claim 1, further comprising a touch detect circuit configured to detect an external object in response to the first and second touch detection drive pulses applied to the share electrodes.

8. The display device according to claim 1, further comprising a pulse changing circuit configured to change a pulse cycle of one or both of the first and second touch detection drive pulses applied to at least one of the share electrodes from the driving circuit.

9. The display device according to claim 1, further comprising a pulse changing circuit configured to change a number of one or both of the first and second touch detection drive pulses applied to at least one of the share electrodes from the driving circuit.

10. The display device according to claim 8, further comprising:
a noise detecting circuit configured to detect noise,
the pulse changing circuit configured to change the pulse cycle based on the noise detected by the noise detecting circuit.

* * * * *